(12) United States Patent
Ikegami

(10) Patent No.: US 6,954,553 B2
(45) Date of Patent: Oct. 11, 2005

(54) PERSONAL AUTHENTICATION SYSTEM USING FINGERPRINT INFORMATION, REGISTRATION-AND-AUTHENTICATION METHOD FOR THE SYSTEM, DETERMINATION METHOD FOR THE SYSTEM, AND COMPUTER-READABLE RECORDING MEDIUM

(75) Inventor: Jun Ikegami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 601 days.

(21) Appl. No.: 09/797,738

(22) Filed: Mar. 5, 2001

(65) Prior Publication Data

US 2002/0048390 A1 Apr. 25, 2002

(30) Foreign Application Priority Data

Oct. 20, 2000 (JP) ........................................ 2000-321308

(51) Int. Cl.⁷ ................................................ G06K 9/62
(52) U.S. Cl. ........................ 382/224; 382/124; 382/190; 382/218; 382/305; 707/1; 707/6
(58) Field of Search ................................ 382/115, 124, 382/125, 157, 173, 190, 197, 209, 218, 224, 228, 266, 272, 274, 305; 707/1, 6, 7; 283/67, 68, 69, 78, 36

(56) References Cited

FOREIGN PATENT DOCUMENTS

| JP | 05061964 A | * | 3/1993 |
| JP | HEI 7-029003 | | 1/1995 |
| JP | HEI 9-044666 | | 2/1997 |

OTHER PUBLICATIONS

Anil Jain et al. (IEEE pattern analysis and machine intelligence, vol. 19, No. 4, Apr. 1997.*

* cited by examiner

Primary Examiner—Bhavesh M. Mehta
Assistant Examiner—Sheela Chawan
(74) Attorney, Agent, or Firm—Staas & Halsey LLP

(57) ABSTRACT

The present invention describes a personal authentication system using fingerprint information, which includes a fingerprint characteristic data section for extracting person-to-be-authenticated fingerprint characteristic data from a person-to-be-authenticated fingerprint image; a fingerprint pattern information extraction section for extracting a person-to-be-authenticated fingerprint pattern from a person-to-be-authenticated fingerprint image; a matching priority definition section for outputting a matching priority for each of matching data groups classified in accordance with a registrant fingerprint pattern; a matching section for matching the person-to-be-authenticated fingerprint characteristic data against registrant fingerprint characteristic data on the basis of the person-to-be-authenticated fingerprint characteristic data, person-to-be-authenticated fingerprint classification information and the matching priority. Even when a perfect match does not exist between the pattern of the fingerprint of the person to be authenticated and registered patterns, a person can be authenticated without fail and the amount of computation can be omitted significantly.

27 Claims, 35 Drawing Sheets

CENTER BLOCK

BLOCK GROUP A

BLOCK GROUP B

FIG. 6(a) VERTICAL DIRECTION
FIG. 6(b) HORIZONTAL DIRECTION
FIG. 6(c) RIGHT-LOOPED DIRECTION
FIG. 6(d) LEFT-LOOPED DIRECTION

FIG. 33
|  |  |  |  |  |
|---|---|---|---|---|
| PLAIN ARCH PATTERN | TENTED ARCH PATTERN | RIGHT LOOP PATTERN | LEFT LOOP PATTERN | WHORL PATTERN |
| α | β | γ | δ | ε |

PERSONAL AUTHENTICATION SYSTEM USING FINGERPRINT INFORMATION, REGISTRATION-AND-AUTHENTICATION METHOD FOR THE SYSTEM, DETERMINATION METHOD FOR THE SYSTEM, AND COMPUTER-READABLE RECORDING MEDIUM

BACKGROUND OF THE INVENTION (1) Field of the Invention

The present invention relates to a personal authentication system using fingerprint information suitable for authenticating a personal identification utilizing, e.g., a fingerprint pattern; to a registration-and-authentication method for the system; and to a determination method for the system.

(2) Description of the Related Art

Personal authentication systems using biological information, such as fingerprints, have recently been commercially available. The biological information (hereinafter called biometric information) utilizes, for example, a fingerprint, a palm print, a finger shape, a palm shape, voice, a retina, an iris, a face image, a dynamic signature, blood-vessel arrangements, or keystroke. The biometric information is superior in reliability to a password. Of biometric information, a fingerprint is used frequently.

In a personal authentication system using a fingerprint, a fingerprint is to be checked against all sample fingerprints by means of round-robin matching. For instance, the authentication system employs a matching method (matching technique) of so-called one-fingerprint-against-multiple-registered-fingerprints type (hereinafter simply called a "1-N fingerprint matching method"). Round-robin matching is a technique of checking a fingerprint against all the registered fingerprint data for matching purpose, in sequence from the top. If fingerprint data pertaining to a person of interest are coincidentally located at the head of the sequence, it is expected that matching processing can be terminated immediately without involvement of matching operation using a fingerprint pattern.

The round-robin matching technique verifies an individual without use of an ID (identification). Hence, according to the technique, matching requires a massive amount of computation until a person of interest is authenticated.

In order to avoid massive amounts of processing time, there have already been conceived various methods which shorten a matching time required for the 1-N matching method, by means of detecting the type of a fingerprint pattern and checking the fingerprint against fingerprints having patterns of the same type.

For example, Japanese Patent Application Laid-Open (Kokai) No. HEI 7-29003 (hereinafter called "Publicly-Known Publication 1") describes a fingerprint matching system capable of shortening a matching time. In this system, characteristic data for matching purpose are extracted from fingerprint images of a plurality of fingerprints, and the thus-extracted data are registered in a filed fingerprint data storage section. Characteristic data for matching are extracted from a fingerprint image to be authenticated (hereinafter called a "search fingerprint"). The system determines, from among the filed fingerprints (hereinafter called "filed fingerprints") registered in the filed fingerprint data storage section, a filed fingerprint whose characteristic data have the highest degree of similarity to the characteristic data extracted from the search fingerprint.

At the time of fingerprint matching, additional information appended to the data pertaining to the fingerprint to be authenticated is compared with additional information appended to the data pertaining to the registered fingerprints. Filed fingerprints whose additional information does not match the additional information about the fingerprint to be authenticated are eliminated from fingerprints to be matched, thereby shortening overall matching time.

According to the fingerprint authentication method utilizing a fingerprint pattern, if no match exists between registered fingerprint patterns for matching purpose and a fingerprint pattern to be authenticated, the person having the fingerprint to be authenticated is identified as being a different person. According to this method, when a fingerprint image is captured, the fingerprint may be determined to differ from a true fingerprint, depending on the angle at which a finger is placed on a fingerprint scanner (hereinafter often simply called a "scanner") or the circumstances of sampling of a fingerprint, such as the position of a finger on the scanner (hereinafter called "fingerprint-sampling circumstances"). In this case, normal personal authentication cannot be effected, and the captured fingerprint is checked against only fingerprints whose patterns do not match that of the captured fingerprint. If no match is found between the fingerprint to be authenticated and a group of registered fingerprints for matching purposes whose finger patterns are similar to that of the fingerprint to be authenticated, the fingerprint to be authenticated is checked against all registered fingerprints for matching purpose whose patterns are different from that of the fingerprint to be authenticated. This method is not much different from mere round-robin matching.

In addition, various methods for determining a fingerprint pattern have already been put forward. Japanese Patent Application Laid-Open (Kokai) No. HEI 9-44666 (hereinafter called "Publicly-Known Publication 2") describes a classification apparatus for classifying a skin pattern and a fingerprint pattern which tracks and classifies a skin pattern line such as a palm print or a fingerprint. The skin-pattern-line tracking apparatus described in Publicly-Known Publication 2 extracts characteristic points appearing in characteristic patterns. If characteristic lines are present around the characteristic points, the characteristic lines are tracked, thereby extracting a feature of the fingerprint pattern and determining the type of the fingerprint pattern.

FIG. 33 is an illustration for describing types of fingerprint patterns, showing five print patterns; namely, a plain arch pattern α, a tented arch pattern β, a right loop pattern γ, a left loop pattern δ, and a whorl pattern ε. In the classification shown in FIG. 33, the plain arch pattern α has no characteristic point appearing in a semi-circular area (hereinafter called a "core-type characteristic point"); each of the tented arch pattern β, the right loop pattern γ, and the left loop pattern δ has one core-type characteristic point; and the whorl pattern ε has two core-type characteristic points.

Characteristic points appearing in a delta area (hereinafter called "delta-type characteristic points") are equal in number to the core-type characteristic points. A fingerprint image sometimes cannot be practically obtained over a sufficiently wide area. For this reason, automatic detection of a fingerprint produced by means of pressing a finger against a scanner is sometimes difficult. In this regard, Publicly-Known Publication 2 describes classification of fingerprints according to a core-type characteristic point.

In the category of the right loop pattern γ, the left loop pattern δ, and the tented arch pattern β, many similar patterns are difficult to classify between two categories; namely, the loop patterns γ and δ and the tented arch pattern β. At the time of drawing a distinction between these two types of patterns, care must be paid in determining whether or not a pattern includes a loop line. The right loop pattern γ and the left loop pattern δ include a loop line, whereas the tented arch pattern β consists of an arch line and does not include a loop line.

FIG. 34(a) is an illustration for describing a loop line. Each of ridge lines (curved lines constituting a pattern) $a_1$–$a_r$ and $b_l$–$b_r$ shown in FIG. 34(a) has a horseshoe pattern. Ends of each of horseshoe-shaped ridge lines are oriented in one direction. Namely, ends of the two left loop lines $a_1$–$a_r$ and $b_l$–$b_r$ are oriented in substantially a leftward direction, as shown in FIG. 34(a). Ends of two right loop lines [not shown in FIG. 34(a)] are oriented in substantially a rightward direction.

FIG. 34(b) is an illustration for describing a tented arch line. Each of ridge lines $a_l$–$a_r$, $b_l$–$b_r$, and $c_l$–$c_r$ shown in FIG. 34(b) is separated into the right and left sides, as viewed from the tented portion of the arch pattern.

A ridge line is not always continuous and often shows discontinuities. In such a case, the discontinuities of the ridge line are complemented, as required, and the thus-complemented ridge line is tracked. The type of a fingerprint pattern including the ridge line is determined on the basis of whether or not ends of the thus-tracked ridge line satisfy the foregoing requirements. As a result, the type of the fingerprint pattern is determined to be of the arch pattern types α and β or the loop pattern types γ and δ.

In the case of the loop pattern type shown in FIG. 34(a), the core-type characteristic point is situated in the area surrounded by the horseshoe-shaped ridge lines $a_l$–$a_r$ and $b_l$–$b_r$. In other words, a loop pattern is located in the vicinity of the core-type characteristic point. In contrast, in the tented arch pattern β shown in FIG. 34(b), the core-type characteristic point is surrounded by the arch lines $a_l$–$a_r$, $b_l$–$b_r$, and $c_l$–$c_r$.

Hence, a determination as to whether a fingerprint is to be classified as the loop pattern types γ and δ or as the tented arch pattern type β is made if extracted lines surrounding a core-type characteristic point assume an arch shape or a loop shape.

The majority of whorl patterns can be roughly classified into two types according to core-type characteristic points and orientation of ridge lines surrounding the core-type characteristic points. FIGS. 35(a) and 35(b) are illustrations for describing whorl patterns of these types. A fingerprint pattern shown in FIG. 35(a) has two core-type characteristic points, which are connected together by ridge and furrow lines. Further, annular ridge lines surround the core-type characteristic points. A fingerprint pattern shown in FIG. 35(b) also has two core-type characteristic points connected to whorl-shaped lines.

In a case where characteristic lines (characteristic lines) connected to the core-type characteristic points cannot be classified as either of the foregoing two pattern types, a detected characteristic point can be determined to be a characteristic point of a whorl pattern. Thus, a whorl pattern can be authenticated.

FIG. 36 is an illustration showing an example loop pattern. Two loop lines and two core-type characteristic points appear in the example. The loop pattern shown in FIG. 36 has two loop lines, and very few people have this type of fingerprint. The fingerprint of this pattern is determined by means of checking characteristic lines connected to the core-type characteristic points, thereby preventing false classification of the fingerprint of this type as the whorl pattern type.

In addition to the inventions described in Publicly-Known Publications 1 and 2, numerous techniques for correctly determining a pattern as precisely as possible from an input fingerprint image have hitherto been proposed.

However, when determination of pattern type of a fingerprint has failed, the person is not authenticated as a true person. More strict determination of pattern type is again required, thus involving a large amount of computation.

When the loop pattern shown in FIG. 36 is subjected to matching by use of the above-described determination method, the fingerprint having this loop pattern is subjected to fingerprint matching through strict determination. Hence, a failure of type determination is not allowed. If an input fingerprint has a narrow area, the pattern of the fingerprint cannot be determined accurately. In order to strictly determine the pattern type of a fingerprint, a wide fingerprint image of the fingerprint is required. Hence, if determination of pattern type of a fingerprint has failed during related-art personal authentication using fingerprint patterns, correct authentication of an individual becomes impossible.

SUMMARY OF THE INVENTION

The present invention has been conceived in light of the drawbacks of the related art and is aimed at providing a personal authentication system, a registration-and-authentication method for the system, and a determination method for use with the system, wherein patterns of fingerprints are determined through use of a lower portion of each of the fingerprint images at the time of registration; the patterns are grouped according to pattern categories and assigned matching priorities; matching is effected through use of the matching priorities; and even when a perfect match does not exist between the pattern of the fingerprint of the person to be authenticated and registered patterns, a person can be authenticated without fail and the amount of computation can be omitted significantly.

A system which authenticates an individual by use of fingerprint information, the system comprising:

a storage section capable of holding data;

a registration apparatus which generates matching data from information entered by a registration fingerprint information input section for capturing registrant fingerprint information and registers the matching data into the storage section; and an authentication apparatus which determines a person to be authenticated as a true person or a different person through use of the matching data written in the storage section, wherein the registration apparatus includes a registrant fingerprint characteristic data extraction section which extracts registrant fingerprint characteristic data from a registrant fingerprint image captured by the registration fingerprint information input section;

a registrant fingerprint classification information extraction section which extracts registrant fingerprint classification information from the registrant fingerprint image captured by the registration fingerprint information input section; and a matching data generation section which writes the matching data into the storage section, the matching data being formed such that the registrant fingerprint characteristic data and the registrant fingerprint classification information are related with each other, and the authentication apparatus includes a person-to-be-authenticated fingerprint characteristic data extraction section which extracts person-to-be-authenticated fingerprint characteristic data from a person-to-be-authenticated fingerprint image captured by an authentication fingerprint information input section for capturing person-to-be fingerprint information, a person-to-be-authenticated fingerprint classification information extraction section which extracts person-to-be-authenticated fingerprint classification information from the person-to-be-authenticated fingerprint image captured by the authentication fingerprint information input section, a matching priority definition section which can output a matching priority for each of the matching data groups classified in accordance with the registrant fingerprint classification information, and a matching section which matches the person-to-be-authenticated fingerprint characteristic data against the registrant fingerprint characteristic data on the basis of the person-to-be-authenticated fingerprint characteristic data, the person-to-be-authenticated fingerprint classification information and the matching priority, and outputs a result of matching.

Hence, the system enables relaxation of the strictness of pattern determination. As a result, speed of pattern determination is improved. A person can be authenticated faster than in a case where the person is authenticated by means of round-robin matching.

Preferably, the registration apparatus further comprises a matching priority determination processing section for determining a matching priority in accordance with the registrant fingerprint classification information and for outputting the matching priority. Preferably, the matching data generation section can be constructed so as to write the matching data into the storage section, the matching data being formed such that the registrant fingerprint characteristic data and the registrant fingerprint classification information are related with each other. As a result, computation of a matching priority, which would otherwise be required at the time of entry of authentication data, can be obviated, thereby significantly reducing the amount of computation.

Preferably, the registrant fingerprint characteristic data extraction section of the registration apparatus and the person-to-be-authenticated fingerprint characteristic data extraction section of the authentication apparatus are shared, and the registrant fingerprint classification information extraction section of the registration apparatus and the person-to-be-authenticated fingerprint classification extraction section of the authentication apparatus are shared. As a result, costs of the registration apparatus can be reduced.

A registration-and-authentication method for use with a personal authentication system for authenticating an individual through use of fingerprint information, the method comprising:

a first extraction step of extracting registrant fingerprint characteristic data from a captured registrant fingerprint image;

a registrant fingerprint characteristic data registration step of writing the registrant fingerprint characteristic data extracted in the first extraction step into a storage section capable of retaining data;

a second extraction step of extracting registrant fingerprint classification information from the registrant fingerprint image;

a registrant fingerprint classification information registration step of writing the registrant fingerprint classification information extracted in the second extraction step into the storage section;

a matching data registration step of writing matching data into the storage section, the matching data being formed such that the registrant fingerprint characteristic data and the registrant fingerprint classification information are related with each other;

a matching data extraction step of extracting the matching data from the storage section;

a third extraction step of extracting the registrant fingerprint characteristic data from a captured person-to-be-authenticated fingerprint image;

a fourth extraction step of extracting person-to-be-authenticated fingerprint classification information from the person-to-be-authenticated fingerprint image;

a matching priority definition step of outputting a matching priority for each of matching data groups classified on the basis of the registrant fingerprint classification information; and a matching-and-determination step of matching and determining a person to be authenticated as a true or false person on the basis of the person-to-be-authenticated fingerprint characteristic data, the person-to-be-authenticated fingerprint classification information and the matching priority.

By means of the method, even when an input image is not fully reproduced, the pattern of the image can be identified correctly, and the pattern can be determined as a pattern assigned high matching priority.

A determination method for use with a personal authentication system which authenticates an individual by use of fingerprint information, the method comprising:

a center detection step of detecting the coordinates of the center of a fingerprint from a person-to-be-authenticated fingerprint image;

a division step of dividing the person-to-be-authenticated fingerprint image into a plurality of unit blocks;

a recognition step of recognizing a center unit block having the fingerprint center coordinates detected in the center detection step from among the plurality of unit blocks produced in the division step;

a block group generation step of generating block groups including the plurality of unit blocks located at a portion of an opposite side of the tip-end side relative to the center unit block recognized in the recognition step;

a unit block orientation determination step of determining the orientation of a local fingerprint wave in each of the plurality of unit blocks constituting the block group generated in the block group generation step; and a fingerprint classification information determination step of determining fingerprint classification information on the basis of the orientation of the fingerprint wave determined in the unit block orientation determination step.

By means of the determination method, even when a match does not exist between the pattern of the fingerprint of the person to be authenticated and registered patterns, a person can be authenticated without fail, thereby minimizing useless matching. Computational efforts can be significantly reduced, thereby enabling efficient matching. A desired degree of strictness can be set by means of matching. Either accurate matching or speed-prioritized matching can be employed, as required.

Preferably, the determination section determines the person to be true or false while factoring in the person-to-be-authenticated fingerprint classification information extracted by the person-to-be-authenticated fingerprint classification information extraction section. Alternatively, the determination section determines the person to be true or false while a match rate output from the matching section is taken as the matching result. As a result, the user can authenticate a person immediately without involvement of redundant matching.

Preferably, the registrant fingerprint classification information extraction section may be configured so as to extract the registrant fingerprint classification information through use of a tip-end area and a portion opposite the tip-end area relative to the center of a fingerprint on the registrant fingerprint image. As a result, attention is paid to directions of blocks in the specific region located below the center of the fingerprint. Even when an input image is imperfect and the pattern thereof cannot be identified correctly, the pattern can be matched with a pattern of high matching probability. Further, even when a fingerprint image has a narrow area, the image can be subjected to matching. In contrast with a pattern determination method which has already been proposed, the pattern determination method according to the present invention can relax the degree of strictness. Moreover, the speed of processing for obtaining the result of pattern determination is improved.

Preferably, when the determination section cannot determine the person to be true or false until a matching operation for predetermined matching priority is completed, the matching section may be arranged so as to limit authentication operation for matching priority lower than the predetermined matching priority. When matching is effected through use of a pattern of low matching rate and low hit probability, authentication can be interrupted, thereby enabling efficient operation.

Preferably, the authentication apparatus may comprise: a person-to-be-authenticated fingerprint characteristic data extraction section; a person-to-be-authenticated fingerprint classification information extraction section; matching priority definition section; and a matching section. Computational efforts can be significantly saved, thereby enabling efficient matching.

Preferably, the matching priority definition section maybe arranged so as to hold, as the matching data, the matching data being formed such that the registrant fingerprint classification information and the matching priority are related with each other. By means of such a configuration, even when an input image is not fully reproduced, the pattern of the image can be identified correctly, and the pattern can be determined as a pattern assigned high matching priority.

Preferably, the storage section may be arranged so as to hold the matching data according to classification categories of the registrant fingerprint classification information. Further, the storage section may preferably be arranged so as to comprise a registrant fingerprint characteristic data storage section and a registrant fingerprint classification information storage section. By means of such a configuration, even when a match does not exist between the pattern of the fingerprint of the person to be authenticated and registered patterns, a person can be authenticated without fail, thereby minimizing unnecessary matching and significantly reducing computational efforts.

Preferably, the registration apparatus includes a registrant biometric information characteristic data extraction section, a registrant biometric information classification information extraction section, and a matching data generation section. Further, the authentication apparatus preferably includes a person-to-be-authenticated biometric information characteristic data extraction section, a person-to-be-authenticated biometric classification information extraction section, a matching priority definition section and a matching section. Hence, matching is effected while factoring in a matching priority. Even when a perfect match does not exist between the biometric information for authentication and the biometric information about registered data for matching purpose, matching can be effected without fail.

Preferably, the registrant biometric information characteristic data extraction section of the registration apparatus and the person-to-be-authenticated biometric information characteristic data extraction section of the authentication apparatus are shared and the registrant biometric information classification information extraction section of the registration apparatus and the person-to-be-authenticated biometric information classification extraction section of the authentication apparatus are shared. By means of such a configuration, an input device for registration purpose and an input device for authentication device can be implemented by a single input device. As a result, matching can be effected without addition of a new device for entering, for example, seal data.

Preferably, the registration apparatus may be configured so as to comprise a registration biometric information input section, a registrant biometric information characteristic data extraction section, and a registrant biometric classification extraction section, and a matching data generation section. Preferably, even when a match does not necessarily exist between data, authentication can be effected without fail, and useless matching can be minimized.

Preferably, the authentication apparatus may be configured so as to comprise a person-to-be-authenticated biometric information characteristic data extraction section, a person-to-be-authenticated biometric classification information extraction section, a matching priority determination processing section, and a matching data generation section. By means of such a configuration, a person can be authenticated faster than in a case where a person is authenticated by means of mere round-robin matching.

Preferably, a program recorded on the computer-readable recording medium causes a computer to function as: a person-to-be-authenticated fingerprint characteristic data extraction section, a person-to-be-authenticated fingerprint classification information extraction section and a matching data generation section, and also as a person-to-be-authenticated fingerprint characteristic data extraction section, a registrant fingerprint classification information extraction section and a matching priority definition section, and a matching section. The computer-readable recording medium can be readily installed into the computer. Hence, there can be efficiently established a system which authenticates an individual by use of fingerprint information.

BRIEF DESCRIPTION OF THE DRAWINGS

FIG. 33 is an illustration for describing types of fingerprint patterns;

DESCRIPTION OF THE PREFERRED EMBODIMENTS

Embodiments of the present invention will be described hereinbelow by reference to the accompanying drawings.

(A) Description of a First Embodiment of the Present Invention

Figure 1:
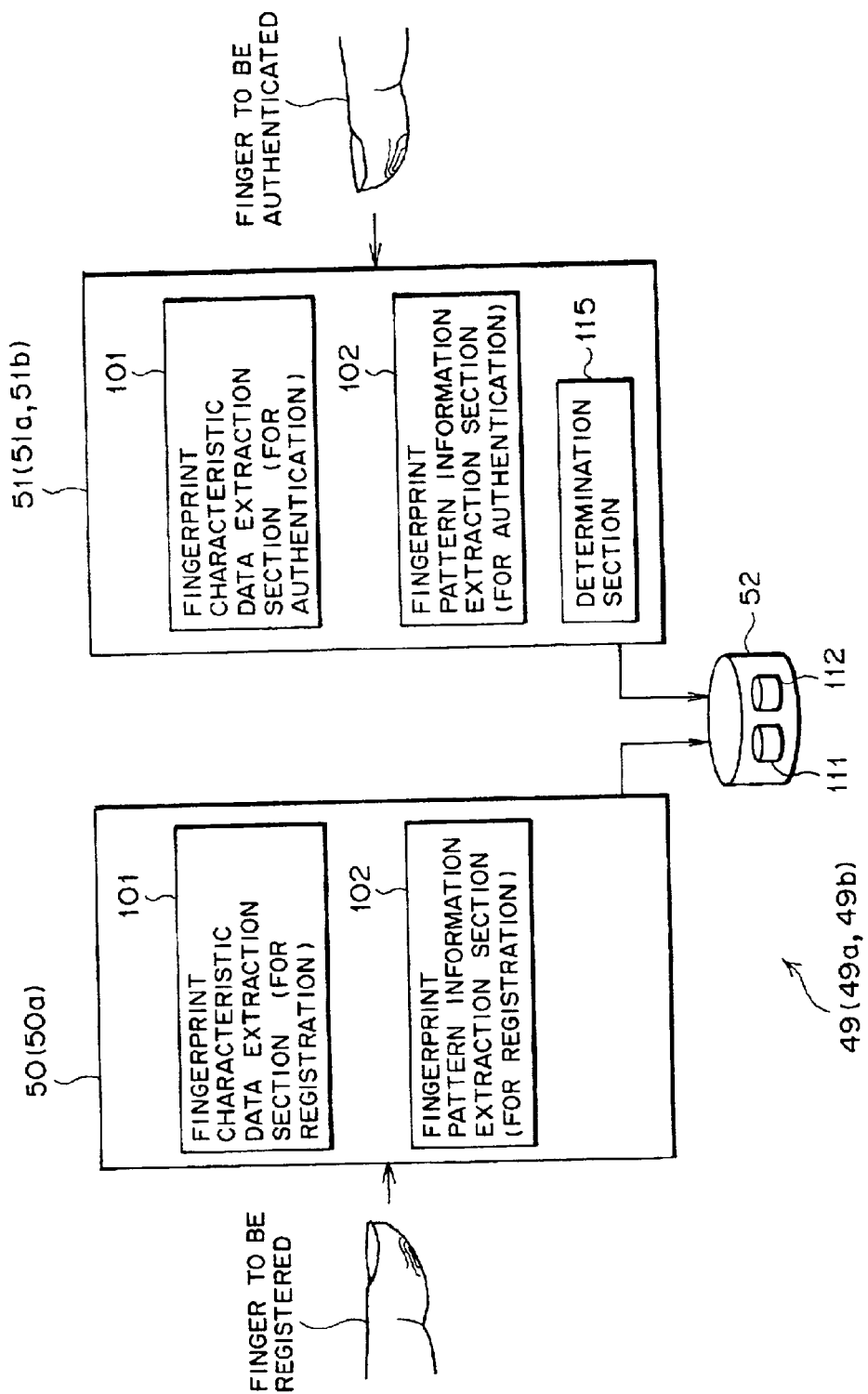
FIG. 1 is a block diagram showing a personal authentication system using fingerprint information according to a first embodiment of the present invention.

FIG. 1 is a block diagram showing a personal authentication system using fingerprint information according to a first embodiment of the present invention. A personal authentication system 49 (hereinafter sometimes called simply "system") shown in FIG. 1 authenticates an individual by use of fingerprint information. The system 49 comprises a storage section 52, a registration apparatus 50, and an authentication apparatus 51.

The storage section 52 holds matching data (e.g., fingerprint elements for matching purpose or matching information) according to the category of fingerprint classification information (or fingerprint pattern information). The storage section 52 has a fingerprint characteristic data storage section (registrant-fingerprint characteristic data storage section) 111 capable of holding registrant fingerprint characteristic data, and a fingerprint pattern information storage section (registrant-fingerprint classification information storage section) 112 capable of holding registrant fingerprint information. Matching data are data to which reference is made at the time of authentication of a person. The matching data are formed by means of linking fingerprint characteristic data to a fingerprint type. Here, the term "category" means a classification category. The function of the storage section 52 is implemented by, for example, a hard disk drive. Information to be held as characteristic data corresponds to the number of and positions of characteristic points of a fingerprint or correlation between characteristic points. Comparison is made as to whether identical information is present. On the basis of this comparison result, a determination is made as to whether or not registered data are equal to data entered for authentication purpose.

As will be described later, the fingerprint characteristic data storage section 111 and the fingerprint pattern information storage section 112 are shared between the storage section 52 and the authentication apparatus 51. In the following description, the storage section 52 will sometimes be called a database 52.

As shown in FIG. 1, a registration apparatus 50a is a modification of the registration apparatus 50. Pieces of authentication apparatus 51a and 51b are modifications of the authentication apparatus 51. Systems 49a and 49b are modifications of the system 49. These modifications will be described in detail in connection with first and second modifications of the first embodiment to be described later.

The registration apparatus 50 produces matching data from the information that has been entered by the fingerprint information input section 100 (i.e., a registration fingerprint information section) (see FIG. 2) for sampling registrant fingerprint information. The thus-produced matching data are written into the storage section 52. Through use of the matching data written in the storage section 52, the authentication apparatus 51 determines a person to be authenticated as a true person, through matching and determination operations.

Figure 2:
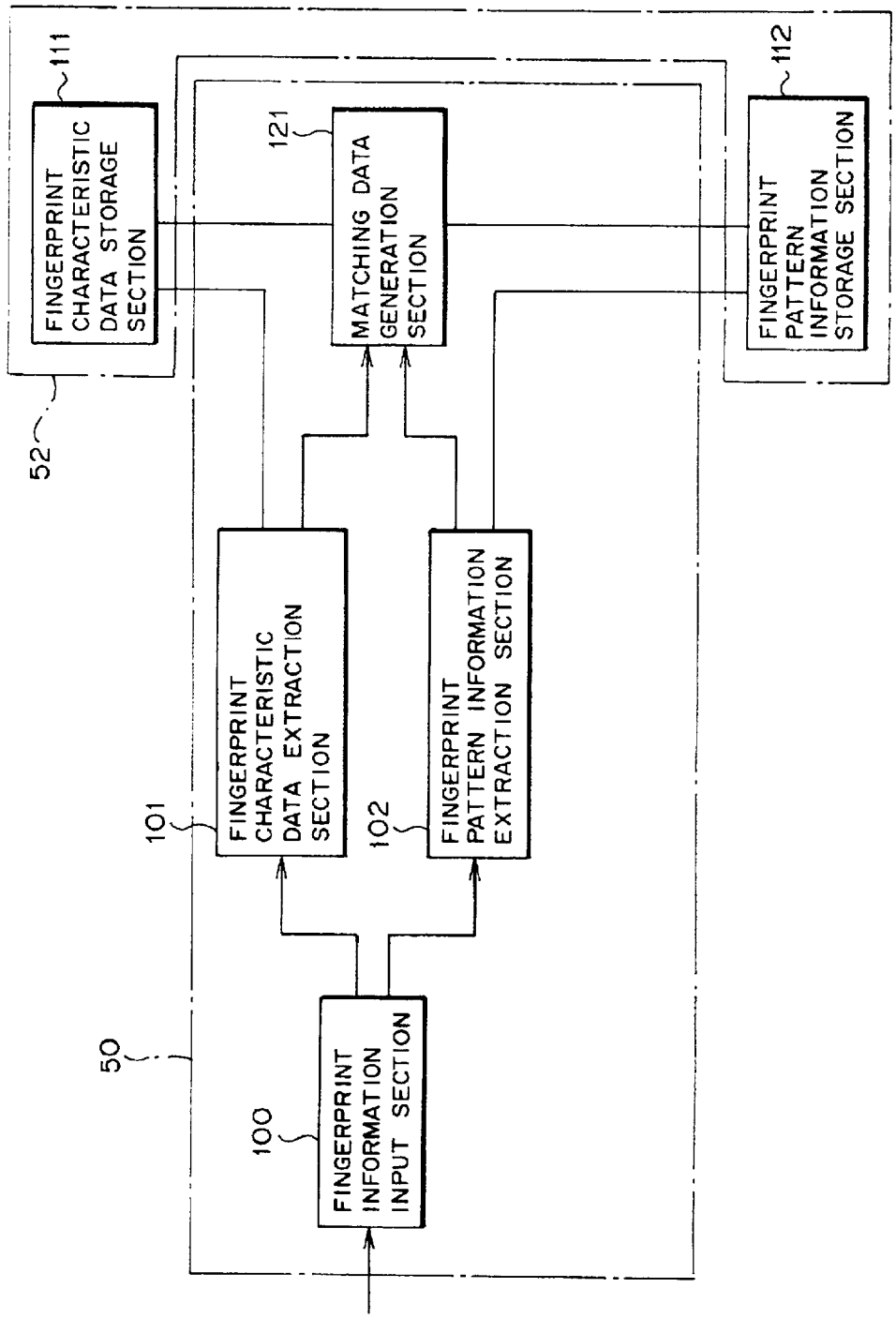
FIG. 2 is a block diagram showing a registration apparatus according to the first embodiment.

FIG. 2 is a block diagram of the registration apparatus 50 according to the first embodiment. In addition to the fingerprint information input section 100, the registration apparatus 50 shown in FIG. 2 comprises a fingerprint characteristic data extraction section (a registrant-fingerprint characteristic data extraction section) 101; a fingerprint pattern information extraction section (a registrant-fingerprint classification information extraction section) 102; and a matching data generation section 121.

The function of the fingerprint information input section 100 is implemented by, for example, a fingerprint scanner (not shown). The fingerprint information input section 100 is used not only for sampling biometric information about a registrant as a fingerprint for registration, but also for inputting a fingerprint for authentication purpose differing from registration data, as will be described later.

The fingerprint characteristic data extraction section 101 extracts registrant fingerprint characteristic data from the registrant fingerprint image captured by the fingerprint information input section 100. The fingerprint pattern information extraction section 102 extracts registrant fingerprint pattern information (registrant fingerprint classification information) from the registrant fingerprint image captured by the fingerprint information input section 100. The matching data generation section 121 writes matching data into the storage section 52 in association with the registrant fingerprint characteristic data and the registrant fingerprint pattern information. The matching data is formed such that the registrant fingerprint characteristic data and the registrant fingerprint classification information are related with each other.

Those elements which are assigned the same reference numerals as those shown in FIG. 2 have identical or similar functions, and repetition of their explanations is omitted.

In accordance with an instruction output from an unillustrated control section, the fingerprint information input section 100 samples a registrant fingerprint image, and the fingerprint characteristic data extraction section 101 extracts registrant fingerprint characteristic data from the thus-captured registrant fingerprint image. Further, the fingerprint pattern information extraction section 102 extracts registrant fingerprint pattern information from the captured registrant fingerprint image and classifies the type of fingerprint pattern.

On the basis of the extracted matching characteristic data and the fingerprint pattern, the matching data generation section 121 links the registrant fingerprint characteristic data to the registrant fingerprint pattern information (or combines the data and the information), thereby producing matching data to be used for authenticating an individual. The matching data are written into the fingerprint characteristic data storage section 111 and the fingerprint pattern information storage section 112.

The two types of matching information storage sections shown in FIG. 2; that is, the fingerprint characteristic data storage section 111 and the fingerprint pattern information storage section 112 are constructed to hold information individually. However, the two types of information pieces are linked together in a one-to-one relationship. These two information are related with each other. Hence, storage of these two types of information pieces can be implemented by use of a single storage device. Use of a single storage device can be applied to personal authentication systems according to first and second modifications of the first embodiment, which will be described later, as well as to a personal authentication system according to a second embodiment of the present invention.

Figure 3:
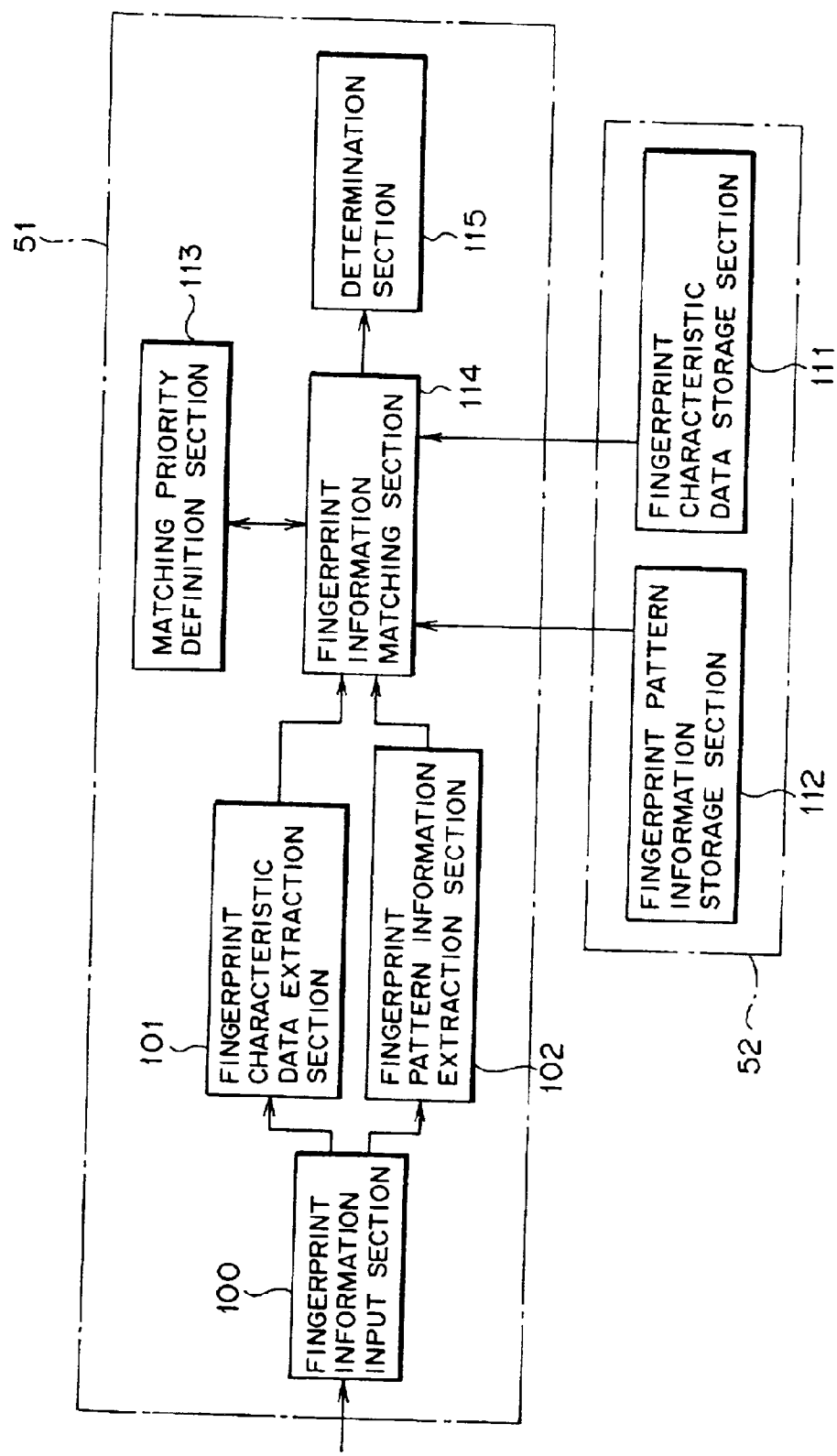
FIG. 3 is a block diagram showing an authentication apparatus according to the first embodiment.

FIG. 3 is a block diagram showing an authentication apparatus 51 according to the first embodiment. In addition to the fingerprint information input section 100, the authentication apparatus 51 shown in FIG. 3 comprises a fingerprint characteristic data extraction section (i.e., person-to-be-authenticated fingerprint characteristic data extraction section) 101, a fingerprint information extraction section (i.e., a person-to-be-authenticated fingerprint classification information extraction section) 102, a matching priority definition section 113, a fingerprint information matching section (matching section) 114, and a determination section 115.

The fingerprint characteristic data extraction section 101 extracts person-to-be-extracted fingerprint characteristic data from a person-to-be-extracted fingerprint image captured by the authentication fingerprint information input section 100 for sampling information about a fingerprint of a person to be authenticated. The fingerprint pattern information extraction section 102 extracts person-to-be-authenticated fingerprint pattern information (person-to-be-authenticated fingerprint classification information) from the person-to-be-authenticated fingerprint image captured by the authentication fingerprint information input section 100.

The fingerprint characteristic data extraction section 101 extracts registrant fingerprint pattern information from an opposite side of a tip-end-side portion of the registrant fingerprint image relative to the core of the fingerprint. Further, the fingerprint pattern information extraction section 102 extracts registrant fingerprint pattern information from the other-side portion of the fingerprint image relative to the core.

Figure 4:
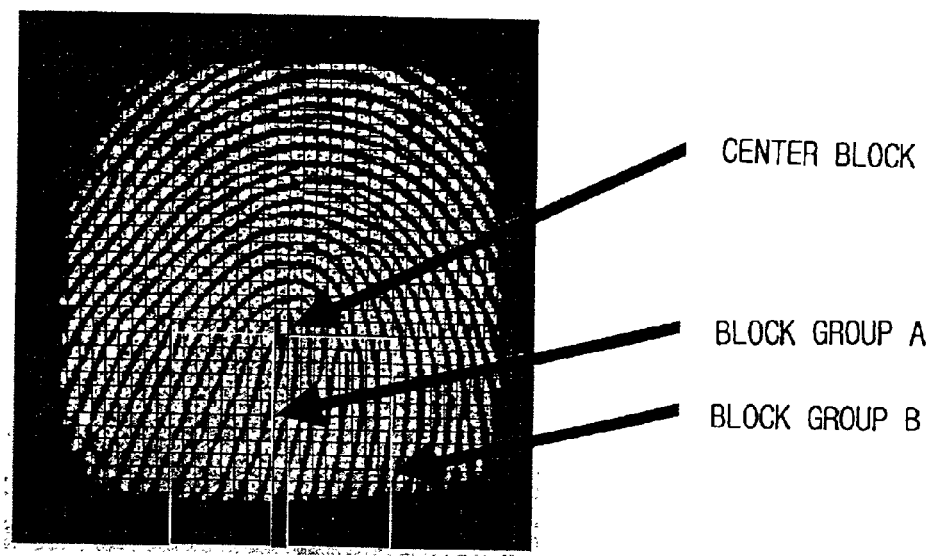
FIG. 4(a) is an illustration for describing extraction of a set of fingerprint characteristic data according to the first embodiment.
FIG. 4(b) is an illustration showing fingerprint waves in a unit block.
Figure 4:

FIG. 4(*a*) is an illustration for describing extraction of fingerprint characteristic data according to the first embodiment. A fingerprint image shown in FIG. 4(*a*) (hereinafter called an "image") is divided into a 40 by 40 matrix [i.e., 1,600 unit blocks (or small blocks)]. Here, a single unit block corresponds to an 8 by 8 matrix of pixels. The reason for employing the number of pixels is that each of the unit blocks enables determination of direction of local orientation of a fingerprint wave.

Figure 6:
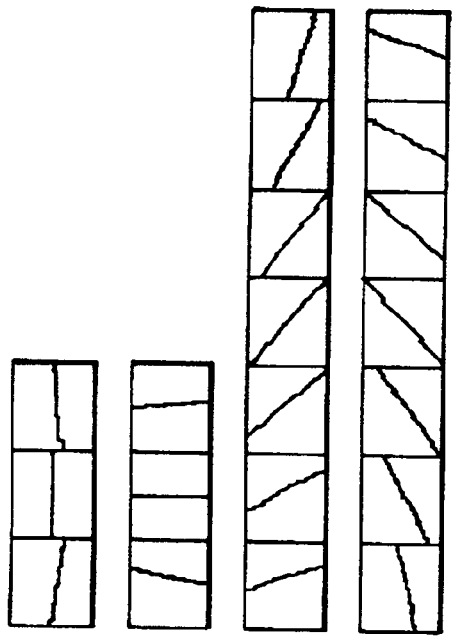
FIGS. 6(a) through 6(d) are illustrations for describing directions according to the first embodiment.

FIG. 4(*b*) is an illustration showing fingerprint waves in a unit block. The unit block shown in FIG. 4(*b*) corresponds to an 8 by 8 matrix of pixels. A fingerprint wave is depicted on an image level. The direction in which the fingerprint wave is oriented is also called a direction. The direction in which a fingerprint wave is oriented locally signifies the direction of a unit block. Examples of direction are shown in FIGS. 6(*a*) through 6(*d*). In the following description, a right-oriented direction is often called a right-looped direction; a left-oriented direction is often called a left-looped direction; a wave-oriented direction is often called a wave direction; a direction of whorl is often called a whorl direction; a direction of horizon is often called a horizontal direction; and a direction of vertical is often called a vertical direction.

In a case where an input image is, for example, a 320 by 320 matrix of pixels and where a clear fingerprint pattern appears in the image, the input image is divided into unit blocks corresponding to an 8 by 8 matrix of pixels. Further, even when one unit block alone can determine a local direction.

From among the 1,600 unit blocks shown in FIG. 4(a), two core blocks are specified from the unit blocks located below the core of the fingerprint (i.e., the coordinates of the center of the fingerprint).

The core block is an aggregation of unit blocks and also called a block group. FIG. 4(a) shows two core blocks, as if they were two windows. A fingerprint pattern is determined on the basis of the proportion of directions of unit blocks constituting the core blocks.

As a result, a fingerprint pattern is determined on the basis of core blocks.

In the following description, the core blocks are called a block group A and a block group B, respectively. With regard to a unit block including the coordinates of center of a fingerprint (hereinafter called a "center unit block" or a "center block"), a core block is generated by means of specifying a plurality of unit blocks located a certain distance from the center block at the other side of the same.

In the following description, an input image having a 320 by 320 matrix of pixels is divided into an 8 by 8 matrix of unit pixels, whereby the pattern of the input image is determined. In a case where a fingerprint pattern is not clearly shown in the image, the size of a single unit block can be changed to the number of pixels for which a direction can be identified, on the basis of the size of the image or the geometry of a fingerprint within the image. In other words, in accordance with the circumstances in which the fingerprint has been captured, the input image having a 320 by 320 matrix of pixels can be divided into unit blocks, each block having pixels which are equal in number to a factor (2, 4, 5, 10, etc.) of 320.

In accordance with the number of pixels of the image entered by the fingerprint information input section 100, the number of blocks into which the input image is to be divided is changed. For example, when an image having a 300 by 300 matrix of pixels is input, the number of pixels cannot be divided by an 8 by 8 matrix of pixels. In this case, the image is divided into 900 unit blocks, each block having a 10 by 10 matrix of pixels, whereby the pattern of the input image is determined.

The fingerprint pattern information extraction section 102 (see FIG. 2) selects a block group in accordance with the type of a pattern. When determining, e.g., a wave-type pattern, the fingerprint pattern information extraction section 102 uses a different block group. Further, when determining a whorl-type pattern, the fingerprint pattern information extraction section 102 uses another block group. Determination of a wave-type pattern will be described by reference to FIG. 19, and determination of a whorl-type pattern will be described by reference to FIG. 21.

Figure 5:
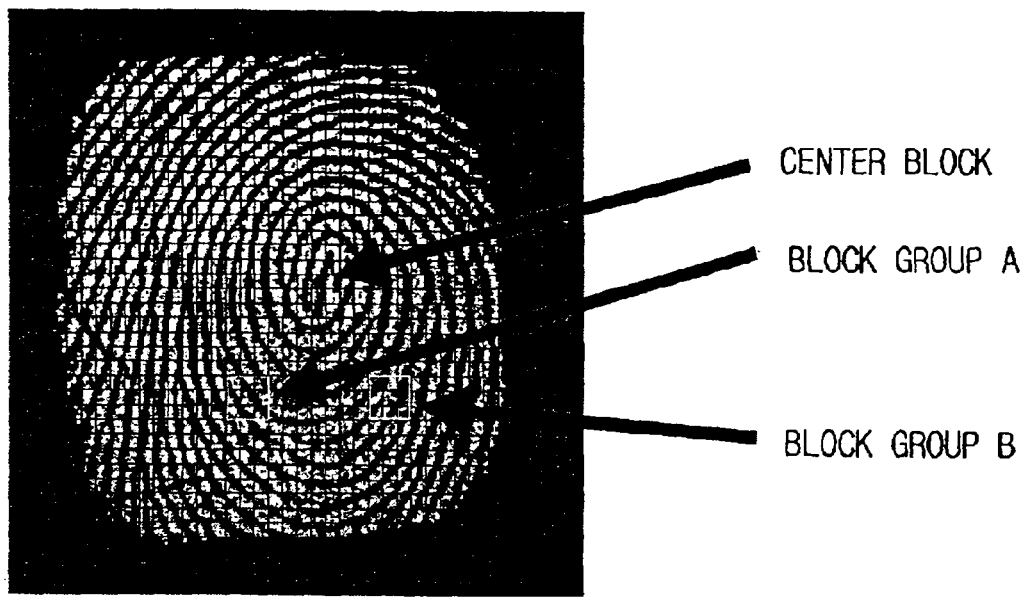
FIG. 5 is an illustration for describing extraction of another set of fingerprint characteristic data according to the first embodiment.

FIG. 5 is an illustration for describing extraction of another set of fingerprint characteristic data according to the first embodiment of the present invention. The image shown in FIG. 5 shows block groups A and B to be used for determining the type of a pattern as a whorl type. Even in this case, the area of a fingerprint lower than the center thereof is utilized.

The reason for this is that the area of a fingerprint above the center thereof is similar to that of other fingerprints, regardless of pattern type. Hence, the upper area of a fingerprint is not suitable for determining a pattern. Hence, even when a fingerprint image of wide area indispensable for classifying a pattern cannot be captured, the pattern of the fingerprint can be determined if only the area of the fingerprint lower than the center thereof is used.

When the system 49 determines the pattern of a fingerprint, the fingerprint pattern information extraction section 102 detects the coordinates of the center of the fingerprint from an image (a center detection step). The image is divided into, e.g., 1,600 unit blocks (a division step). Of the thus-divided 1,600 unit blocks, the center unit block having the coordinates of the detected center of the fingerprint is recognized (a recognition step). The fingerprint pattern information extraction section 102 generates two block groups around the thus-recognized center unit block so as to include a plurality of unit blocks located at a portion of an opposite side of the tip end side relative to the center unit block (a block group generation step). With regard to the orientation of a local fingerprint wave (i.e., a local direction), a plurality of unit blocks constituting the thus-generated block group are determined (a unit block orientation determination step). Fingerprint pattern information is determined on the basis of the thus-determined orientation of the fingerprint wave (a fingerprint classification information determination step).

The method of extracting fingerprint characteristic data shown in FIG. 4(a) and FIG. 5 is used for the first and second modifications of the first embodiment and a second embodiment, which will be described later.

As mentioned above, the direction of a fingerprint pattern is determined by means of paying attention to the directions in the specific region (core block) located below the center of the fingerprint. Even when an input image is not completely reproduced and correct determination of a fingerprint pattern is impossible, the method yields an advantage of the ability to match the pattern with a pattern of high priority.

Depending on the positional relationship between the block group A and the block group B shown in FIG. 4(a), a block group to be used for determining the pattern of the fingerprint is selected. The orientations of fingerprint waves in respective unit blocks included in the block group are classified into four categories; that is, a right-looped direction, a left-looped direction, a vertical direction and a horizontal direction. A unit block having no fingerprint image is excluded.

The types of directions detected from the fingerprint waves of the respective unit blocks (each block having an 8 by 8 matrix of pixels) will be described by reference to FIGS. 6(a) to 6(d).

FIGS. 6(a) through 6(d) are illustrations for describing the directions according to the first embodiment, showing a horizontal direction, a vertical direction, a right-looped direction, and a left-looped direction. The twenty direction patterns shown in FIGS. 6(a) through 6(d) are used for classifying orientations of the fingerprint waves.

The fingerprint pattern of the input image is compared with the direction patterns. Attention is paid to a fingerprint wave in the specific region located below the center of the fingerprint, thereby roughly determining a pattern type.

Matching operation using such a direction pattern is used even in the first and second modifications of the first embodiment and a second embodiment, which will be described later.

As shown in FIGS. 2 and 3, use of the registrant fingerprint characteristic data extraction section of the registration apparatus 50 and the person-to-be-authenticated fingerprint characteristic data extraction section of the authentication apparatus 51 is shared. Further, use of the registrant fingerprint pattern information extraction section of the registration apparatus 50 and the person-to-be-authenticated fingerprint pattern information extraction section of the authentication apparatus 51 is shared. Shared use of these sections realize reduction in costs of the apparatus of the system 49.

The matching priority definition section 113 (see FIG. 3) is capable of outputting a matching priority for each of the matching data groups that have been classified on the basis of the registrant fingerprint pattern information. The function of the matching priority definition section 113 is embodied by, e.g., memory (not shown). The matching priority definition section 113 is arranged to retain, as matching data, the matching data formed by linking the registrant fingerprint pattern information to a matching priority.

Even if the input image fails to be reproduced completely and the pattern of the input image cannot be determined correctly, the image can be checked against matching data of high matching priority.

The classified pattern is assigned a matching priority and is sequentially checked against matching data until a match is found. Even when matching of the pattern is not necessarily effected, the person can be authenticated without fail. Unnecessary matching can be minimized, thereby significantly saving efforts of computation and enabling efficient matching.

By means of a program provided in the fingerprint information matching section 114 to be described later, a matching priority is assigned to each of pattern types at the time of determination of a matching result; e.g., a right-looped type is assigned a first matching priority, a whorl type is assigned a second matching priority, and the like. The thus-defined matching priorities are held in the matching priority definition section 113. Details of the method for assigning a matching priority will be described by reference to FIGS. 22 through 25.

By means of the matching priorities, a fingerprint can be matched through use of matching priorities and without involvement of round-robin matching, thereby enabling a significant curtailment of computation.

On the basis of the person-to-be-authenticated fingerprint characteristic data, the person-to-be-authenticated fingerprint pattern information and matching priorities, the fingerprint information matching section 114 checks the person-to-be-authenticated fingerprint characteristic data against the registrant fingerprint characteristic data, thereby outputting a matching result. When a rate of match between matching data and the stored fingerprint characteristic data has exceeded a previously-defined given match rate, the fingerprint information matching section 114 authenticates the person.

When checking the fingerprint characteristic data by use of the matching priority definition, the fingerprint information matching section 114 checks the fingerprint characteristic data by means of sequentially changing matching data in descending order of matching priority from the highest priority. When the fingerprint characteristic data are checked against matching data of lower priority or a pattern of low match rate, the fingerprint information matching section 114 can interrupt authentication operation.

A desired degree of strictness or accuracy can be set by means of changing the previously-defined given match rate. Either precise matching or speed-prioritized matching can be selected, as required.

On the basis of a matching result, the determination section 115 (see FIG. 3) determines a person as an authenticated person or a different person. Factoring in the person-to-be-authenticated fingerprint pattern information extracted by the fingerprint pattern information extraction section 102, the determination section 115 determines the person as an authenticated person or a different person. Further, the determination section 115 determines the person as an authenticated or a different person, by means of taking, as a matching result, the match rate output from the fingerprint information matching section 114. In other words, the determination section 115 acts as an authenticated person determination section which determines the person as authenticated or not, by use of the match rate computed by the fingerprint characteristic data matching section 114.

When the determination section 115 cannot determine the person as authenticated or not until the matching operation of predetermined matching priority is finished, the fingerprint information matching section 114 limits authentication of matching priority lower than a predetermined matching priority level.

As a result, when the fingerprint has come to be checked against a pattern of low matching priority and low hit rate, authentication is interrupted, thus enabling efficient authentication operation.

The matching priority definition section 113 is embodied by memory or a hard disk drive. The function of the fingerprint information matching section 114 and that of the determination section 115 are implemented by means of a CPU (central processing unit) executing a program stored in a hard disk drive.

The elements which are assigned the same reference numerals as those shown in FIG. 3 have identical or similar functions, and repetition of their explanations is omitted.

To construct the system 49, a system operator prepares a software program (program) using a personal computer or workstation, as well as desired hardware equipment. The system operator may construct a system at another location through use of a hard disk drive (recording medium) of a personal computer or workstation which has a program installed therein. In addition, the system operator may distribute recording medium, such as a hard disk drive (not shown) having a program stored therein or a CD-ROM (compact disc read only memory) having a program recorded thereon. There may be a case where the system operator handles a personal computer or workstation as the registration apparatus 50 or the authentication apparatus 51.

The program recorded on a computer-readable recording medium according to the present invention which employs, for example, a hard disk drive unit or CD-ROM is for causing a computer to be used as the system 49 to serve as the person-to-be-authenticated fingerprint pattern characteristic data extraction section 101 for extracting person-to-be-authenticated fingerprint characteristic data from a person-to-be-authenticated finger print image captured from the person to be authenticated; the person-to-be-authenticated fingerprint pattern information extraction section 102 for extracting person-to-be-authenticated fingerprint pattern information from the person-to-be-authenticated fingerprint image; the matching priority definition section 113 capable of outputting a matching priority for each of the matching data groups classified on the basis of the registrant fingerprint pattern information; and the matching section 114 for checking the person-to-be-authenticated fingerprint characteristic data against the registrant fingerprint characteristic data in accordance with the person-to-be-authenticated fingerprint characteristic data, the person-to-be-authenticated fingerprint pattern information, and the matching priority.

The function of the person-to-be-authenticated fingerprint pattern characteristic data extraction section 101, the function of the person-to-be-authenticated fingerprint pattern information extraction section 102, the function of the matching priority definition section 113, and the function of the matching section 114 are implemented, by means of the CPU of the computer executing the program recorded in a hard disk drive (not shown) of the computer.

Installation of the program into the personal computer or workstation is realized by means of installing the program into a hard disk drive through use of a CD-ROM drive, a CD-R (CD-Recordable) drive, a CD-RW (CD-Rewritable) drive, or a floppy disk drive, which belong to the computer, or by means of downloading the program from a network.

The computer-readable recording medium having the program recorded thereon and the installation method can be employed in the same manner in any of the first and second modifications of the first embodiment and the second embodiment, which will be described later.

Use of the computer-readable recording medium having the program recorded thereon enables easy installation of the program into a computer and efficient construction of a system which authenticates an individual by use of fingerprint information.

The fingerprint characteristic data extraction section 101 extracts person-to-be-authenticated fingerprint characteristic data from the fingerprint captured by the fingerprint information input section 100. The fingerprint pattern information extraction section 102 extracts person-to-be-authenticated fingerprint pattern information from the captured fingerprint. The data and the information are input to the fingerprint information matching section 114. The matching priority definition section 113 outputs a matching priority for each of the matching data groups classified on the basis of the registrant fingerprint pattern information.

The fingerprint information matching section 114 reads the data from the fingerprint characteristic data storage section 111 and the information from the fingerprint pattern information storage section 112. The person to be authenticated is authenticated on the basis of the data, the information, the person-to-be-authenticated fingerprint characteristic data, the person-to-be-authenticated fingerprint pattern information, and the matching priority. The result of matching (i.e., a match rate) is output. On the basis of the matching result, the determination section 115 determines the person as an authenticated person or as a different person.

As mentioned above, at the time of registration of fingerprint characteristic data, a matching priority is defined. The fingerprint characteristic data and the fingerprint pattern information are stored in separate devices individually. Hence, the data and the information are used for matching while the matching priority is being assigned.

The user of the system 49 performs registration and authentication operations in the following manner. The registration and authentication method for the personal authentication system using fingerprint information according to the present invention is to be used for the system 49 which authenticates an individual by use of fingerprint information.

First, registrant fingerprint characteristic data are extracted from the captured registrant fingerprint image (a first extraction step). The registrant fingerprint characteristic data extracted in the first extraction step are written into the storage section 52 capable of retaining data (a registrant fingerprint characteristic data registration step).

Registrant fingerprint pattern information is extracted from the registrant fingerprint image (a second extraction step). The registrant fingerprint pattern information extracted in the second extraction step is written into the storage section 52 (a registrant fingerprint classification information registration step).

The matching data are written into the storage section 52, the matching data is formed such that the registrant fingerprint characteristic data and the registrant fingerprint pattern information are related with each other (a matching data registration step). The matching data are extracted from the storage section 52 (a matching data extraction step), and the person-to-be-authenticated fingerprint characteristic data are extracted from the person-to-be-authenticated fingerprint image captured (a third extraction step).

Subsequently, the person-to-be-authenticated fingerprint pattern information is extracted from the person-to-be-authenticated fingerprint image (a fourth extraction step). A matching priority is output for each of the matching data groups classified on the basis of the registrant fingerprint classification information (a matching priority definition step). On the basis of the person-to-be-authenticated fingerprint characteristic data, the person-to-be-authenticated fingerprint classification information, and the matching priority, the person to be authenticated is determined as a true person or not, by means of matching and determination (a matching-and-determination step).

The registration and authentication method for a personal authentication system is used in the same manner in the first and second modifications of the first embodiment and the second embodiment, which will be described later.

As mentioned above, during the course of personal authentication by use of a fingerprint pattern, the authentication apparatus 51 performs matching of a fingerprint against a pattern in consideration of its matching priority. Even when a complete match does not exist between the pattern of the fingerprint input for authentication and the pattern of the registered data for matching purpose, matching can be performed without fail. Since a matching priority is taken into consideration, strict determination of a fingerprint pattern is obviated.

The registration and authentication method for use with the personal authentication system according to the present invention which has the foregoing construction and employs fingerprint information will be described in detail by reference to FIGS. 3 through 25.

At the time of authentication of a person by use of a fingerprint, even when a fingerprint image of wide area sufficient for strictly determining a fingerprint cannot be captured, the registration-and-authentication method according to the present invention enables determination, within a determinable range, of a pattern type from the input fingerprint image in its unmodified form. Even when no match exists between the registrant fingerprints and the fingerprint of the person to be authenticated, authentication time is lessened to the greatest possible extent, by means of a matching priority assigned to each pattern type.

Figure 7:
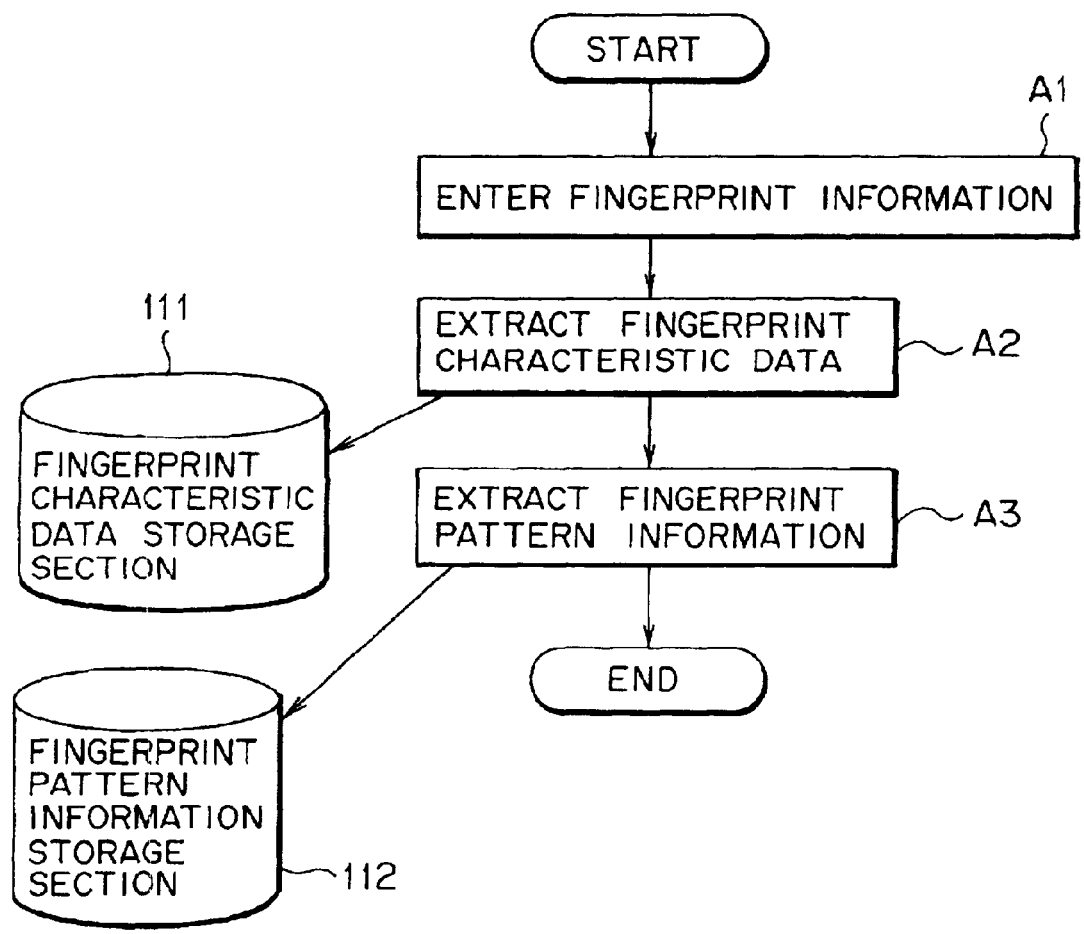
FIG. 7 is a flowchart showing procedures for registering data for matching purposes according to the first embodiment.

FIG. 7 is a flowchart showing matching data registration procedures according to the first embodiment. First, fingerprint information is input (step A1), and finger pattern characteristic data are extracted from the fingerprint characteristic data storage section 111 (step A2). Further, fingerprint pattern information is extracted from the fingerprint pattern information storage section 112 (step A3).

Figure 8:
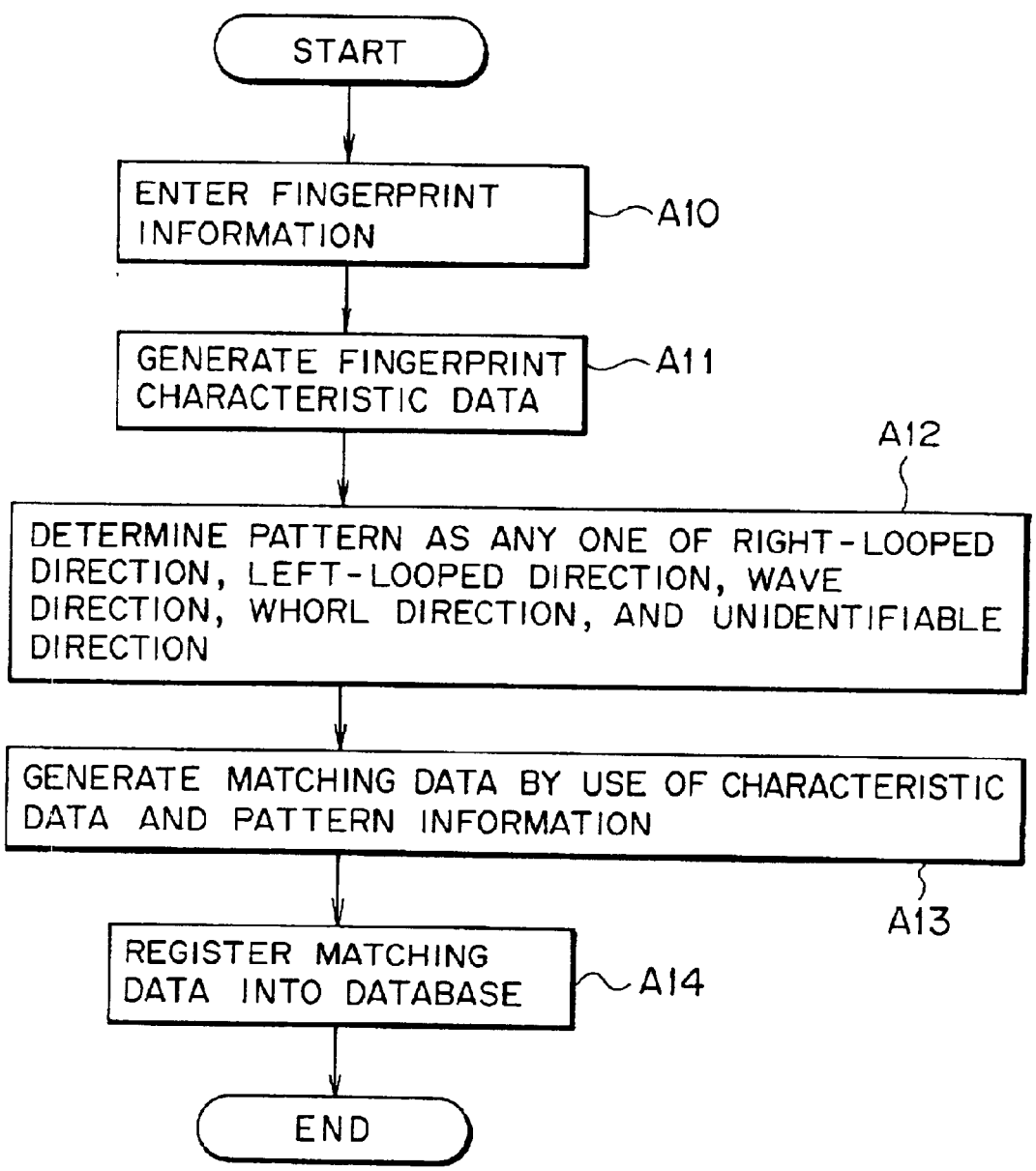
FIG. 8 is a flowchart showing procedures for producing matching information according to the first embodiment.

FIG. 8 is a flowchart showing procedures for producing matching information according to the first embodiment. When fingerprint information is input (step A10), fingerprint characteristic data are produced (step A11). The pattern of the input fingerprint is classified into any of the five categories; that is, a pattern of right-looped type, a pattern of left-looped type, a pattern of wave type, a pattern of whorl type, and an unidentifiable pattern (step A12). There are produced matching data which link the fingerprint characteristic data to the fingerprint information (step A13). The thus-produced matching data are registered in the database (storage section) 52 (step A14).

Figure 9:
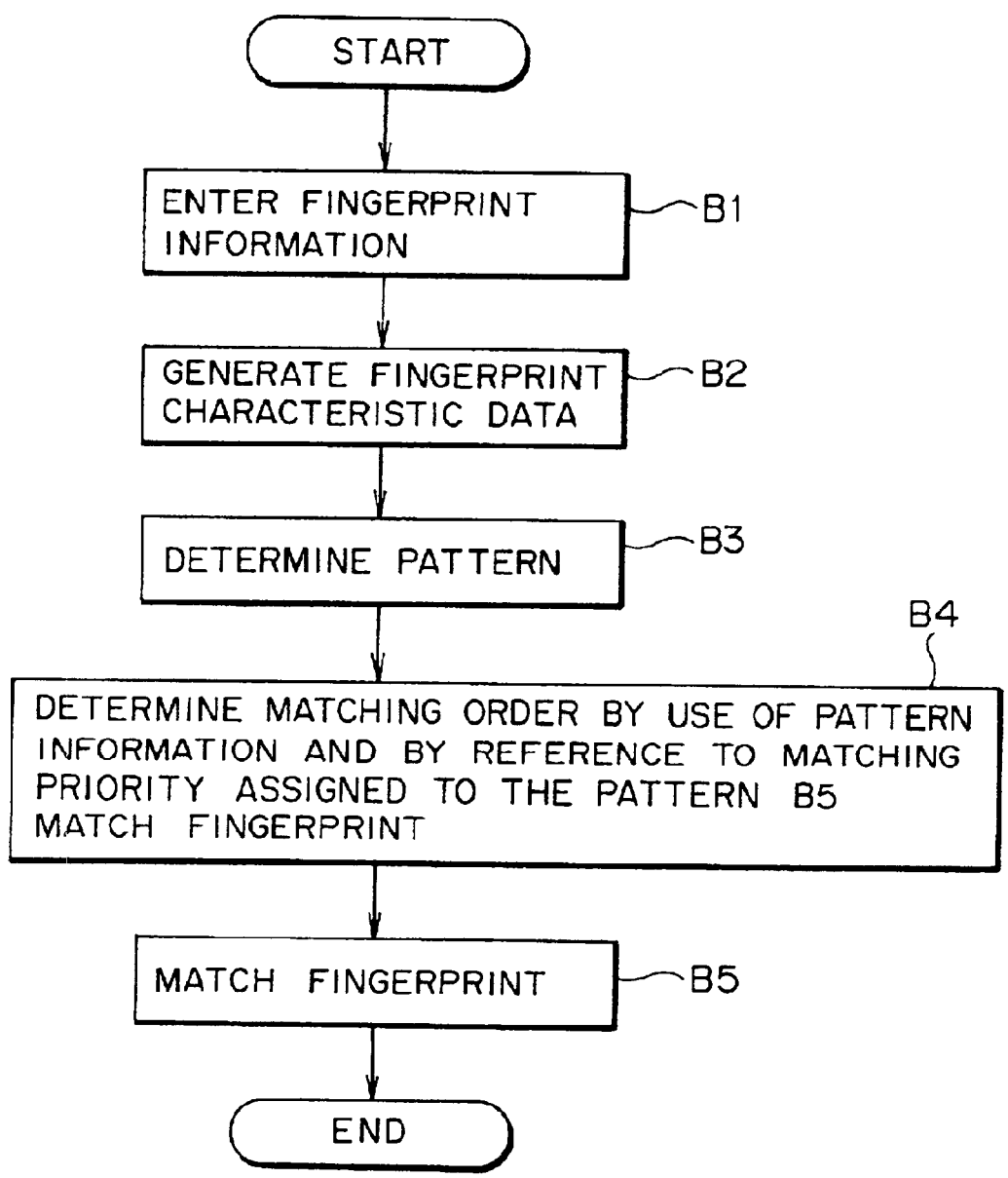
FIG. 9 is a flowchart showing the outline of matching procedures according to the first embodiment.
Figure 10:
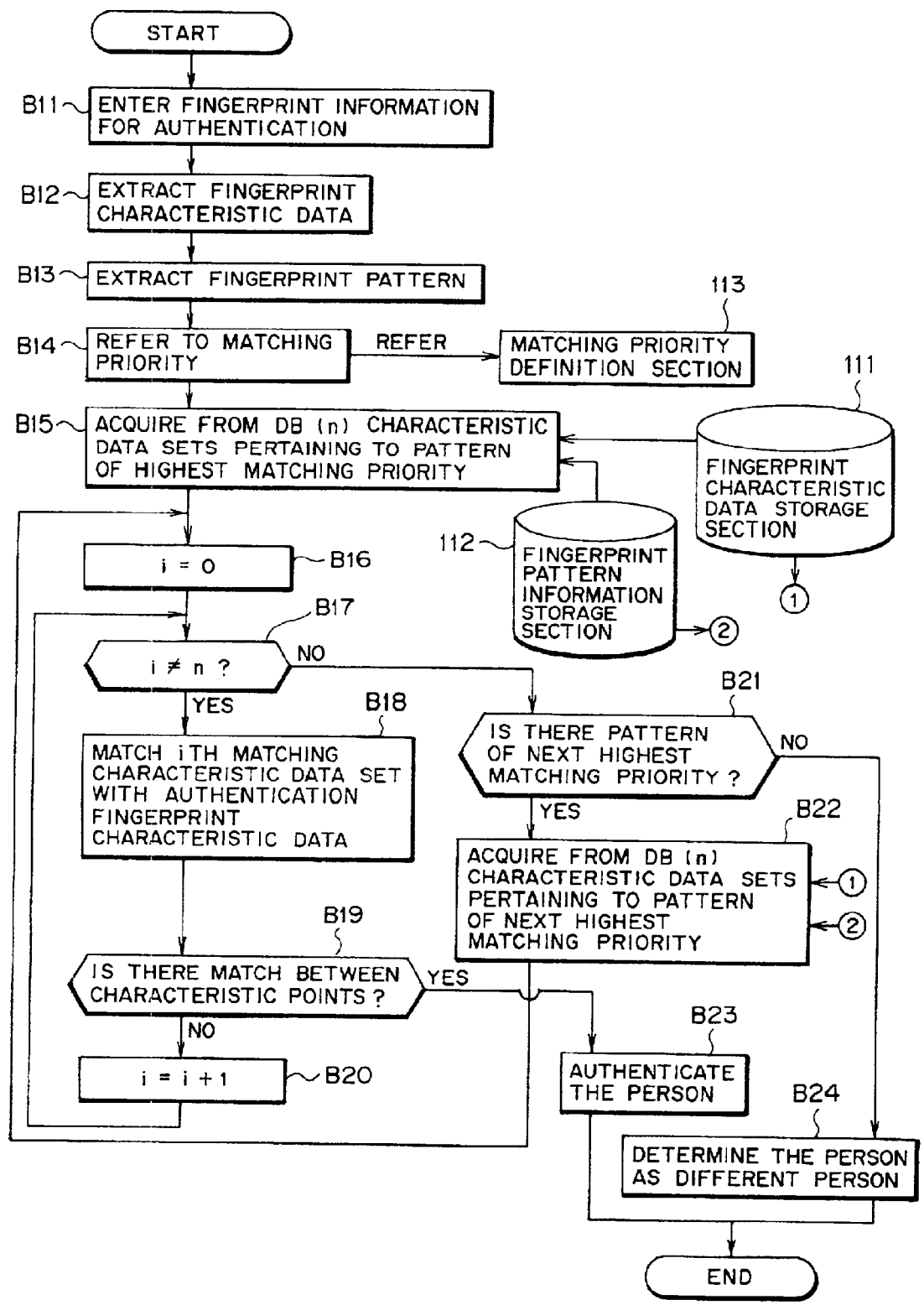
FIG. 10 is a flowchart showing the matching procedures according to the first embodiment.
Figure 11:
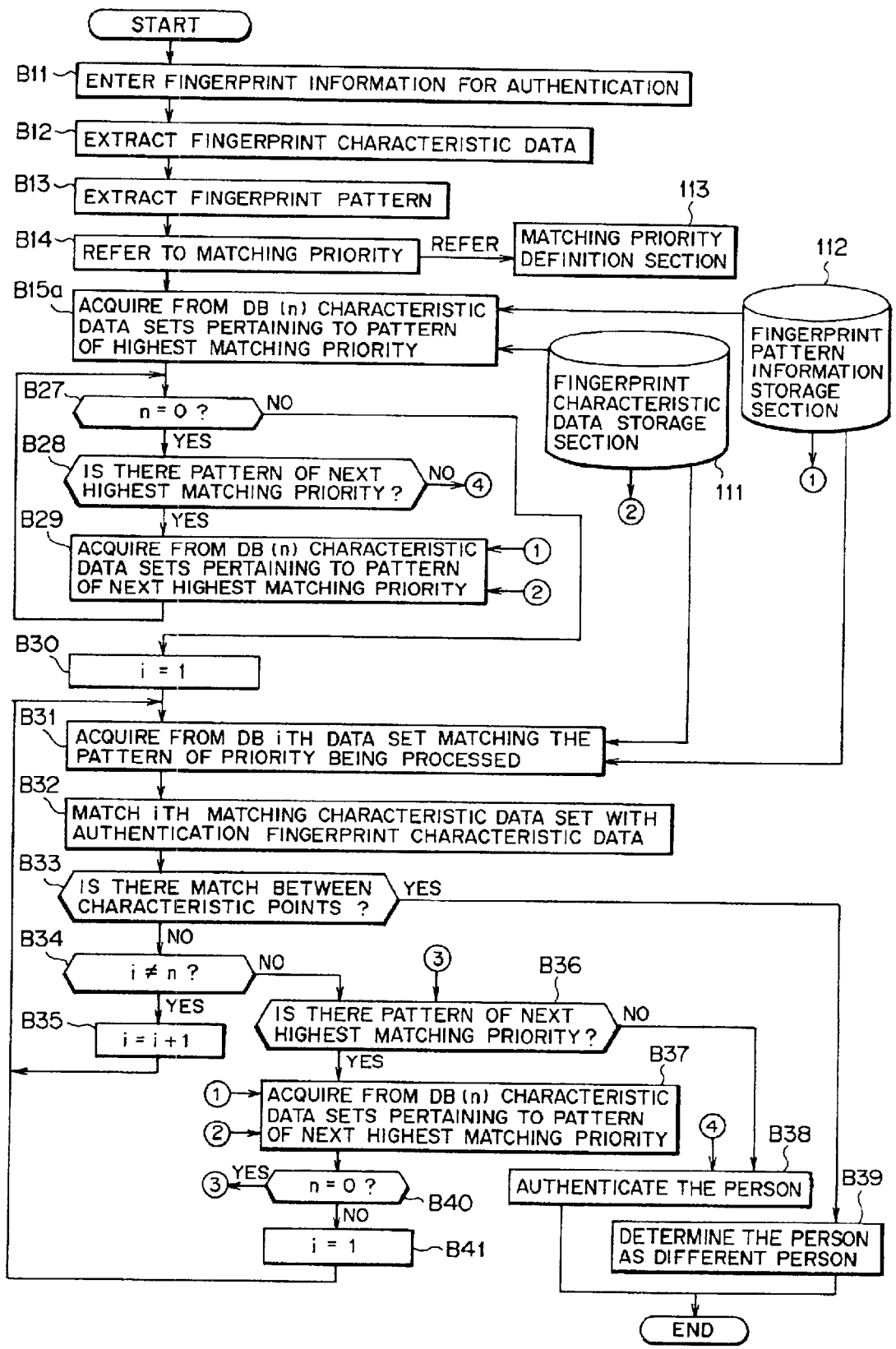
FIG. 11 is a flowchart showing another matching procedure according to the first embodiment.

FIG. 9 shows the outline of matching procedures, and FIGS. 10 and 11 show details of the matching procedures.

FIG. 9 is a flowchart showing the outline of matching procedures according to the first embodiment. When fingerprint information is input (step B1), fingerprint characteristic data are produced (step B2), and a pattern of the fingerprint is determined (step B3). A matching priority assigned to the thus-determined pattern is referred to, and a matching sequence is determined through use of the pattern information (step B4), whereby a fingerprint is matched (step B5).

FIG. 10 is a flowchart showing the matching procedures according to the first embodiment, showing matching operation of the authentication apparatus 51 (see FIG. 3).

First, fingerprint information for authentication purpose is captured (step B11), and fingerprint characteristic data are extracted (step B12). The pattern of the input fingerprint is extracted (step B13). The thus-extracted pattern is classified into any one of the five categories; that is, a pattern of right-looped type, a pattern of left-looped type, a pattern of wave type, a pattern of whorl type and a pattern of unidentifiable type. The thus-categorized pattern is retained as an element for authentication. The input fingerprint is authenticated and matched, by means of the matching priority definition section 113 referring to the previously-defined matching priorities in a highly determinable sequence for each characteristic of certain pattern determination operation (step B14).

From the pattern of the fingerprint image input for authentication purpose, a matching priority may be determined at the time of matching being performed, through use of the matching priority determination method shown in FIGS. 25 through 30, which will be described later.

Next, "n" sets of the matching fingerprint data group belonging to the patterns of highest matching priority are captured from the database having matching characteristic data written therein (DB or the storage section 52 including the fingerprint characteristic data storage section 111 and the fingerprint pattern information storage section 112) (step B15). Alternatively, processing pertaining to steps B16 through B20 is repeated. Here, "n" is an integer of 0 or more and represents the number of registered fingerprint data sets belonging to one matching fingerprint data group. The fingerprint characteristic data storage section 111 and the fingerprint information storage section 112 are referred to in step B15 and a step B22 to be described later.

For instance, a FOR loop statement assumes an initial value of 0 (step B16). In step B17, if the number of loops is less than "n", YES is selected. In step B18, the $i^{th}$ set of characteristic data for matching purpose (where "i" is an integer of greater than 0 and smaller than "n") is compared with the fingerprint characteristic data for authentication purpose. For determining whether or not a match exists between the characteristic points, reference is made to the database 52 (step B19). If the a matching set of fingerprint data is found, YES is selected, and the person is authenticated (step B23). Further, an "authenticated" is output as the matching result.

If a coincident set of fingerprint data for matching does not exist in the matching fingerprint data group of patterns of the highest matching priority, NO is selected. Then, "i" is counted up (step B20), and processing pertaining to step B17 and that pertaining to subsequent steps are repeated.

When loop processing is completed in step B17, NO is selected. In step B21, a determination is made as to whether or not patterns of the next matching priority are present. If there are patterns of the next matching priority, YES is selected. In step B22, "n" fingerprint characteristic data groups of patterns of the second highest matching priority (where "n" is the same as that mentioned above) are selected from the fingerprint characteristic data storage section 111 (assigned ① in FIG. 10) and the fingerprint pattern information storage section 112 (assigned ② in FIG. 10). Then, processing pertaining to step B16 and that pertaining to subsequent steps are repeated. In step B21, if there are no patterns of the next matching priority, NO is selected, and a determination is made that the person is not authenticated (step B24).

In each of steps B15 and B22, data sets matching the pattern assigned the priority are collectively loaded to the memory from the database 52 having matching data sets stored therein. The person-to-be-authenticated fingerprint pattern is matched against the thus-loaded data. For example, if 100 matching data sets match the pattern being processed, the 100 data sets are loaded into the memory by one operation, and the data sets are sequentially matched against the pattern within the memory.

The matching fingerprint characteristic data groups matching the pattern are acquired from the database 52 having the matching fingerprint characteristic data set written therein. Every time a fingerprint is authenticated, the database 52 is referred to, and the fingerprint characteristic data sets for authentication are compared with and checked against the fingerprint.

In a case where data sets matching the authentication data are present in both the registered data for matching pertaining to patterns of high matching priority and the registered data for matching pertaining to patterns of low matching priority and where the match rate of the registered data set of low matching priority exceeds that match rate of the registered data set of high matching priority, a determination as to authentication of the person is made on the basis of the matching priority and the match rate. In other words, the person is authenticated by either the registered data set of low matching priority or the registered data set of high matching priority.

For instance, in a case where a required match rate is 70%, where a data set for matching and registration pertaining to patterns of first priority assumes a match rate of 75%, and where a data set for registration and matching pertaining to patterns of fifth priority assumes a match rate of 75% or more, there is a very low possibility that the data set pertaining to the patterns of fifth priority will be employed. Hence, the data sets pertaining to the patterns of first priority can be employed for authenticating a person.

Thus, a person can be authenticated on the basis of the matching priority and a match rate.

FIG. 11 is a flowchart showing other matching procedures according to the first embodiment. The matching procedures shown in FIG. 11 are for making reference to the database 52 with regard to matching data whose priority matches the priority of the pattern being processed, every time matching is performed.

Processing pertaining to steps B11 through B14 is identical with that shown in FIG. 10. In step B15a, "n" characteristic data sets pertaining to patterns of the highest priority are fetched from the fingerprint characteristic data storage section 111 and the fingerprint pattern information storage section 112. A determination is made as to whether or not "n" is 0 (step B27). When "n" is 0, YES is selected, and a determination is made in step B28 as to whether or not there are patterns of the next highest priority. If there are patterns, YES is selected. In step B29, "n" characteristic data sets pertaining to patterns of the next highest matching priority are fetched from the database 52, and processing returns to step B27.

If "n" does not assume 0 in step B27, NO is selected, and processing proceeds to step B30. If no patterns of the next highest matching priority are present in step B28, NO is selected (assigned ④ in FIG. 11), and processing pertaining to step B38 to be described later is performed.

In step B30, the loop assumes an initial value of 1. In step B31, the $i^{th}$ data set matching the priority of the pattern being processed is fetched from the database (i.e., the storage section 52 including the fingerprint characteristic data storage section 111 and the fingerprint pattern information storage section 112). Of the matching fingerprint data group belonging to the patterns of the highest matching priority, "n" data sets are fetched from the database (DB) 52.

In step B32, the $i^{th}$ characteristic data set for matching is checked against the fingerprint characteristic data set for authentication. In step B33, a check is made as to whether or not a match exists between the characteristic points. If there is a match, YES is selected, and the person is authenticated (step B39). In contrast, if no match exists in step B33, NO is selected. In step B34, a check is made as to whether or not matching of all the patterns pertaining to the "n" data sets has been completed. If the matching has not yet been completed, YES is selected. In step B35, "i" is incremented, and processing pertaining to step B31 and processing to subsequent steps are repeated. Here, "n" is identical with that mentioned previously.

In step B34, if matching of all the patterns pertaining to the "n" data sets has already been completed, NO is selected. In step B36, a check is made as to whether or not there are patterns of the next highest matching priority. If no patterns are present, NO is selected. In step B38, the person is not authenticated, and processing is terminated. In contrast, if there are patterns of the next highest matching priority in step B36, YES is selected. In step B37, "n" fingerprint characteristic data sets pertaining to the patterns of the next highest matching priority are obtained from the database 52, and a check is again made as to whether or not "n" assumes a value of 0 (step B40). If "n" assumes a value of 0, YES is selected and processing proceeds to step B36. In contrast, if "n" does not assume a value of 0, NO is selected, "i" is set to 1 (step B41), and processing returns to step B31.

Thus, data sets to be used for matching are fetched from the database 52 every time matching is performed. Either of the procedures shown in FIGS. 10 and 11 is selected, as required, in accordance with a change in processing speed and accuracy.

In steps B15 and B22 shown in FIG. 10, the "characteristic data groups" are acquired from the database 52. In steps B15a and B37 shown in FIG. 11, the "characteristic data sets" are obtained in the number "n" from the database 52.

Classification of a fingerprint according to pattern types will be described by reference to the accompanying drawings.

Figure 12:
FIG. 12 is an illustration showing an example fingerprint image determined to be of right-looped type.
Figure 13:
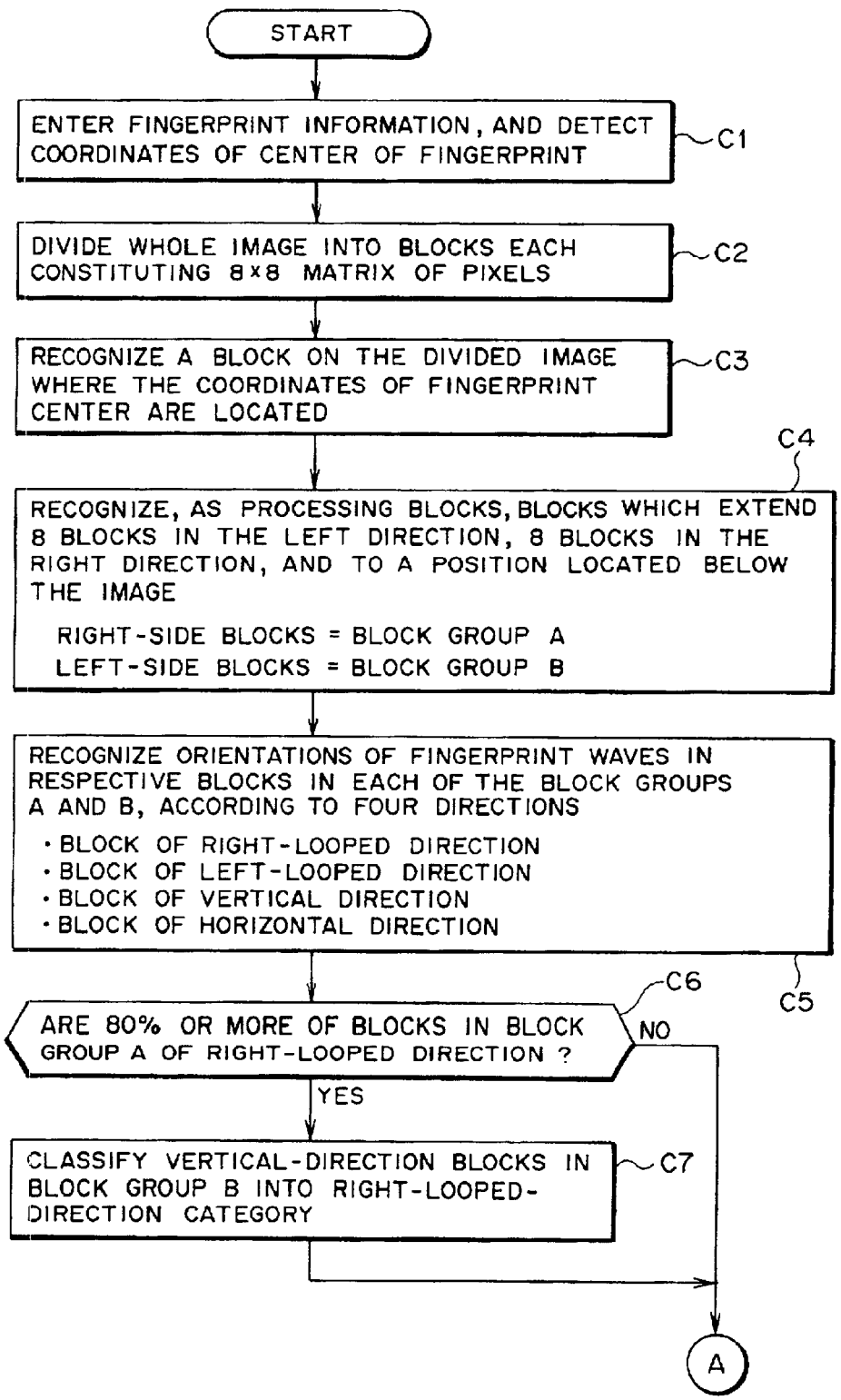
FIG. 13 is a flowchart showing procedures for determining a fingerprint image to be of right-looped type according to the first embodiment.
Figure 14:
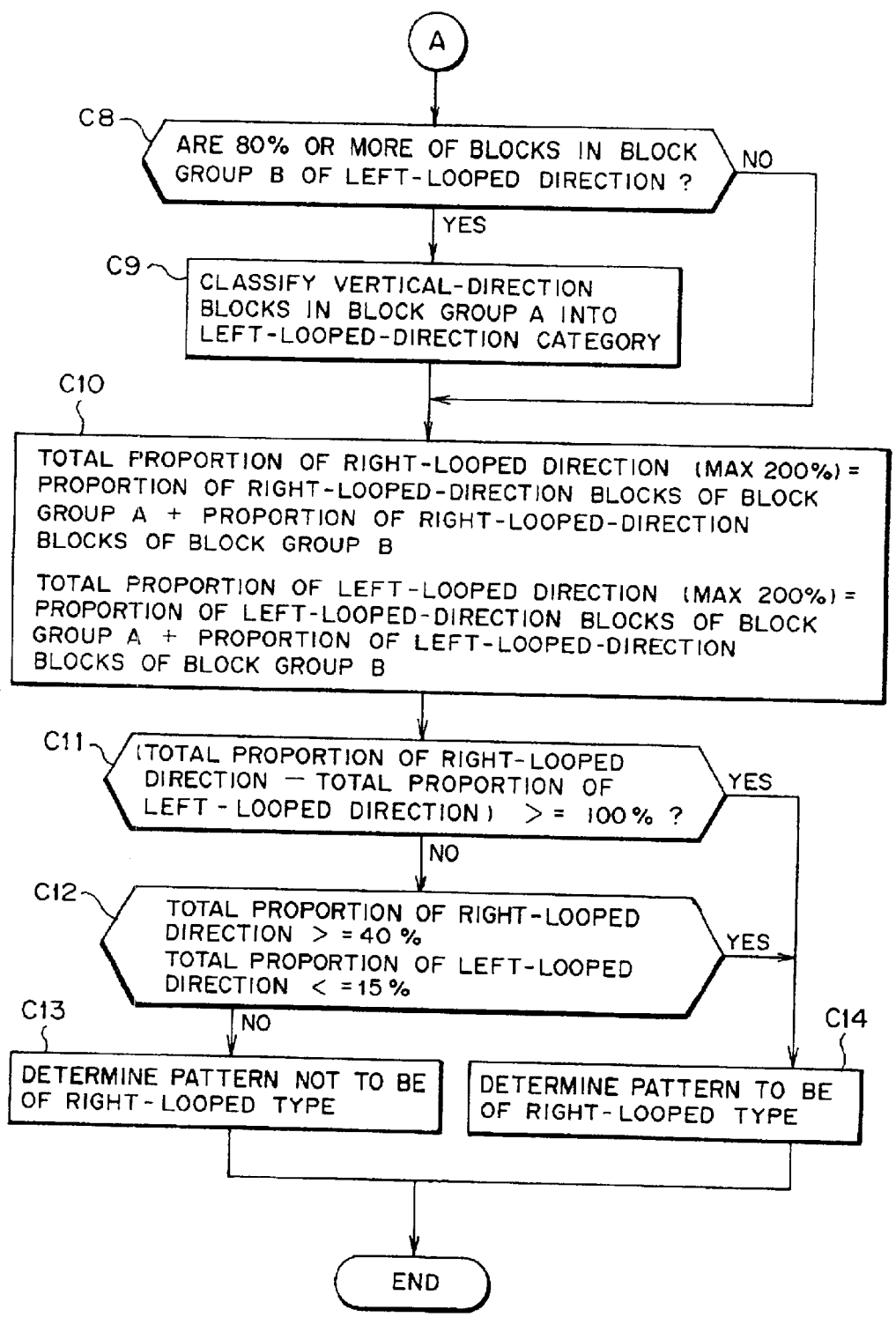
FIG. 14 is a flowchart showing the procedures for determining a fingerprint image to be of right-looped type according to the first embodiment.

By use of FIGS. 13 and 14, there will be explained an example in which a fingerprint image shown in FIG. 12 is determined to be of right-looped type. FIG. 12 is an example fingerprint image determined to be of right-looped type. FIGS. 13 and 14 show flowcharts of procedures (steps C1 through C14) for determining a fingerprint image to be of right-looped type described in connection with the first embodiment.

In step C1 shown in FIG. 13, fingerprint information (a fingerprint image) is input, and the coordinates of the center of the fingerprint are detected. In step C2, the overall image is divided into a plurality of blocks each consisting of an 8 by 8 (8×8) matrix of pixels. In step C3, the block in which the thus-detected center coordinates of the fingerprint are located is recognized as a center block.

In step C4, there is defined a block group which extends eight blocks in the right direction from the center block, eight blocks in the left direction from the center block, and to the block below the image (including all the blocks located below the image). A right half of the block group (hereinafter called a "processing block group") is hereinafter taken as a block group A, and a left half of the block group is hereinafter taken as a block group B. A pattern of right-looped type is determined through use of the block groups A and B. The positional relationship between the block groups A and B is defined as shown in FIG. 4(a).

In step C5, the orientations of the fingerprint waves of respective blocks constituting the block group conceived as an object of determination are classified into four categories; that is, a wave of right-looped direction, a wave of left-looped direction, a wave of vertical direction, and a wave of horizontal direction [see FIGS. 6(a) through 6(d)]. Blocks in which no fingerprint image is present are excluded from objects of processing.

In step C6, if the majority of blocks belonging to the block group A (e.g., 80% of the blocks) are of right-looped direction, the blocks of vertical direction belonging to the block group B are determined to be of right-looped direction, and YES is selected. In step C7, blocks of vertical direction belonging to the block group B are classified as the right-looped direction. YES is selected, and in step C7 the blocks of vertical direction belonging to the block group B are classified as a right-looped direction. If the blocks are not determined to be of right-looped direction in step C6, NO is selected, and processing proceeds to step C8 shown in FIG. 14.

In step C8, if the majority of blocks belonging to the block group B (e.g., 80% of the blocks) are of left-looped direction, YES is selected. In step C9, the blocks of vertical direction belonging to the block group A are determined to be of left-looped direction. If in step C8 blocks of vertical direction belonging to the block group A are not determined to be of left-looped direction, NO is selected. Processing proceeds to step C10. Although in the present example a threshold value is set to 80%, the threshold is not limited to this value. If the degree of strictness of determination is changed, the threshold value can be set to a desired value.

Even the blocks that have been determined to be of vertical direction are classified, as far as possible, into either a right-looped direction or a left-looped direction. Hence, even when a fingerprint is captured at an inclined input angle, directions of the blocks of the fingerprint pattern, which would otherwise be determined to be of vertical type, are determined to be of right-looped type or left-looped type.

At this point in time, the directions of the blocks located in the processing block group are determined to be determination elements. Hence, in step C10, the proportion of blocks of right-looped direction in the block group A and the proportion of blocks of right-looped direction in the block group B are added together, and a total proportion of right-looped direction is recognized, up to a maximum of 200% (MAX). Similarly, the proportion of blocks of left-looped direction in the block group A and the proportion of blocks of left-looped direction in the block group B are added together, and a total proportion of left-looped direction is recognized, up to a maximum of 200% (MAX).

In steps C11 through C14, a determination is made as to whether the input fingerprint is of right-looped direction or left-looped direction, from the thus-recognized value of the total proportion of right-looped direction and from the thus-recognized value of the total proportion of left-looped direction.

First, a block group whose directions have a large proportion of right-looped direction is determined to be of right-looped type. For example, if a value resulting from subtraction of the total proportion of left-looped direction from the total proportion of right-looped direction assumes a value of 100% or more (step C11), YES is selected. The block group is determined to be of right-looped type (step C14). In order to select a block group which is evidently of right-looped type, the threshold value is set to as high a value as possible.

The block group which has not been determined to be of right-looped type is determined. In step C11, NO is selected. In step C12, if a total proportion of right-looped direction assumes a value of 40% or more and a total proportion of left-looped direction assumes a value of 15% or less, YES is selected. Hence, the block group is determined to be of right-looped type (step C14).

If the determination requirements are not satisfied in step C12, NO is selected. In step C13, the block group is determined to be not of right-looped type, and processing is terminated.

In the determination operations shown in FIGS. 13 and 14, if a fingerprint of a rough finger is captured or if a fingerprint image of minimum area required for determination is not captured, the pattern of such a fingerprint cannot be determined. In this case, a fingerprint whose pattern cannot be determined is classified into another group, and a matching priority is assigned to the group.

From the ratio of the total value of right-looped direction to the total value of left-looped direction, a determination is made as to whether or not the pattern of the fingerprint is of right-looped type. For instance, even if the pattern which is actually of right-looped type has assumed a small total value of right-looped direction, the pattern is determined to be of right-looped type.

As mentioned above, obviation of determination strictness results in an improvement in computation efficiency.

Figure 15:
FIG. 15 is an illustration showing an example fingerprint image determined to be of left-looped type.
Figure 16:
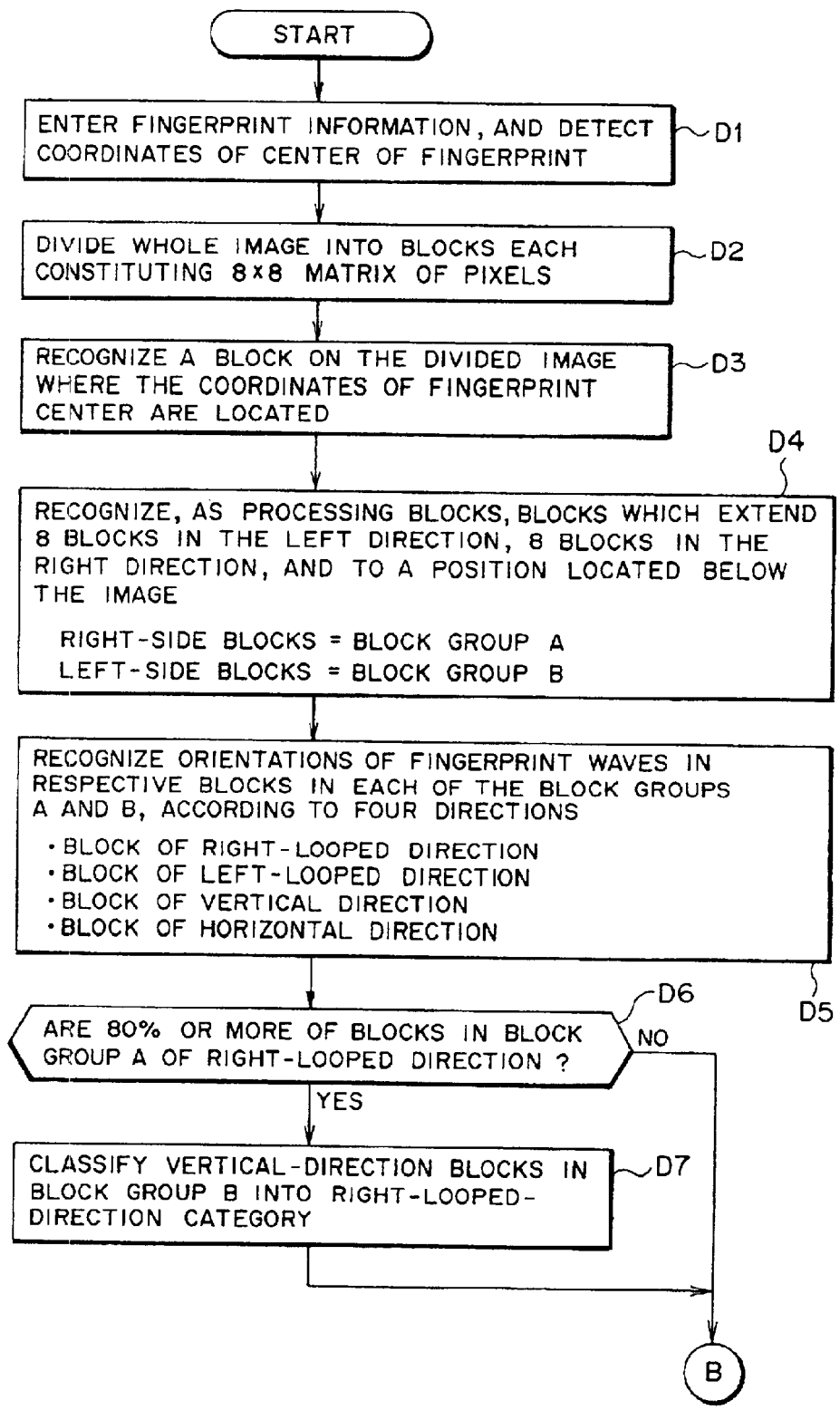
FIG. 16 is a flowchart showing procedures for determining a fingerprint image to be of left-looped type according to the first embodiment.
Figure 17:
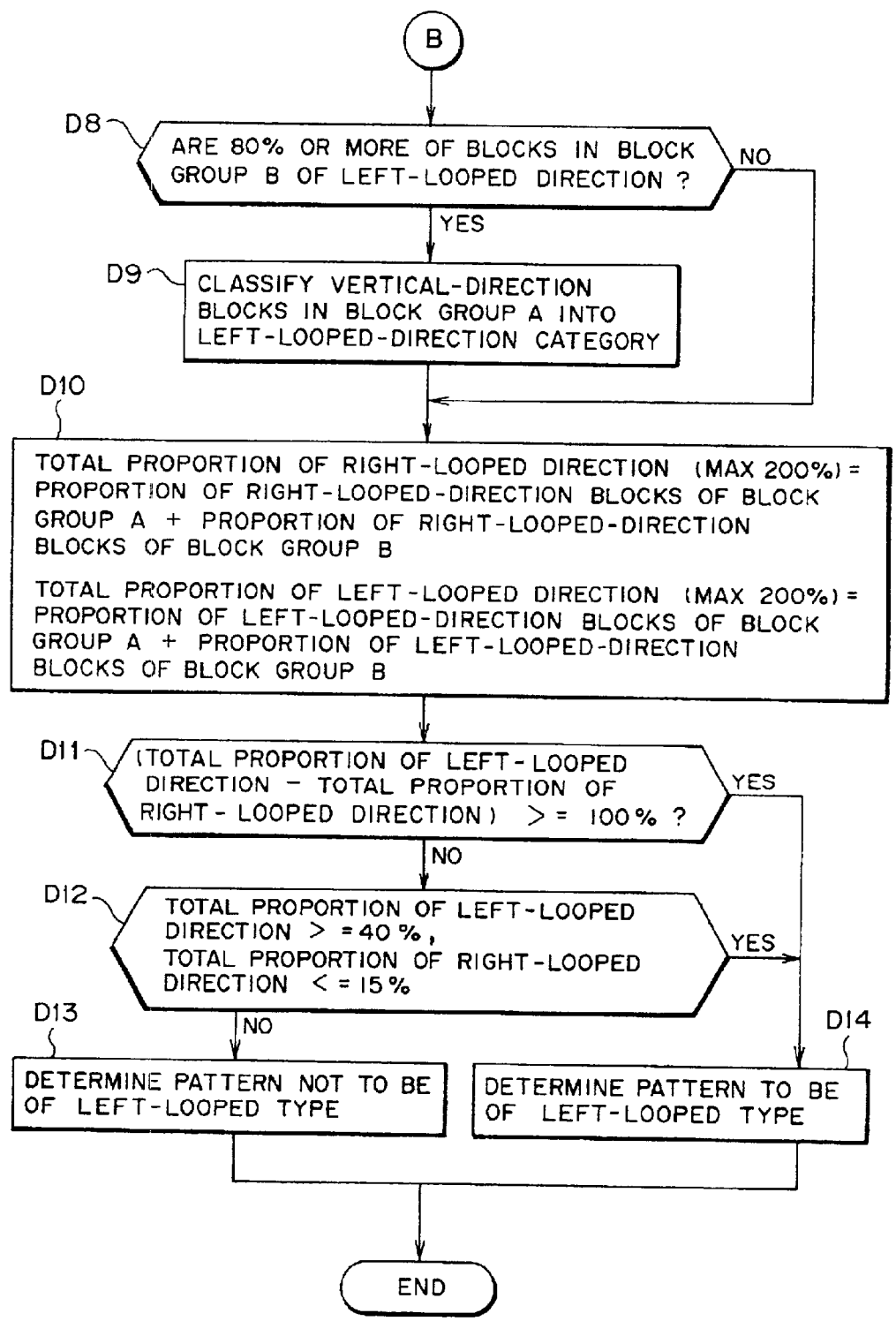
FIG. 17 is a flowchart showing the procedures for determining a fingerprint image to be of left-looped type according to the first embodiment.
Figure 18:
FIGS. 18(a) and 18(b) are illustrations showing example fingerprint images determined to be of wave type.
Figure 18:

Referring to FIGS. 16 and 17, an example of fingerprint image which is shown in FIG. 15 and whose pattern is determined to be of left-looped type is described. FIG. 15 is an illustration showing an example fingerprint image determined to be of left-looped type. FIGS. 16 and 17 are flowcharts showing procedures (steps D1 through D14) for determining a fingerprint image as a left-looped type according to the first embodiment.

Procedures starting from entry of fingerprint information to computation of a total value of right-looped direction and a total value of left-looped direction are the same as those employed in determining the pattern of right-looped type. More specifically, fingerprint information is input, and the coordinates of the center of the fingerprint are detected (step D1). The overall image is divided into a plurality of blocks each consisting of an 8 by 8 matrix of pixels (step D2). The block in which the thus-detected center coordinates of the fingerprint are located is recognized as a center block (step D3).

Block group A; that is, a right half of a block group which extends eight blocks in the right direction from the center block, eight blocks in the left direction from the center, and to the block below the image; and block group B, which is a left half of the block group, are used for determining the type of a pattern (step D4).

Subsequently, the orientations of the fingerprint waves of respective blocks constituting the block group conceived as an object of determination are classified into four categories; that is, a wave of right-looped direction, a wave of left-looped direction, a wave of vertical direction and a wave of horizontal direction. Blocks where no fingerprint image is present are excluded from objects of processing (step D5).

In step D6, if the majority of blocks belonging to the block group A (e.g., 80% of the blocks) are determined to be of right-looped direction, the blocks of vertical direction belonging to the block group B are determined to be of right-looped direction (step D6), and YES is selected. Blocks of vertical direction belonging to the block group B are classified as the right-looped direction (step D7). If in step D6 the blocks are not determined to be of right-looped direction, NO is selected, and processing proceeds to step D8 shown in FIG. 17.

In step D8, if the majority of blocks belonging to the block group B (e.g., 80% of the blocks) are of left-looped direction, YES is selected. In step D9, the blocks of vertical direction belonging to the block group A are determined to be of left-looped direction. If in step D8 blocks of vertical direction belonging to the block group A are not determined to be of left-looped direction, NO is selected, and processing proceeds to step D10.

In step D10, the proportion of blocks of right-looped direction in the block group A (the proportion of right-looped direction) and the proportion of blocks of right-looped direction in the block group B are added together, and a total proportion of right-looped direction is recognized, up to a maximum of 200% (MAX). Similarly, the proportion of blocks of left-looped direction in the block group A and the proportion of blocks of left-looped direction in the block group B are added together, and a total proportion of left-looped direction is recognized, up to a maximum of 200% (MAX).

In steps D11 through D14, a determination is made as to whether the input fingerprint is of right-looped type or left-looped type, from the thus-recognized value of the total proportion of right-looped direction and from the thus-recognized value of the total proportion of left-looped direction. In a first case, in step D11, YES is selected. If a value resulting from subtraction of the total proportion of right-looped direction from the total proportion of left-looped direction assumes a value of 100% or more, the fingerprint is determined to be of left-looped type (step D14) A block group which evidently has a great proportion of left-looped direction (having a proportion of blocks of left-looped direction) is determined to be of left-looped type. In order to select blocks which are evidently of left-looped type, the threshold value is set to a large value.

If in step D11 the value resulting from subtraction assumes a value of less than 100%, NO is selected. In step D12, the blocks which have not been determined to be of left-looped direction are evaluated. If a total proportion of left-looped direction assumes a value of 40% or more and a total proportion of right-looped direction assumes a value of 15% or less, YES is selected. Hence, the block group is determined to be of left-looped type in step D14. If the block group is not determined to be of left-looped type, NO is selected. In step D13, the block group is not determined to be of left-looped type.

In the determination operations shown in FIGS. 16 and 17, if a fingerprint of a rough finger is captured or if a fingerprint image of minimum area required for determination is not captured, the pattern of such a fingerprint cannot be determined. In this case, a fingerprint whose pattern cannot be determined is classified into another group, and a matching priority is assigned to the group.

From the ratio of the total value of right-looped direction to the total value of left-looped direction, a determination is made as to whether or not the pattern of the fingerprint is of left-looped type. For instance, even if the pattern which is actually of a left-looped type has assumed a small total value of left-looped direction, the pattern is determined to be of left-looped type. As mentioned above, obviation of determination strictness results in an improvement in computation efficiency.

Figure 19:
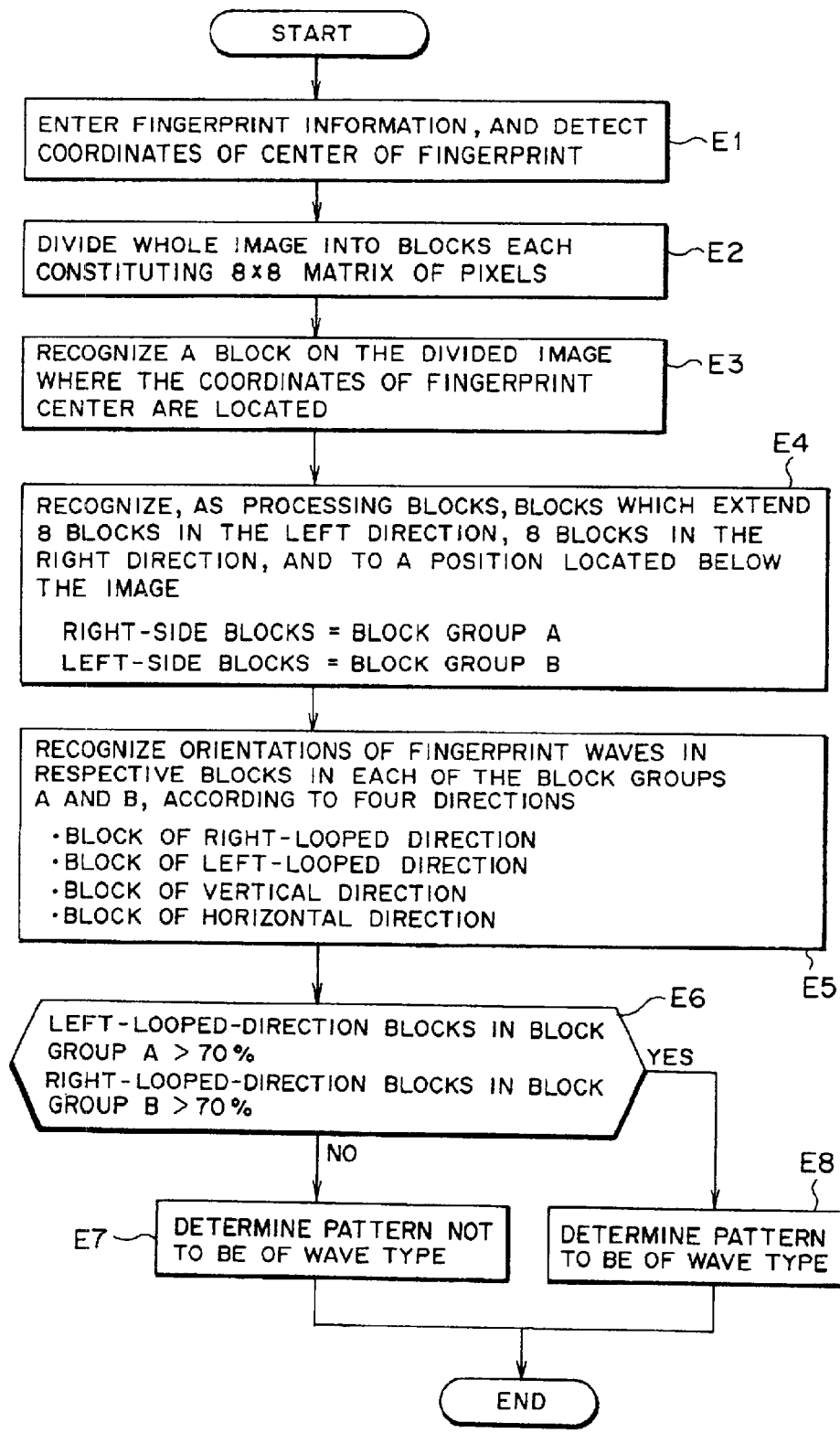
FIG. 19 is a flowchart showing procedures for determining a fingerprint image to be of wave type according to the first embodiment.
Figure 20:
FIGS. 20(a) and 20(b) are illustrations showing example fingerprint images determined to be of whorl type.
Figure 20:

Referring to FIG. 19, example fingerprint images which are shown in FIGS. 18(a) and 18(b) and are determined to be of wave type will now be described. FIGS. 18(a) and 18(b) are illustrations showing example fingerprint images determined to be of wave type. FIG. 19 is a flowchart showing procedures for determining a fingerprint image to be of wave type according to the first embodiment. Procedures for classifying the directions of the blocks constituting the block group A and the directions of the blocks constituting the block group B into any of four categories; that is, a block of right-looped direction, a block of left-looped direction, a block of vertical direction and a block of horizontal direction, are identical with those employed when blocks of right-looped type are determined.

More specifically, fingerprint information is input, and the coordinates of the center of the fingerprint are detected (step E1). The overall image is divided into a plurality of blocks each consisting of an 8 by 8 matrix of pixels (step E2). The block in which the thus-detected center coordinates of the fingerprint are located is recognized as a center block (step E3). Further, block group A; that is, a right half of a block group which extends eight blocks in the right direction from the center block, eight blocks in the left direction from the center, and to the block below the image; and block group B, which is a left half of the block group, are used for determining the type of a pattern (step E4).

Subsequently, the orientations of the fingerprint waves of respective blocks (unit blocks) constituting the block group conceived as an object of determination are classified into four categories that is, a wave of right-looped direction, a wave of left-looped direction, a wave of vertical direction, and a wave of horizontal direction. Blocks where no fingerprint image is present are excluded from objects of processing (step E5).

In step E6, if the majority of blocks belonging to the block group A (e.g., 70% of the blocks) are of left-looped direction and the majority of blocks belonging to the block group 13 are of right-looped direction, YES is selected, and the blocks are determined to be of wave type (step E8). If not, in step E6 NO is selected. In step E7, the blocks are determined to not be of wave type.

Here, the threshold for determination is set to 70%. The threshold value is determined in consideration of the fact that directions of the unit blocks located in a position in the vicinity of and below the center block are of horizontal direction. In a case where the degree of strictness of determination is to be changed, the threshold value can be set to a desired value.

In the determination operations shown in FIG. 19, if a fingerprint of a rough finger is captured or if a fingerprint image of minimum area required for determination is not captured, the pattern of such a fingerprint cannot be determined. In this case, a fingerprint whose pattern cannot be determined is classified into another group, and a matching priority is assigned to the group.

As mentioned above, during determination of a pattern of wave type, if the proportion of right-looped direction of the block group A is substantially equal to that of left-looped direction of the block group B, the pattern is determined to be of wave type. If the pattern of the fingerprint is determined to be of wave type, a wave type is taken as a determination result. If determination requirements are not satisfied, the pattern is determined not to be of wave type, and processing is terminated.

Figure 21:
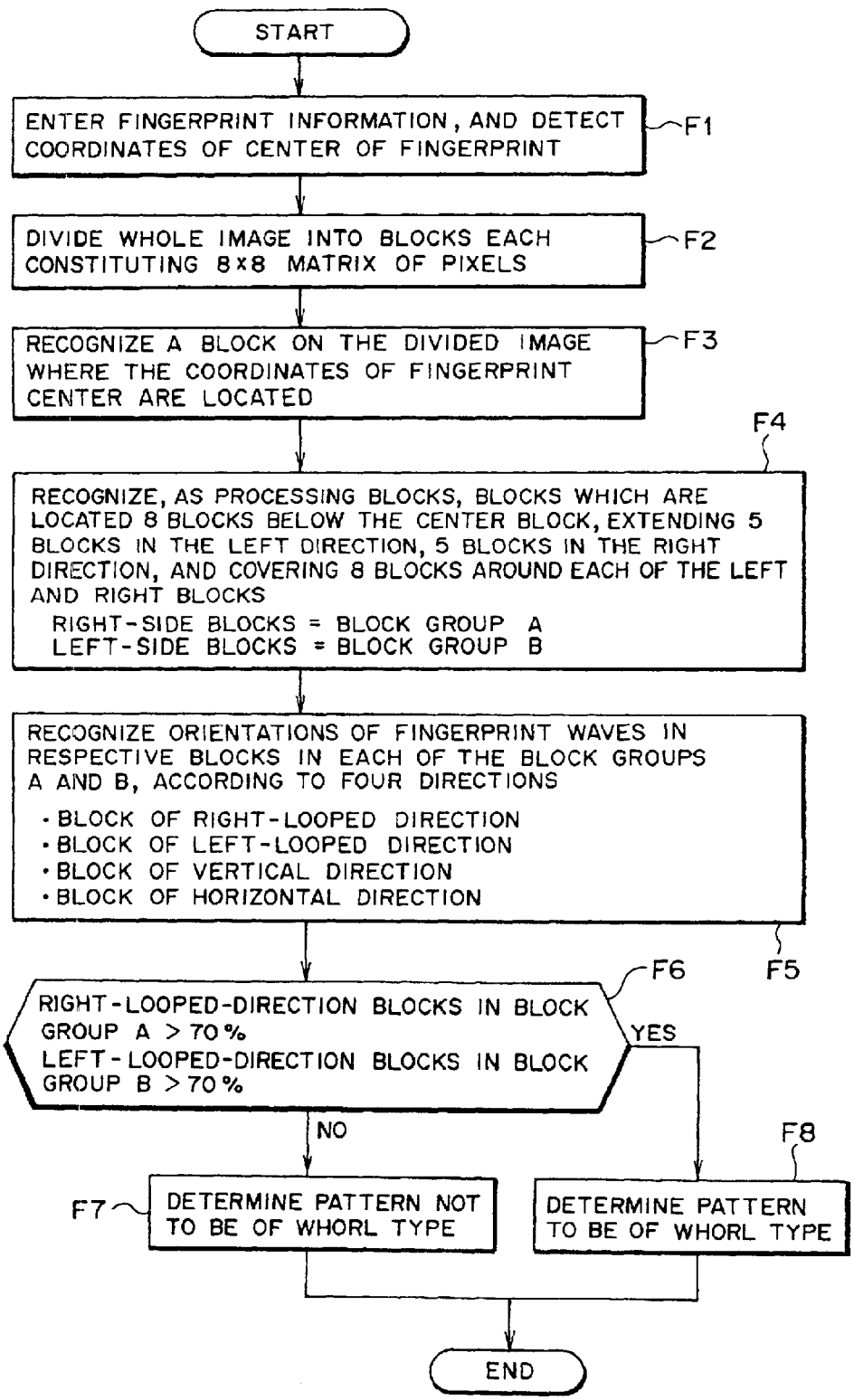
FIG. 21 is a flowchart showing procedures for determining a fingerprint image to be of whorl type according to the first embodiment.

Next, a pattern determination example in which examples of fingerprint images shown in FIG. 20(a) and 20(b) are determined to be of whorl type will be described by reference to FIG. 21. FIGS. 20(a) and 20(b) are illustrations showing example fingerprint images determined to be of whorl type. FIG. 21 is a flowchart showing procedures for determining a fingerprint image to be of whorl type according to the first embodiment. Procedures starting from entry of fingerprint information to detection of a center block are identical with those employed in determining the pattern of right-looped type.

More specifically, fingerprint information is input, and the coordinates of the center of the fingerprint are detected (step F1). The overall image is divided into a plurality of blocks each consisting of an 8 by 8 matrix of pixels (step F2). The block in which the thus-detected center coordinates of the fingerprint are located is recognized as a center block (step F3).

In step F4, a block group to be used for determining a pattern of whorl type is moved eight blocks (unit blocks) from the center block. A group of unit blocks located in a position spaced leftward five blocks from the position of the block group, a group of unit blocks located in a position spaced rightward five blocks from the position of the block group, and eight neighborhood unit blocks located around the unit blocks are recognized as processing blocks. The thus-recognized right-side processing block group is taken as a block group A, and the left-side processing block group is taken as a block group B (see FIG. 5).

In step F5, the orientations of the fingerprint waves of respective unit blocks constituting the block group conceived as an object of determination are classified into four categories; that is, a wave of right-looped direction, a wave of left-looped direction, a wave of vertical direction and a wave of horizontal direction. The categories are identical with those employed in determining the pattern of right-Looped type.

In step F6, if the majority of blocks belonging to the block group A (e.g., 70% of the blocks) are of left-looped direction and the majority of blocks belonging to the block group B are of right-looped direction, YES is selected, and the blocks are determined to be of whorl type (step F8). If not, in step F6 NO is selected. In step F7, the blocks are determined to not be of whorl type.

Here, the threshold for determination is set to 70%. With regard to individual fingerprints, there is no guarantee that the proportion of left-looped direction of the block group A and the proportion of right-looped direction of the block group B will always assume a value of 100%. The threshold value is defined in consideration of these conditions. In a case where the degree of strictness of determination is changed, the threshold value can be set to a desired value.

In the determination operations shown in FIG. 21, if a fingerprint of a rough finger is captured or if a fingerprint image of minimum area required for determination is not captured, the pattern of such a fingerprint cannot be determined. In this case, a fingerprint whose pattern cannot be determined is classified into another group, and a matching priority is assigned to the group.

As mentioned above, during determination of pattern of whorl direction, if the majority of directions of the blocks belonging to the block group A are of left-looped direction and if the majority of directions of the blocks belonging to the block group B are of right-looped direction, the pattern can be determined to be of whorl type.

As mentioned above, if the pattern of the fingerprint can have been determined to be of whorl type, whorl type is taken as a determination result. If determination requirements are not satisfied, the pattern is determined not to be of whorl type. Then, processing is terminated.

An example of definition of matching priorities will be described by reference to FIGS. 22 through 25.

Figure 22:
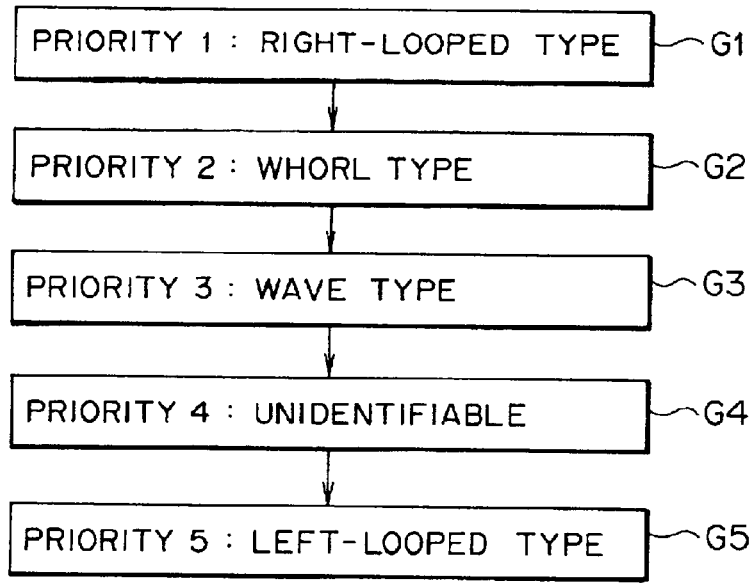
FIG. 22 is a flowchart showing an example definition of right-looped-type fingerprint matching priorities according to the first embodiment.

FIG. 22 is a flowchart showing an example definition of a right-looped-type fingerprint matching priority according to the first embodiment. The flowchart shows an example of matching priority for a right-looped-type pattern being defined in the matching priority definition section 113 in a case where the example of determination of the right-looped-type patterns shown in FIGS. 13 and 14 is employed. In the following description, the first matching priority through the fifth matching priority described in the drawings may often be described as priority 1 through priority 5.

In step G1 shown in FIG. 22, in a case where the fingerprint data for authentication purpose are determined to be of right-looped type (see FIGS. 13 and 14), a pattern type assigned the first matching priority in the registered matching data is determined to be identical with the fingerprint data; that is, right-looped type. Further, the second matching priority is assigned to a whorl type (step G2).

The reason for this is that, in a case where block groups used for determination cannot be determined to be of whorl type at the time of determination of the whorl-type patterns shown in FIGS. 20(a) and 20(b), there is a high probability that a pattern of whorl type which is looped rightward will be determined to be of right-looped type at the time of determination of a right-looped-type pattern.

The third matching priority is assigned to a wave type (step G3). The reason for this is that the orientation of a right-looped-type pattern entered at an inclination cannot be determined accurately at the time of determination of a right-looped-type pattern and there is a high probability that the pattern will be determined to be of wave type through determination of the wave-type pattern shown in FIG. 19.

Next, the fingerprint determined to be unidentifiable (of unidentifiable type) is defined as the fourth matching priority (step G4). The fingerprint characteristic data to be used for matching a left-looped-type pattern are defined as the fifth matching priority (step G5). The reason for this is that the characteristic of the determination of the left-looped-type pattern shown in FIG. 17 lies in a very low chance of a right-looped-type pattern being determined to be a left-looped-type pattern.

Figure 23:
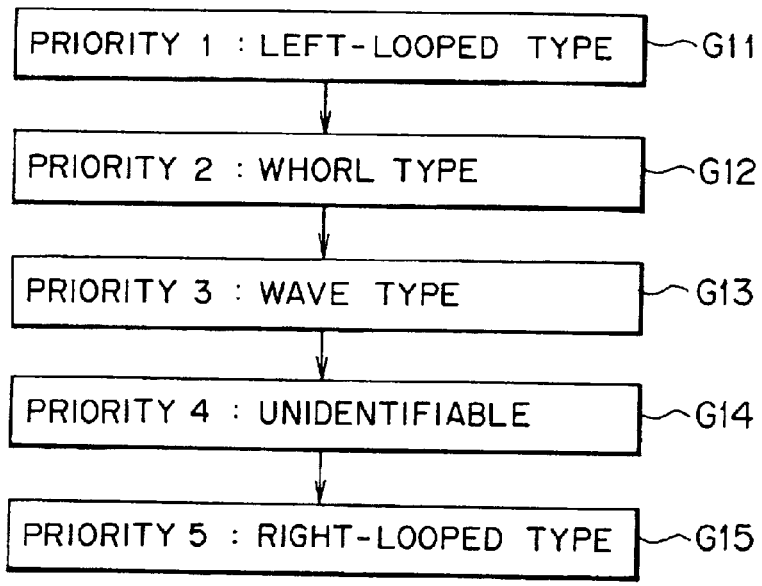
FIG. 23 is a flowchart showing an example definition of left-looped-type fingerprint matching priorities according to the first embodiment.

FIG. 23 is a flowchart showing an example definition of a left-looped-type fingerprint matching priority according to the first embodiment. The flowchart shows an example of matching priority for a left-looped-type pattern being defined in the matching priority definition section 113 in a case where the example of determination of the left-looped-type patterns shown in FIGS. 16 and 17 is employed.

In step G11 shown in FIG. 23, in a case where the fingerprint for authentication purpose is determined to be of left-looped type at the time of determination of the left-looped-type patterns shown in FIGS. 16 and 17, a pattern type assigned the first matching priority in the registered matching data is determined to be identical with the fingerprint; that is, left-looped type. Further, the second matching priority is assigned to a whorl type (step G12). The reason for this is that, in a case where block groups used for determination cannot be determined to be of whorl type by means of determination of the whorl-type pattern shown in FIG. 21, there is a high probability that a pattern of whorl type which is looped leftward will be determined to be of left-looped type by means of a left-looped-type pattern determination operation.

The third matching priority is assigned to a wave type (step G13). The reason for this is that the orientation of a left-looped-type pattern entered at an inclination cannot be determined accurately by means of left-looped-type pattern determination processing and there is a high probability that the pattern will be determined to be of wave type.

Next, the fingerprint determined to be unidentifiable is defined as the fourth matching priority (step G14). The fingerprint characteristic data to be used for matching a right-looped-type pattern are defined as the fifth matching priority (step G15). The reason for this is that the characteristic of the determination of the right-looped-type pattern lies in a very low chance of a left-looped-type pattern being determined to be a right-looped-type pattern.

Figure 24:
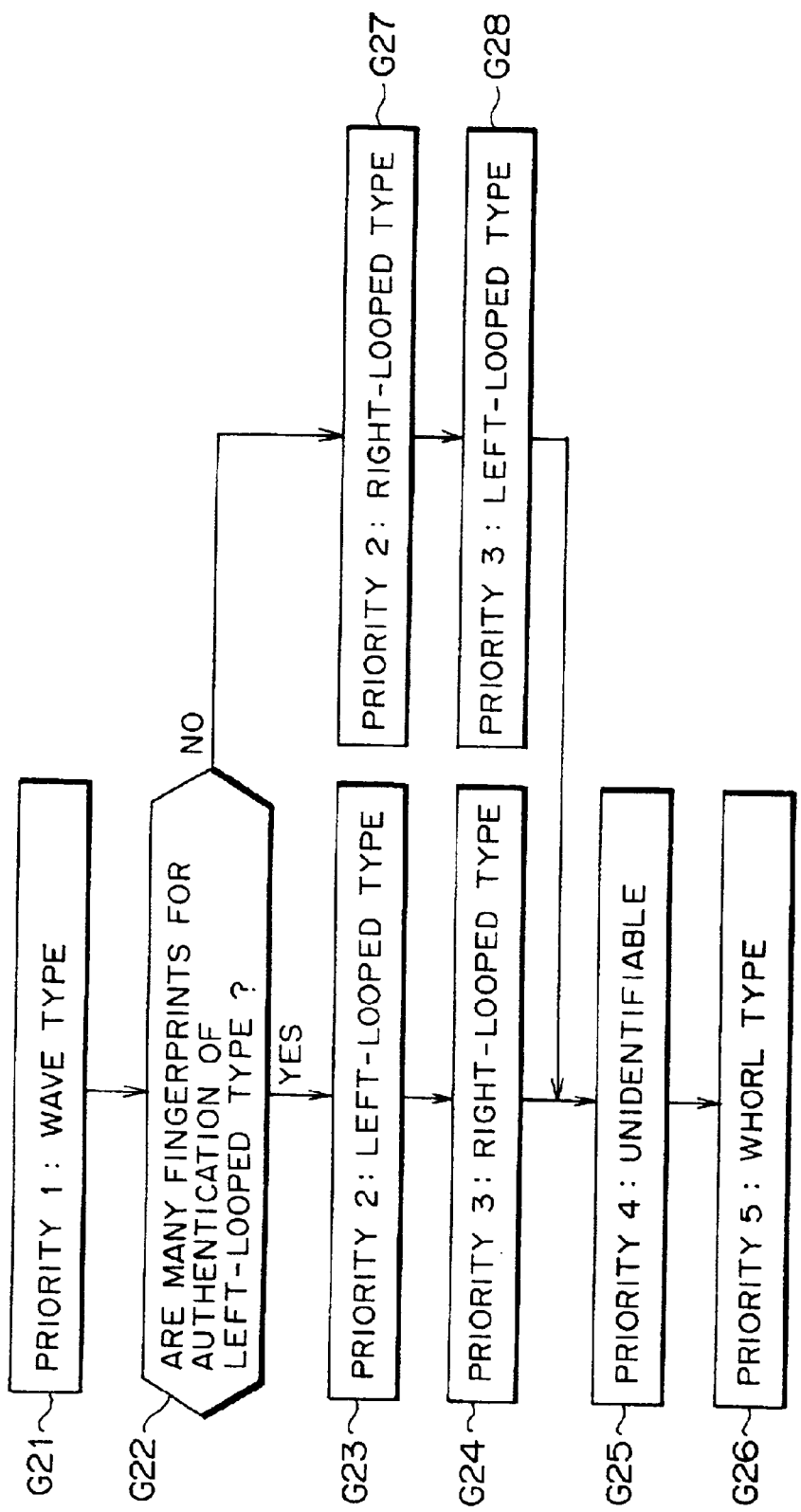
FIG. 24 is a flowchart showing an example definition of wave-type fingerprint matching priorities according to the first embodiment.

FIG. 24 is a flowchart showing an example definition of a wave-type pattern matching priority according to the first embodiment. The flowchart shows an example of matching priority for a wave-type pattern being defined in the matching priority definition section 113 in a case where the example of determination of the wave-type pattern shown in FIG. 19 is employed.

If the pattern of a fingerprint for authentication is determined to be of wave type by means of a wave-type pattern determination operation, the pattern type to be matched with highest priority of the registered matching data is determined to be identical with the pattern of the fingerprint; that is, wave type (step G21).

The wave-type pattern is determined to be of right-looped type or left-looped type depending on the circumstances under which the fingerprint was captured. In step G22, a matching priority is determined on the basis of which of a left-looped type and a right-looped type has a larger proportion in the pattern of the fingerprint entered for authentication. If the pattern of the fingerprint for authentication purpose is determined to be of wave type or if many processing blocks are of left-looped type, YES is selected in step G22. With regard to a left-looped type, reference is made to the registered fingerprint data for matching purpose as the second matching priority (step G23). Further, with regard to a right-looped type, reference is made to the registered fingerprint data for matching purpose as the third matching priority (step G24).

In step G22, if numerous processing blocks are of right-looped type, NO is selected. With regard to a right-looped type, reference is made to the registered fingerprint data for matching purpose as the second matching priority (step G27). Further, with regard to a left-looped type, reference is made to the registered fingerprint data for matching purpose as the third matching priority (step G28)

In step G25, a fingerprint determined to be unidentifiable is defined as the fourth matching priority. In step G26, a fingerprint of whorl type is defined as the fifth matching priority. The reason for this is that the characteristic of whorl-type-pattern determination processing lies in a very low chance of a fingerprint of wave type being determined to be of whorl type.

Figure 25:
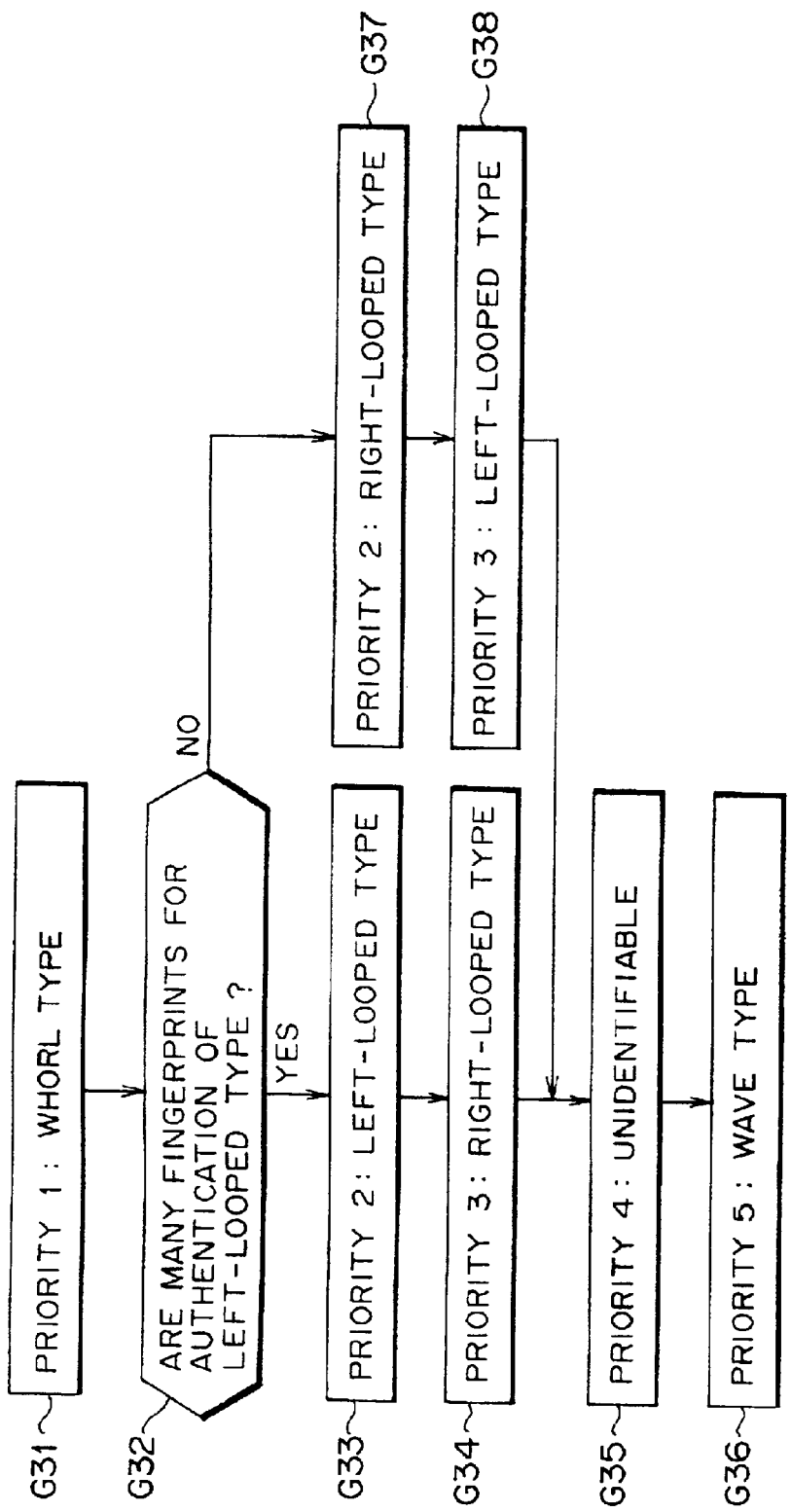
FIG. 25 is a flowchart showing an example definition of whorl-type fingerprint matching priorities according to the first embodiment.

FIG. 25 is a flowchart showing an example definition of a whorl-type pattern matching priority according to the first embodiment. The flowchart shows an example of matching priority for a whorl-type pattern being defined in the matching priority definition section 113 in a case where the example of determination of the whorl-type pattern shown in FIG. 21 is employed.

If the pattern of a fingerprint for authentication is determined to be of whorl type by means of a whorl-type pattern determination operation, the pattern type to be matched with highest priority of the registered matching data is determined to be identical with the pattern of the fingerprint; that is, whorl type (step G31).

The whorl-type pattern is determined to be of right-looped type or left-looped type, depending on the circumstances under which the fingerprint was captured. The next matching priority is defined as a right-looped type or a left-looped type. In step G32, a matching priority is determined on the basis of which of a left-looped type and a right-looped type has a larger proportion in the pattern of the fingerprint entered for authentication. If many of the blocks located in the vicinity of the center block are of left-looped type, YES is selected. With regard to a left-looped type, reference is made to the registered fingerprint data for matching purpose as the second matching priority (step G33). Further, with regard to a right-looped type, reference is made to the registered fingerprint data for matching purpose as the third matching priority (step G34).

In step G32, if many of the blocks located in the vicinity of the center block are of right-looped type, NO is selected. With regard to a right-looped type, reference is made to the registered fingerprint data for matching purpose as the second matching priority (step G37). Further, with regard to a left-looped type, reference is made to the registered fingerprint data for matching purpose as the third matching priority (step G38).

Next, a fingerprint determined to be unidentifiable is defined as the fourth matching priority (step G35). The characteristic of wave-type-pattern determination processing lies in a very low chance of a fingerprint of whorl type being determined to be of wave type. Hence, a matching fingerprint characteristic data set pertaining to a wave-type pattern is defined as the fifth matching priority (step G36).

In step G32, a matching priority may be determined on the basis of which of a left-looped type and a right-looped type has a larger proportion in the directions of blocks located in the vicinity of the center block of the fingerprint entered for authentication purpose.

As mentioned above, in the personal authentication system 49 using fingerprint information, fingerprint characteristic data are extracted from a captured fingerprint image at the time of registration of matching data. Further, the pattern of the fingerprint image is determined while classification of pattern of the fingerprint image into a pattern type differing from an actual pattern of the fingerprint is allowed. Further, on the basis of the pattern determined from the fingerprint input for authentication, a matching priority is defined for each pattern. Pattern matching is effected in accordance with the thus-defined matching priority.

As mentioned above, the user can immediately authenticate himself without involvement of redundant matching operation.

Under the pattern determination method according to the present embodiment, only a specific area below the center of a fingerprint is used. Hence, even when a fingerprint image is of narrow area, less-strict determination of a pattern becomes possible. Even when the pattern is determined to be of a type different from an actual pattern type, classification of the pattern into a different pattern type is allowed, because matching priorities are defined for patterns in descending order of highest determination probability.

The pattern determination method according to the present embodiment relaxes the strictness of pattern determination employed in a personal authentication method which has already been put forward and authenticates a person using the pattern of a fingerprint. As a result, the speed of determination of a pattern can be improved, and the pattern can be matched in accordance with matching priorities. Hence, the pattern determination method according to the present invention enables authentication of a person more quickly than does a mere round-robin matching method.

In a case where a large number of persons are to be authenticated, the greater the number of persons, the more total matching time can be shortened through use of the determination method according to the present invention.

(A1) Description of the First Modification of the First Embodiment of the Present Invention.

In the first modification, there will be described matching using a modification of the authentication apparatus 51. A personal authentication system 49a using fingerprint information according to the first modification authenticates a person by use of fingerprint information, as does the personal authentication system 49 shown in FIG. 1. The authentication system 49a comprises the storage section 52, the registration apparatus 50, and the authentication apparatus 51a.

Figure 26:
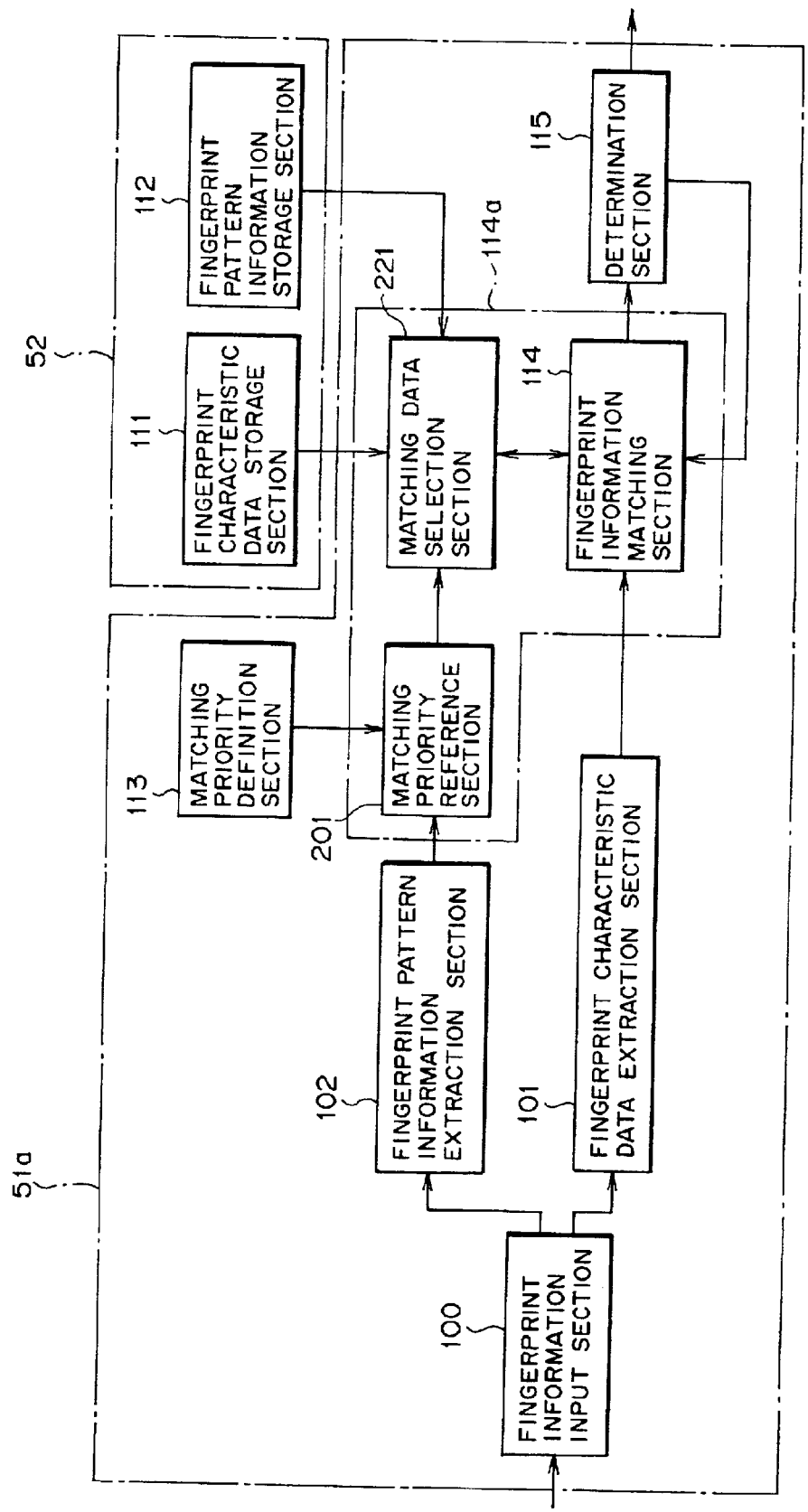
FIG. 26 is a block diagram showing an authentication apparatus according to a first modification of the first embodiment.

FIG. 26 is a block diagram of the authentication apparatus 51a according to the first modification of the first embodiment of the present invention. The authentication apparatus 51a shown in FIG. 26 authenticates a person to be authenticated, by use of matching data written in the storage section 52 through matching and determination. In accordance with the information entered by the fingerprint information input section 100 for capturing registrant fingerprint information, matching data sets are fetched from the storage section 52. Matching of the fingerprint is performed through use of the thus-captured matching data sets. The authentication apparatus 51a has a second fingerprint information matching section 114a. The second fingerprint information matching section 114a comprises a matching priority reference section 201, a matching data selection section 221, and the fingerprint information matching section 114.

The matching priority reference section 201 reads (refers to) the matching priorities held in the matching priority definition section 113. The matching data selection section 221 is connected to the fingerprint characteristic data storage section 111 and the fingerprint pattern information storage section 112, which belong to the storage section 52, as well as to the matching priority reference section 201. The matching data selection section 221 is arranged so as to be able to select matching data.

Those elements which are assigned the same reference numerals as those shown in FIG. 26 have identical or similar functions, and repetition of their explanations is omitted.

In accordance with an instruction output from an unillustrated control section, the fingerprint information input section 100 captures a fingerprint image, and the fingerprint characteristic data extraction section 101 extracts registrant fingerprint characteristic data from the thus-captured registrant fingerprint image, thereby producing fingerprint characteristic data to be used for authentication. The fingerprint characteristic data are input to the fingerprint information matching section 114.

The pattern of the fingerprint image output from the fingerprint information input section 100 is extracted and classified by the fingerprint pattern information extraction section 102. The classified data are input to the matching priority reference section 201. The matching priority reference section 201 refers to the matching priority assigned to the pattern of the fingerprint for authentication, by the matching priority definition section 113. The matching data selection section 221 refers to the fingerprint characteristic data storage section 111 and the fingerprint pattern storage section 112, thereby acquiring matching data.

The fingerprint information matching section 114 matches the thus-acquired fingerprint characteristic data for authentication purpose against fingerprint characteristic data for matching purpose, on a per-pattern basis. The determination section 115 determines whether or not the person is an authenticated person, on the basis of a match rate (i.e., a matching result). If coincident data are not found in the fingerprint characteristic data for matching purpose pertaining to the pattern indicated by the matching priority, the person is determined to be a different person (to be false) The determination section 115 issues a request to the fingerprint information matching section 114 for matching.

Upon receipt, from the determination section 115, of the request for matching the fingerprint characteristic data for authentication purpose against the next fingerprint characteristic data set, the fingerprint information matching section 114 reads the fingerprint characteristic data for matching purpose pertaining to the pattern of next matching priority from the matching fingerprint characteristic data storage section 111. Matching of the fingerprint for authentication against a pattern of matching priority is repeated. At this time, the database (storage section) 52 reads fingerprint data for matching purpose pertaining to the pattern which is coincident with the pattern determined by the determination section 115. The thus-read data are compared with input data.

If coincident data are not found through determination, registered fingerprint data for matching purpose pertaining to the pattern of the next matching priority are referred to. The fingerprint data for authentication purpose are compared with registered fingerprint data pertaining to patterns ranging from a pattern of first matching priority to a pattern of third matching priority, or pertaining to patterns ranging from a pattern of first matching priority to a pattern of given matching priority.

As mentioned above, regardless of the fingerprint-sampling circumstances of an input fingerprint image, determination of a pattern within an identifiable range of the fingerprint image obviates strict determination of a pattern. Further, a fingerprint is matched by use of matching priority assigned to each of fingerprint patterns, thereby obviating processing for specifying an individual such as entry of an ID. Accordingly, speed of a 1-N personal authentication which uses a fingerprint and requires specification of an individual is improved.

(A2) Description of a Second Modification of the First Embodiment of the Present Invention In the first embodiment and the first modification thereof, matching priority is imparted by the matching priority definition section 113. At the time of matching operation, the matching priority is read and referred to. According to the method of the second modification, a parameter capable of determining a matching priority is appended to matching data at the time of generation of the matching data. The matching data are used at the time of a matching operation, thereby authenticating a person.

A personal authentication system 49b using fingerprint information according to the second modification authenticates a person by use of fingerprint information, as does the personal authentication system 49 shown in FIG. 1. The authentication system 49b comprises the storage section 52, the registration apparatus 50a, and the authentication apparatus 51b.

Figure 27:
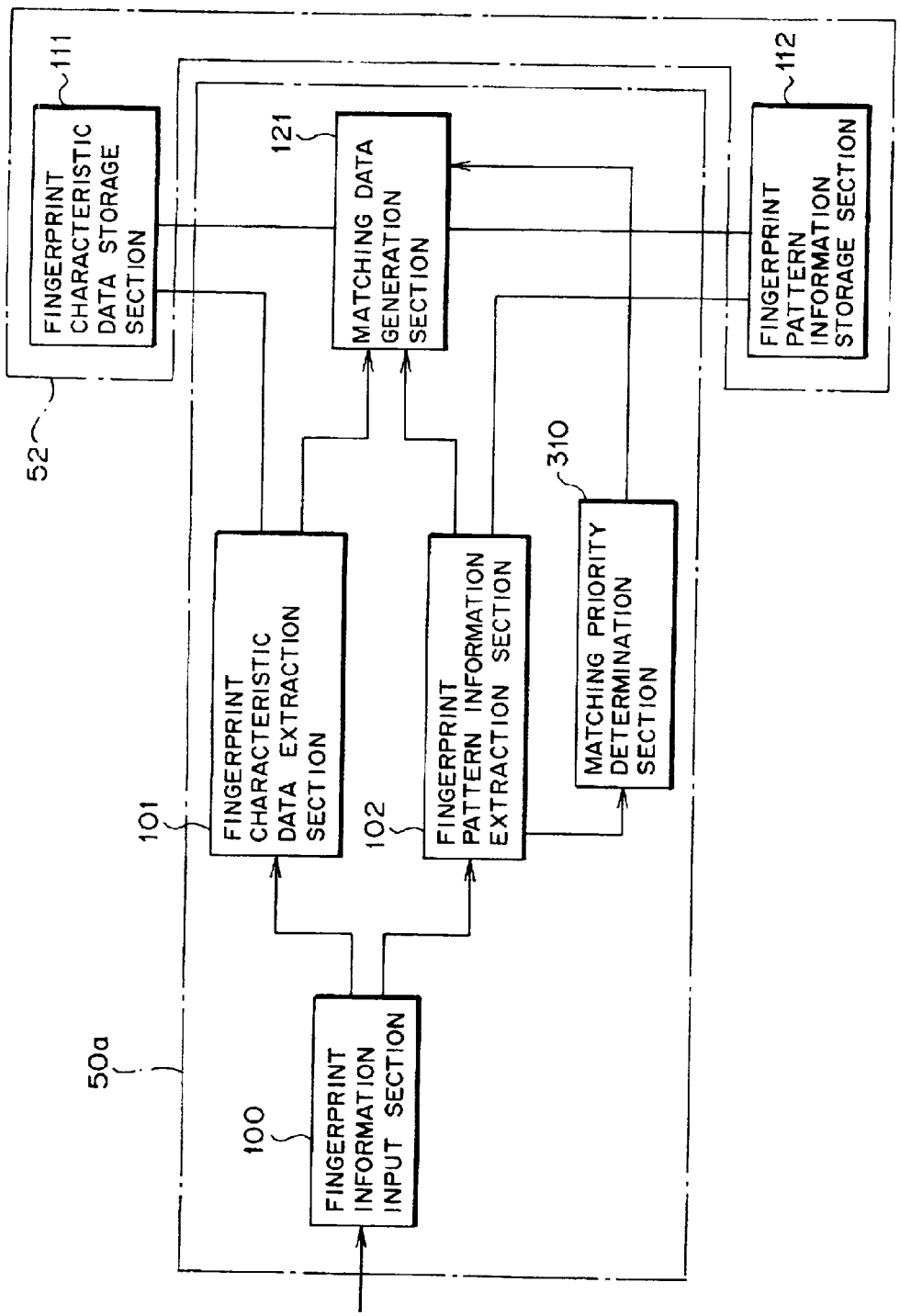
FIG. 27 is a block diagram showing a registration apparatus according to a second modification of the first embodiment.

FIG. 27 is a block diagram of the registration apparatus 50a according to the second modification of the first embodiment of the present invention. A matching priority determination processing section 310 of the registration apparatus 50a shown in FIG. 27 determines a matching priority in accordance with registrant fingerprint pattern information and outputs the matching priority. The matching data generation section 121 writes the matching data into the storage section 52 by means of linking the registrant fingerprint characteristic data, the registrant fingerprint pattern information and the matching priority.

In accordance with an instruction output from an unillustrated control section, the fingerprint information input section 100 captures a fingerprint image, and the fingerprint characteristic data extraction section 101 extracts registrant fingerprint characteristic data from the thus-captured registrant fingerprint image, thereby producing fingerprint characteristic data to be used for authentication.

The fingerprint pattern information extraction section 102 extracts registrant fingerprint pattern information from the thus-captured registrant fingerprint image. In accordance with the thus-extracted registrant fingerprint pattern information, the matching priority determination processing section 310 determines a matching priority. The matching data generation section 121 writes the matching data into the fingerprint characteristic data storage section 111 and the fingerprint pattern information storage section 112, by means of linking the registrant fingerprint characteristic data, the registrant fingerprint pattern information and the matching priority.

Those elements which are assigned the same reference numerals as those shown in FIG. 27 have identical or similar functions, and repetition of their explanations is omitted.

It is possible to manage information through use of a single storage section 52, as well as to retain information individually through use of the two types of storage sections shown in FIG. 27; that is, the matching fingerprint characteristic data storage section 111 and the fingerprint pattern information storage section 112. There may be utilized the nature of these two types of information pieces; that is, the information pieces being linked together on a one-to-one correspondence.

To construct the system 49b, a system operator prepares a software program, as well as desired hardware equipment.

The system operator distributes a recording medium, such as a hard disk drive having a program stored thereon or CD-ROM having a program recorded thereon. The system operator causes a personal computer or workstation to serve as the registration apparatus 50a.

The program recorded on a computer-readable recording medium according to the present invention is to cause a computer to function as the system 49b to serve as the person-to-be-authenticated fingerprint pattern characteristic data extraction section 101 for extracting person-to-be-authenticated fingerprint characteristic data from a person-to-be-authenticated finger print image captured from the person to be authenticated; the person-to-be-authenticated fingerprint pattern information extraction section 102 for extracting person-to-be-authenticated fingerprint pattern information from the person-to-be-authenticated fingerprint image; a matching priority determination section 310 which determines a matching priority in accordance with the registrant fingerprint pattern information and outputs the matching priority; and the matching data generation section 121 which writes matching data into the storage section 52 capable of retaining data, by means of linking together the registrant fingerprint characteristic data, the registrant fingerprint pattern information, and the matching priority.

The function of the person-to-be-authenticated fingerprint pattern characteristic data extraction section 101, the function of the person-to-be-authenticated fingerprint pattern information extraction section 102, and the function of the matching data generation section 121 are implemented by means of the CPU of the computer executing the program recorded on a hard disk drive of the computer.

Use of the computer-readable recording medium having the program recorded thereon enables easy installation of the program into a computer and efficient construction of a system which authenticates an individual by use of fingerprint information.

Figure 28:
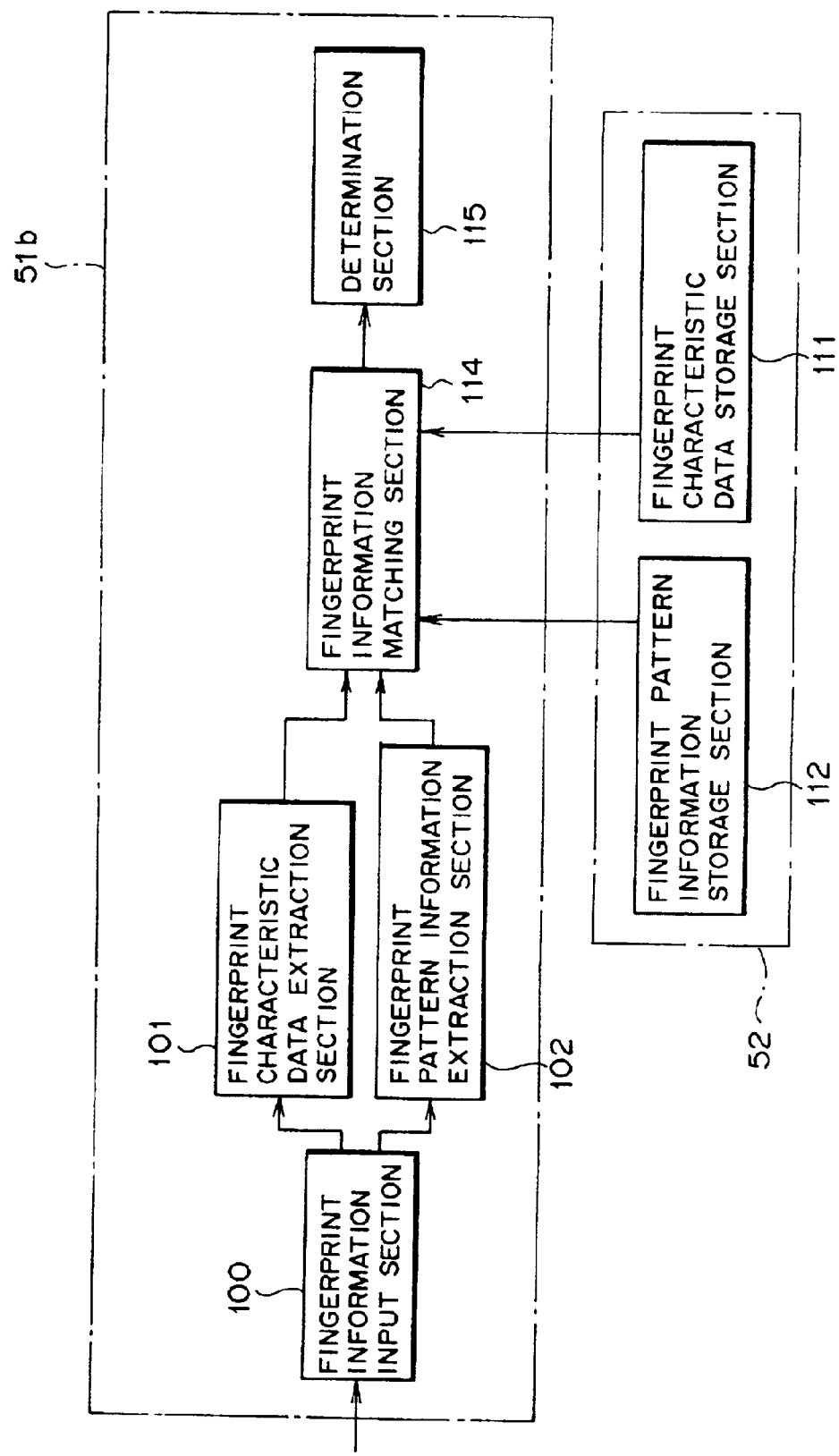
FIG. 28 is a block diagram showing an authentication apparatus according to a second modification of the first embodiment.

FIG. 28 is a block diagram showing an authentication apparatus 51b according to a second modification of the first embodiment. The authentication apparatus 51b shown in FIG. 28 does not have the matching priority definition section 113 (FIG. 3). The fingerprint information matching section 114 is arranged to refer to a matching priority directly from the matching data stored in the storage section 52.

The elements which are assigned the same reference numerals as those shown in FIG. 28 have identical or similar functions, and repetition of their explanations is omitted.

In the authentication apparatus 51b, the person-to-be-authenticated fingerprint pattern characteristic data extraction section 101 extracts person-to-be-authenticated fingerprint pattern characteristic data from the person-to-be-authenticated fingerprint image captured by an authentication fingerprint information input section 100 for capturing the person-to-be-authenticated fingerprint information. The fingerprint pattern information extraction section 102 extracts person-to-be-authenticated fingerprint pattern information from the person-to-be-authenticated fingerprint image captured by the fingerprint information input section 100.

The fingerprint information matching section 114 matches the fingerprint of the person to be authenticated against the matching data stored in the storage section 52, in accordance with the matching priorities assigned to the matching data. The result of matching is output.

Figure 29:
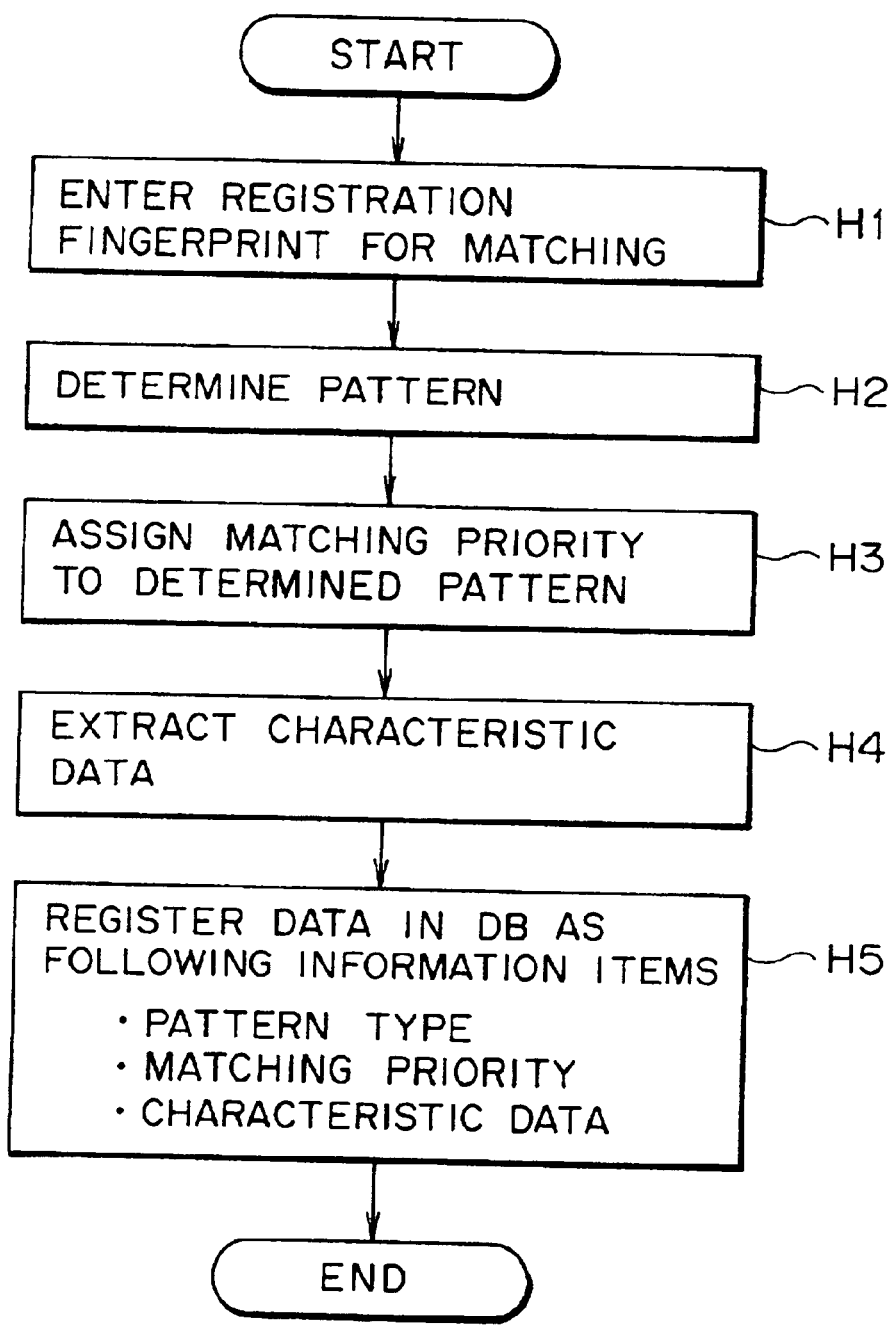
FIG. 29 is a flowchart showing an example definition of wave-type fingerprint matching priorities according to a second modification of the first embodiment.
Figure 30:
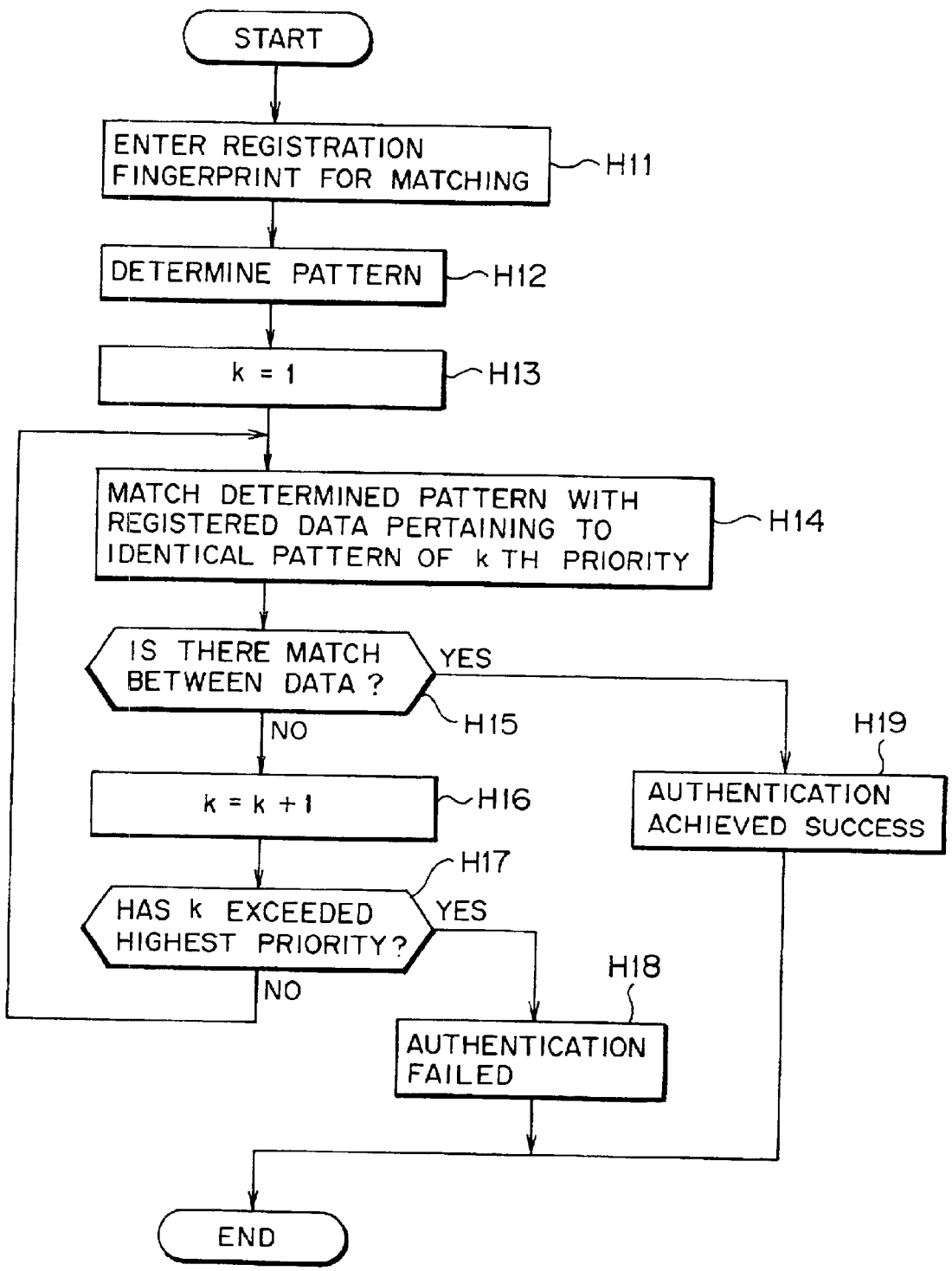
FIG. 30 is a flowchart showing authentication procedures according to a second modification of the first embodiment.

Referring to FIGS. 29 and 30, a detailed explanation will be given of a case where the matching priorities assigned to the patterns are registered and authenticated at the time of registration operation by means of the foregoing construction. FIG. 29 is flowchart showing procedures for registering matching data according to the second modification of the first embodiment.

According to the procedures, a registered fingerprint for matching purpose is input (step H1). The pattern of the fingerprint is determined (step H2). The matching priority assigned to the thus-determined pattern is determined (step H3). Fingerprint characteristic data are extracted (step H4), and matching data are registered in the database 52 through use of three types of information pieces; that is, a pattern type, a matching priority and fingerprint characteristic data (step H5).

FIG. 30 is a flowchart showing authentication procedures according to the second modification of the first embodiment of the present invention. When a fingerprint for authentication purpose is entered (step H11), the pattern of the fingerprint is determined (step H12). Matching priority k (k is a natural number) is set to 1 (step H13). The pattern identical with the determined pattern is matched against the registered data for matching purpose assigned to the $k^{th}$ matching priority (step H14), thereby checking whether or not there are coincident data (step H15).

If coincident data are found, YES is selected authentication achieves success, and processing is completed (step H19). In contrast, if coincident data are not found, NO is selected, and k is incremented (step H16). A check is made as to whether or not the value of k has exceeded the maximum matching priority (step H17). If the value of k has exceeded the maximum matching priority, YES is selected and authentication is determined to be failed (step H18). In contrast, if this is not the case, NO is selected. Processing pertaining to step H14 and processing pertaining to subsequent steps are iterated.

At the time of entry of a registered fingerprint for matching purpose, the pattern of the fingerprint is appended beforehand with matching priority information, as well as with pattern information and fingerprint characteristic data, thereby producing matching data. The fingerprint pattern information extraction section 102 extracts a pattern type and refers to the matching priority from the matching data.

The method of defining matching priorities described in connection with FIGS. 22 through 26 can be performed in the same manner.

Computation of matching priority, which would otherwise be performed by the fingerprint information matching section 114 at the time of entry of data for authentication, is obviated, thereby enabling significant reduction of computation.

At the time of matching operation, the matching priority definition section 113 does not refer to a matching priority, and a matching priority is obtained from the fingerprint pattern entered for authentication purpose. Authentication efficiency is improved.

Hence, a match between the registered fingerprint pattern for matching purpose and a fingerprint pattern for authentication is not required. If no match exists between the patterns, the fingerprint pattern for authentication is matched against other registered fingerprint patterns on a per-pattern basis, by use of the matching priorities assigned to the registered fingerprint patterns. Thus, an individual can be authenticated by use of fingerprints in descending order of matching probability from the highest probability, thereby enabling immediate authentication of a person.

(B) Description of a Second Embodiment of the Present Invention

Both the registration apparatus 50 (50a) and the authentication apparatus 51 (51a, 51b) adopt a fingerprint as biometric information. Information for authentication is not limited to a fingerprint. For instance, the information can be applied to a system 49b (see FIG. 1) which performs biometric authentication operation by means of capturing, as biometric information, a fingerprint, a palm print, a finger shape, a palm shape, voice, a retina, an iris, a face image, a dynamic signature, blood-vessel arrangements, or keystroke.

Figure 31:
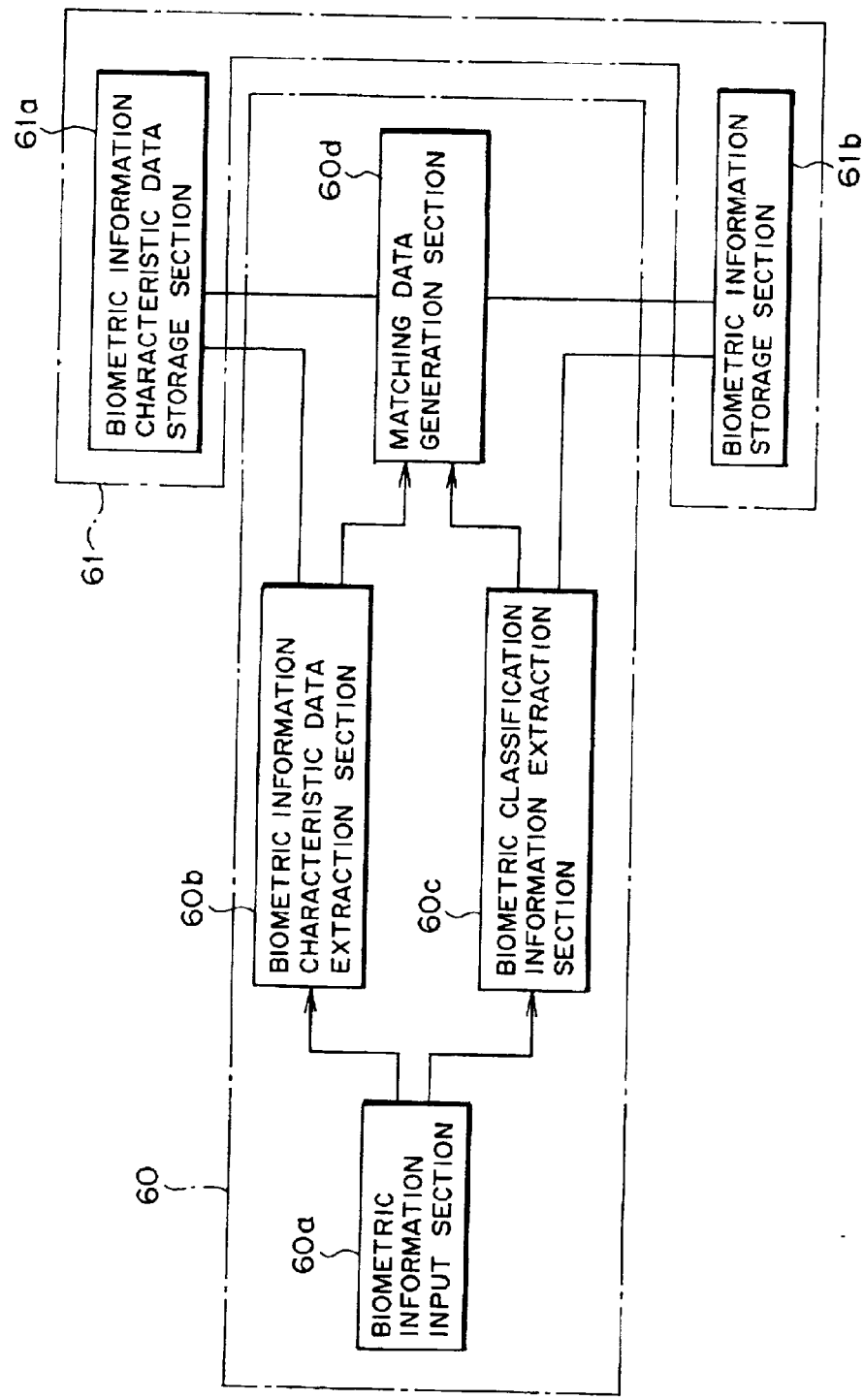
FIG. 31 is a block diagram showing a registration apparatus of a personal authentication system using biometric information according to a second embodiment of the present invention.

FIG. 31 is a block diagram of a registration apparatus of a personal authentication system using biometric information according to a second embodiment of the present invention. A registration apparatus 60 shown in FIG. 31 produces matching data from the information entered by a registration biometric information input section for capturing biometric information about a registrant. The registration apparatus 60 writes the matching data into a storage section 61. The registration apparatus 60 comprises a biometric information input section (a registration biometric information input section) 60a, a biometric information characteristic data extraction section (a registrant biometric information characteristic data extraction section) 60b, a biometric classification information extraction section (a registrant biometric classification information extraction section) 60c, and a matching data generation section 60d.

The function of the biometric information input section 60a is implemented by a scanner capable of capturing the geometry of a palm or by a measuring instrument (not shown).

The biometric information characteristic data extraction section 60b extracts registrant biometric information characteristic data from the biometric information image pertaining to the registrant captured by the biometric information input section 60a. The biometric classification information extraction section 60c extracts registrant biometric classification information from the biometric information about the registrant captured by the biometric information input section 60a. The matching data generation section 60d writes the matching data into the storage section 61, by means of linking the registrant biometric information characteristic data to the registrant biometric classification information.

The storage section 61 shown in FIG. 31 comprises a biometric information characteristic data storage section (a registrant biometric information characteristic data storage section) 61a capable of holding the registrant biometric information characteristic data, and a biometric information storage section (a registrant biometric classification information storage section) 61b capable of holding the registrant biometric classification information. The function of the storage section 61 is implemented by, for example, memory (not shown). As will be described later, the storage section 61 and an authentication apparatus 70 are shared.

Figure 32:
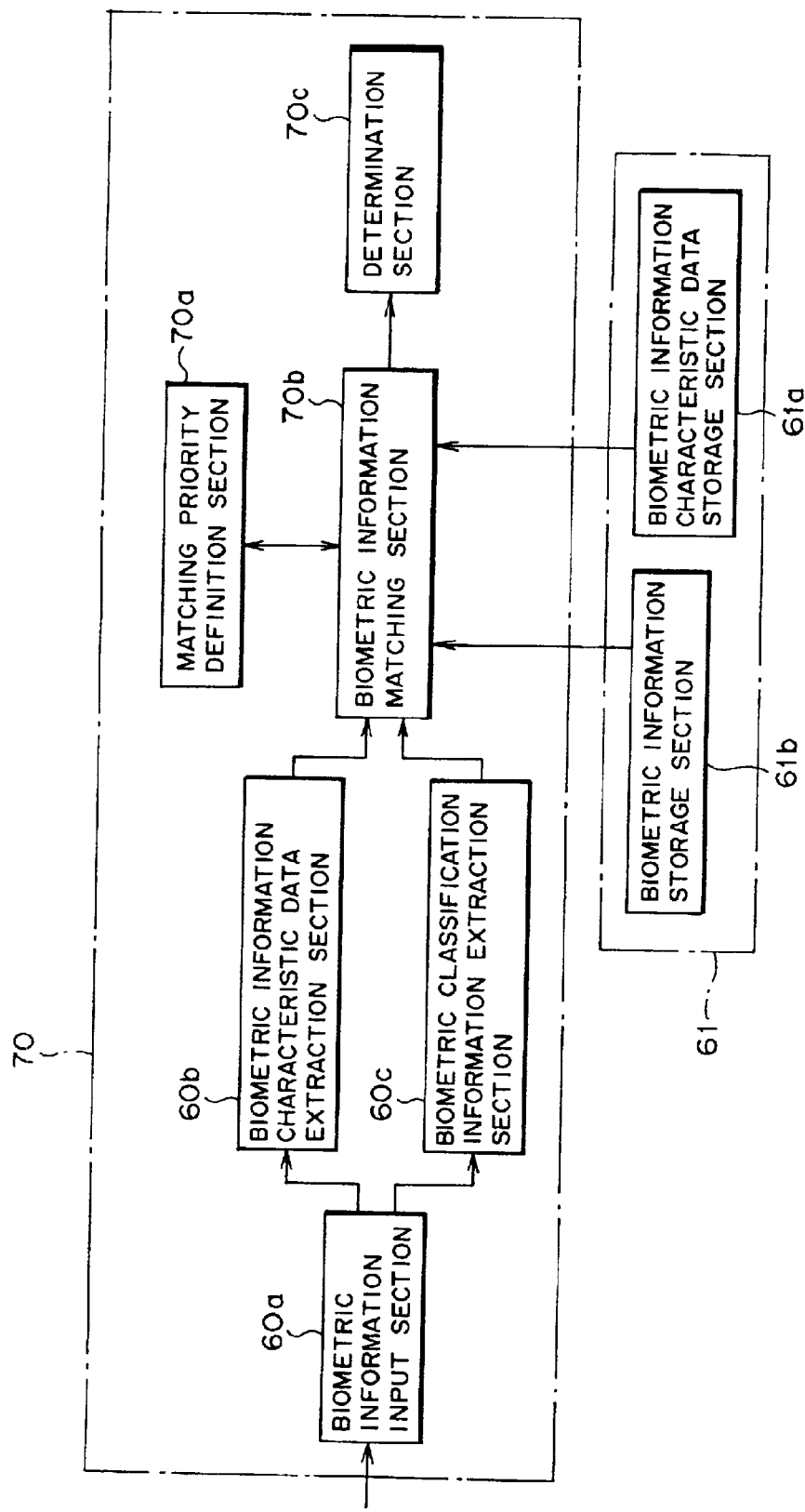
FIG. 32 is a block diagram showing an authentication apparatus of the personal authentication system using biometric information according to the second embodiment of the present invention.
Figure 34:
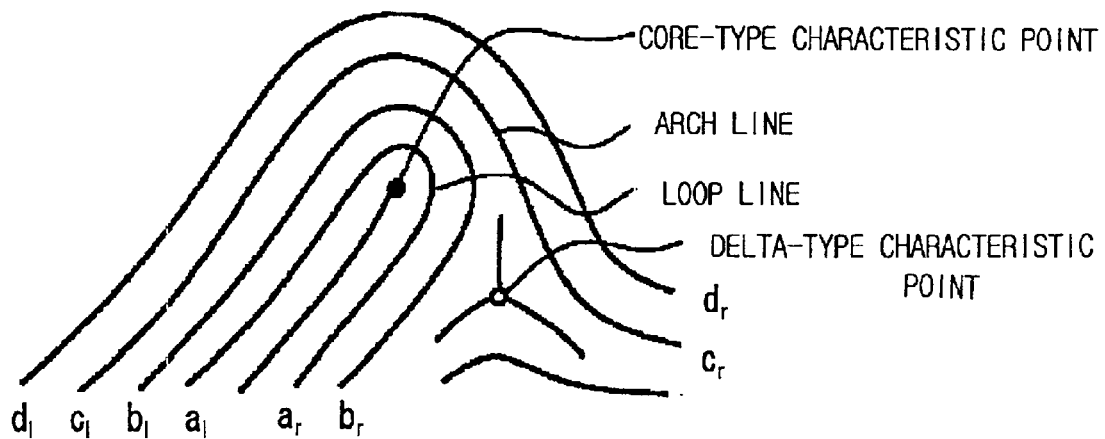
FIG. 34(a) is an illustration for describing a loop line.
FIG. 34(b) is an illustration for describing a tented arch pattern.
Figure 34:
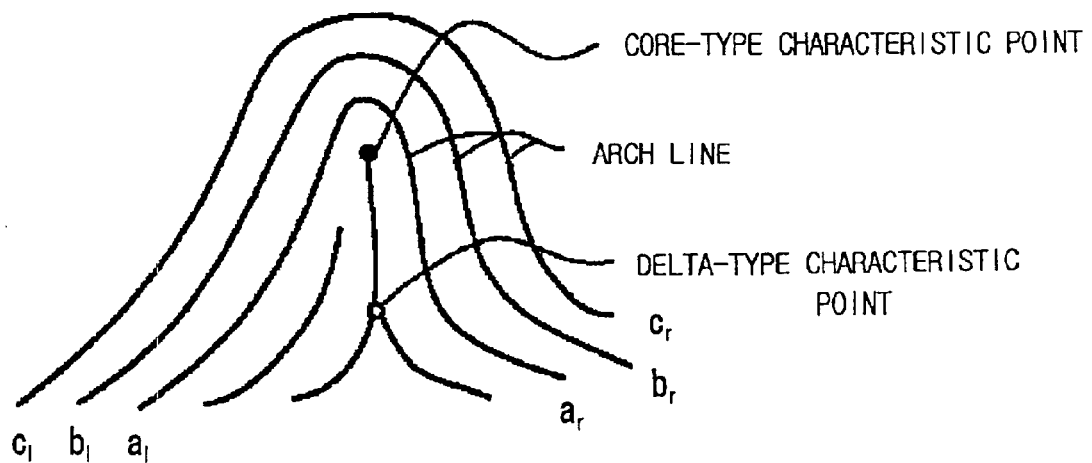
Figure 35:
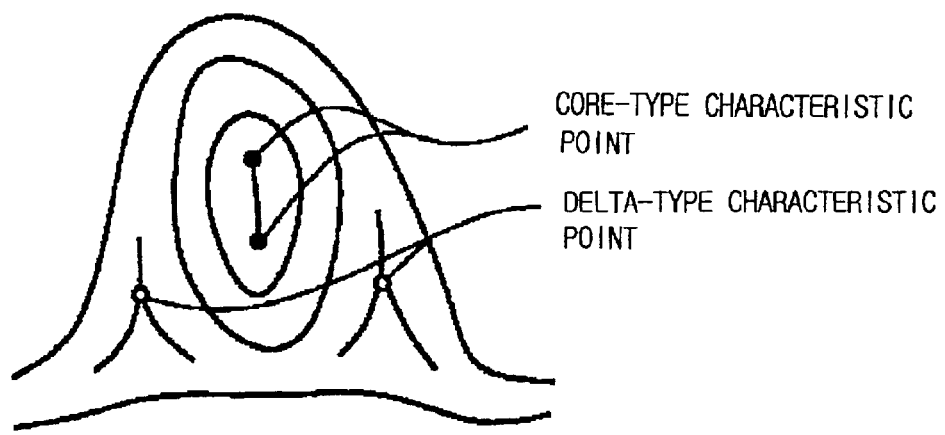
FIGS. 35(a) and 35(b) are illustrations for describing whorl patterns.
Figure 35:
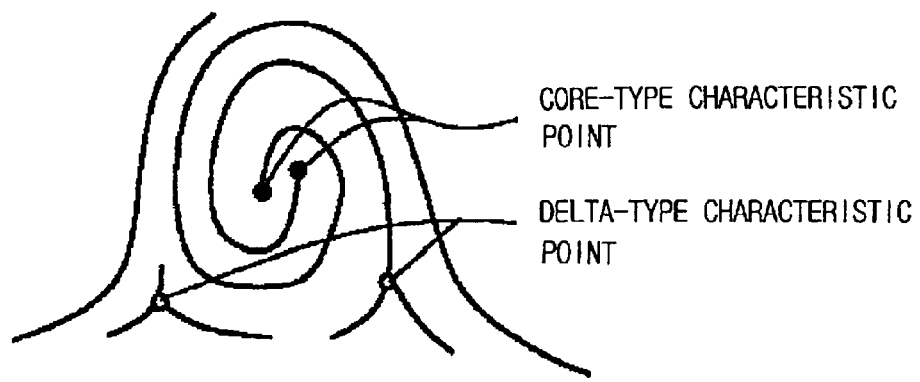
Figure 36:
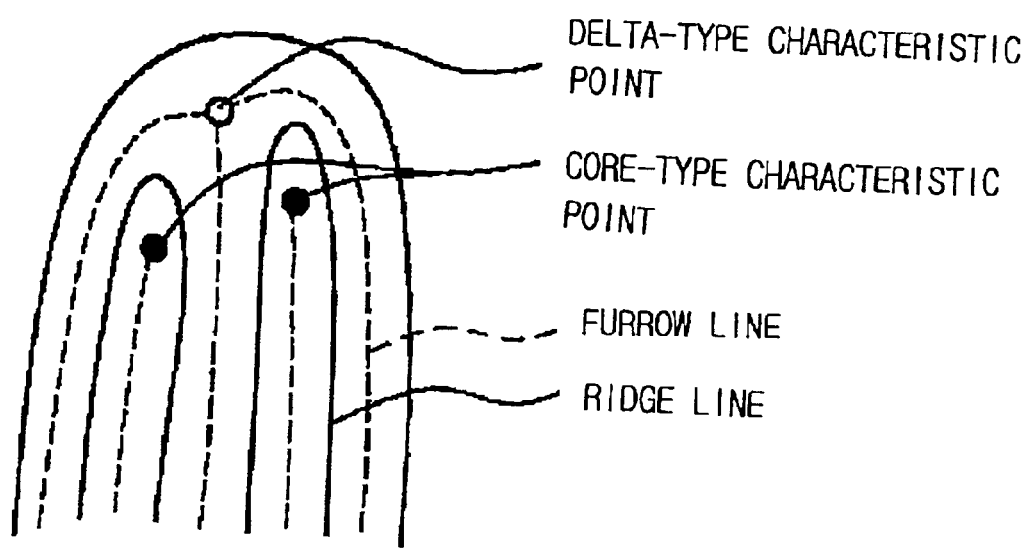
FIG. 36 is an example of a fingerprint having loop lines.

FIG. 32 is a block diagram showing the authentication apparatus of the personal authentication system using biometric information according to the second embodiment of the present invention. The authentication apparatus 70 shown in FIG. 32 determines the person to be authenticated to be a true person or a different person, by use of the matching data written into the storage section 61 and through matching and determination. In addition to the biometric information input section 60a, the authentication apparatus 70 comprises the biometric information characteristic data extraction section (a person-to-be-authenticated biometric information characteristic data extraction section) 60b, the biometric classification information extraction section (a person-to-be-authenticated biometric classification information extraction section) 60c, a matching priority definition section 70a, a biometric information matching section (matching section) 70b, and a determination section 70c. Those elements which are assigned the same reference numerals as those shown in FIG. 32 have identical or similar functions, and repetition of their explanations is omitted.

The biometric information characteristic data extraction section 60b extracts registrant biometric information characteristic data from the biometric information image pertaining to the registrant captured by the biometric information input section 60a. The biometric classification information extraction section 60c extracts registrant biometric classification information from the biometric information about the registrant captured by the biometric information input section 60a. Both the biometric information characteristic data extraction section 60b and the biometric classification information extraction section 60c are shared by the registration apparatus 60.

The biometric information characteristic data extraction section 60b of the registration apparatus 60 and the person-to-be-authenticated biometric classification information extraction section 60c of the authentication apparatus 70 are shared. Further, the biometric classification information extraction section of the registration apparatus 60 and the person-to-be-authenticated biometric classification information extraction section 60c of the authentication apparatus 70 are shared.

The matching priority definition section 70a can output a matching priority for each matching data group classified in accordance with the registrant biometric classification information. The biometric information matching section 70b matches the person-to-be-authenticated fingerprint characteristic data against the registrant fingerprint characteristic data, on the basis of the person-to-be-authenticated biometric information characteristic data, the person-to-be-authenticated biometric classification information, and the matching priority. The result of matching is output.

The personal authentication system 49b using biometric information according to the present invention authenticates an individual by use of biometric information and comprises the storage section 61 capable of holding data; the registration apparatus 60, which produces matching data from the information entered by the registration biometric information input section 60a for capturing biometric information about a registrant and writes the matching data into the storage section 61; and the authentication apparatus 70, which determines a person to be authenticated as a true person or a different person through use of the matching data written in the storage section 61, through matching and determination.

By means of the system having such a construction, the biometric information characteristic data extraction section 60b extracts registrant biometric information characteristic data from the biometric information image pertaining to the registrant captured by the biometric information input section 60a. The biometric classification information extraction section 60c extracts registrant biometric classification information from the live body information about the registrant captured by the biometric information input section 60a. The thus-extracted data and information are input to the biometric information matching section 70b. Further, the matching priority definition section 70a outputs a matching priority for each of the matching data groups classified in accordance with the registrant biometric classification information.

The biometric information matching section 70b reads data from the biometric information characteristic data storage section 61a and from the biometric information storage section 61b. The fingerprint of the person to be authenticated is subjected to matching on the basis of the thus-read data and information, the person-to-be-authenticated biometric information characteristic data, person-to-be-authenticated biometric classification information, and the matching priority. The result of matching is output. On the basis of the matching result, the determination section 70c determines the person as a true or different person.

As mentioned above, at the time of registration of biometric information characteristic data, matching priorities are defined. Biometric information characteristic data and biometric information are retained in separate storage devices. Further, matching is effected while a matching priority is referred to.

As mentioned above, the authentication apparatus 70 effects matching operation by use of biometric information in consideration of a matching priority. Even when perfect match does not exist between the biometric information entered for authentication purpose and biometric information serving as registered data for matching purpose, matching can be effected without fail.

Further, an input device can be used for registration purpose and authentication purpose. Hence, matching can be effected without addition of a new device for entering matching data.

(C) Others

The present invention is not limited to the previously-described embodiments and modifications thereof; the present invention is susceptible to various modifications without departing from the gist of the invention.

Publicly-known techniques can be employed; for example, a method of capturing a fingerprint image and extracting fingerprint characteristic data from an image, a method of detecting the coordinates of the center of a fingerprint, etc.

The definition examples shown in FIGS. 27 through 30 show matching priorities specialized for the case where the procedures shown in FIGS. 13, 14, 17, 21 and 22 are employed. The definition examples do not show matching priorities common to the pattern determination which has already been proposed. Therefore, even when pattern types are classified through use of pattern categories differing from those mentioned previously, the superiority of the present invention will not be deteriorated.

There is very low probability that the fifth matching priority defined in FIGS. 27 through 30 will be determined by the procedures shown in FIGS. 13, 14, 17, 21 and 22. Hence, if a coincident pattern is not found in the registered data assigned the first matching priority through the registered data assigned the fourth priority, matching of the pattern of the fingerprint for authentication against the registered data pertaining to the patterns assigned the fifth matching priority may be omitted, thereby denying authentication.

In a case where matching priorities are defined in terms of characteristics of pattern determination procedures through use of pattern determination procedures other than the matching priority definition examples of right-looped type, wave type, whorl type, and left-looped type, other pattern determination procedures or other matching priority definition processing may be employed.

What is claimed is:

1. A system which authenticates an individual by use of fingerprint information, the system comprising:

a storage section capable of holding data;

a registration apparatus which generates matching data from information entered by a registration fingerprint information input section for capturing registrant fingerprint information and registers the matching data into the storage section; and an authentication apparatus which determines a person to be authenticated as a true person or a different person through use of the matching data written in the storage section, wherein the registration apparatus includes a registrant fingerprint characteristic data extraction section which extracts registrant fingerprint characteristic data from a registrant fingerprint image captured by the registration fingerprint information input section;

a registrant fingerprint classification information extraction section which extracts registrant fingerprint classification information from the registrant fingerprint image captured by the registration fingerprint information input section; and a matching data group generation section which writes matching data groups of the registrant fingerprint characteristic data and the registrant fingerprint classification information into the storage section, the matching data groups formed such that the registrant fingerprint characteristic data and the registrant fingerprint classification information are related with each other in each matching data group, and the authentication apparatus includes a person-to-be-authenticated fingerprint characteristic data extraction section which extracts person-to-be-authenticated fingerprint characteristic data from a person-to-be-authenticated fingerprint image captured by an authentication fingerprint information input section for capturing person-to-be fingerprint information, a person-to-be-authenticated fingerprint classification information extraction section which extracts person-to-be-authenticated fingerprint classification information from the person-to-be-authenticated fingerprint image captured by the authentication fingerprint information input section, a matching priority definition section which outputs a matching priority for each of the registrant matching data groups classified in accordance with the registrant fingerprint classification information, based upon the extracted person-to-be-authenticated fingerprint classification information, and a matching section which matches the person-to-be-authenticated fingerprint characteristic data against the registrant fingerprint characteristic data on the basis of the person-to-be-authenticated fingerprint characteristic data, the person-to-be-authenticated fingerprint classification information and the matching priority, and outputs a result of matching.

2. The personal authentication system according to claim 1, further comprising a determination section for determining the person to be true or false on the basis of the matching result.

3. The personal authentication system according to claim 2, wherein the determination section determines the person to be true or false while factoring in the matching priority.

4. The personal authentication system according to claim 3, wherein the determination section determines the person to be true or false while factoring in the person-to-be-authenticated fingerprint classification information extracted by the person-to-be-authenticated fingerprint classification information extraction section.

5. The personal authentication system according to claim 3, wherein the determination section determines the person to be true or false while a match rate output from the matching section is taken as the matching result.

6. The personal authentication system according to claim 2, wherein the determination section determines the person to be true or false while factoring in the person-to-be-authenticated fingerprint classification information extracted by the person-to-be-authenticated fingerprint classification information extraction section.

7. The personal authentication system according to claim 2, wherein the determination section determines the person to be true or false while a match rate output from the matching section is taken as the matching result.

8. The personal authentication system according to claim 2, wherein, when the determination section cannot determine the person to be true or false until a matching operation for predetermined matching priority is completed, the matching section is arranged so as to limit authentication operation for matching priority lower than the predetermined matching priority.

9. The personal authentication system according to claim 1, wherein the registrant fingerprint classification information extraction section extracts the registrant fingerprint classification information through use of a portion of an opposite side of the tip-end side relative to the center of a fingerprint on the registrant fingerprint image.

10. The personal authentication system according to claim 1, wherein the person-to-be-authenticated fingerprint classification information extraction section extracts the person-to-be-authenticated fingerprint classification information through use of a portion of an opposite side of the tip-end side relative to the center of a fingerprint on the person-to-be-authenticated fingerprint image.

11. The personal authentication system according to claim 10, wherein the authentication apparatus further comprises:
- a person-to-be-authenticated fingerprint characteristic data extraction section which extracts person-to-be-authenticated fingerprint characteristic data from a person-to-be-authenticated fingerprint image captured by an authentication fingerprint information input section for capturing person-to-be fingerprint information;
- a person-to-be-authenticated fingerprint classification information extraction section which extracts person-to-be-authenticated fingerprint classification information from the person-to-be-authenticated fingerprint image captured by the authentication fingerprint information input section; and
- a matching section which matches the person-to-be-authenticated fingerprint characteristic data against the registrant fingerprint characteristic data on the basis of the matching priority included in the matching data and outputs a result of matching.

12. The person authentication system according to claim 11, wherein the registrant fingerprint characteristic data extraction section of the registration apparatus and the person-to-be-authenticated fingerprint characteristic data extraction section of the authentication apparatus are shared; and wherein the registrant fingerprint classification information extraction section of the registration apparatus and the person-to-be-authenticated fingerprint classification extraction section of the authentication apparatus are shared.

13. The personal authentication system according to claim 1, wherein the registration apparatus further comprises a matching priority determination processing section for determining a matching priority in accordance with the registrant fingerprint classification information and for outputting the matching priority, and the matching data generation section is arranged so as to write the matching data into the storage section, the matching data being formed such that the registrant fingerprint characteristic data, the registrant fingerprint classification information and the matching priority are related with each other.

14. The person authentication system according to claim 1, wherein the matching priority definition section is arranged so as to hold, as the matching data, the matching data being formed such that the registrant fingerprint classification information and the matching priority are related with each other.

15. The person authentication system according to claim 1, wherein the storage section is arranged so as to hold the matching data according to classification categories of the registrant fingerprint classification information.

16. The person authentication system according to claim 15, wherein the storage section is arranged so as to comprise a registrant fingerprint characteristic data storage section capable of holding the registrant fingerprint characteristic data and a registrant fingerprint classification information storage section capable of holding the registrant fingerprint classification information.

17. The person authentication system according to claim 1, wherein the registrant fingerprint characteristic data extraction section of the registration apparatus and the person-to-be-authenticated fingerprint characteristic data extraction section of the authentication apparatus are shared; and wherein the registrant fingerprint classification information extraction section of the registration apparatus and the person-to-be-authenticated fingerprint classification extraction section of the authentication apparatus are shared.

18. A system which authenticates an individual using biometric information, the system comprising:
- a storage section capable of holding data;
- a registration apparatus which generates matching data from information entered by a registration biometric information input section for capturing biometric information about a registrant and registers the matching data into the storage section; and
- an authentication apparatus which determines a person to be authenticated as a true person or a different person through use of the matching data written in the storage section, wherein
the registration apparatus includes
- a registrant biometric information characteristic data extraction section which extracts registrant biometric information characteristic data from a biometric information image pertaining to the registrant captured by the registration biometric information input section;
- a registrant biometric information classification information extraction section which extracts registrant biometric classification information from the biometric information image pertaining to a registrant captured by the registration biometric information input section; and
- a matching data group generation section which writes matching data groups of the registrant fingerprint characteristic data and the registrant fingerprint classification information into the storage section, the registrant matching data groups formed such that the registrant biometric information characteristic data and the registrant biometric classification information are related with each other in each registrant matching data group, and the authentication apparatus includes a person-to-be-authenticated biometric information characteristic data extraction section which extracts person-to-be-authenticated biometric information characteristic data from a biometric information image pertaining to the person to be authenticated captured by an authentication biometric information input section for capturing biometric information about the person to be authenticated;

a person-to-be-authenticated biometric classification information extraction section which extracts person-to-be-authenticated biometric classification information from the biometric information image pertaining to the person to be authenticated captured by the authentication biometric information input section;

a matching priority definition section which outputs a matching priority for each of the registrant matching data groups classified in accordance with the registrant biometric classification information, based upon the extracted person-to-be-authenticated biometric classification information; and a matching section which matches the person-to-be-authenticated biometric information characteristic data against the registrant biometric characteristic data on the basis of the person-to-be-authenticated biometric information characteristic data, the person-to-be-authenticated biometric classification information and the matching priority, and outputs a result of matching.

19. The person authentication system according to claim 18, wherein the registrant biometric information characteristic data extraction section of the registration apparatus and the person-to-be-authenticated biometric information characteristic data extraction section of the authentication apparatus are shared; and wherein the registrant biometric information classification information extraction section of the registration apparatus and the person-to-be-authenticated biometric information classification extraction section of the authentication apparatus are shared.

20. A registration-and-authentication method for use with a personal authentication system for authenticating an individual through use of fingerprint information, the method comprising:

extracting registrant fingerprint characteristic data from a captured registrant fingerprint image;

writing the registrant fingerprint characteristic data extracted into a storage section capable of retaining data;

extracting registrant fingerprint classification information from the registrant fingerprint image;

writing the registrant fingerprint classification information extracted into the storage section;

writing matching data groups of the registrant fingerprint characteristic data and the registrant fingerprint classification information into the storage section, the registrant matching data groups formed such that the registrant fingerprint characteristic data and the registrant fingerprint classification information are related with each other in each registrant matching data group;

extracting the matching data from the storage section;

extracting the registrant fingerprint characteristic data from a captured person-to-be-authenticated fingerprint image;

extracting person-to-be-authenticated fingerprint classification information from the person-to-be-authenticated fingerprint image;

outputting a matching priority for each of the registrant matching data groups classified based upon the registrant fingerprint classification information, based upon the extracted person-to-be-authenticated fingerprint classification information; and matching and determining a person to be authenticated as a true or false person on the basis of the person-to-be-authenticated fingerprint characteristic data, the person-to-be-authenticated fingerprint classification information and the matching priority.

21. A determination method for use with a personal authentication system which authenticates an individual by use of fingerprint information, the method comprising:

detecting coordinates of a center of a fingerprint from a person-to-be-authenticated fingerprint image;

dividing the person-to-be-authenticated fingerprint image into a plurality of unit blocks;

recognizing a center unit block having the fingerprint center coordinates detected in the center from among the plurality of unit blocks produced in the dividing;

generating block groups including the plurality of unit blocks located at a portion of an opposite side of the tip-end side relative to the center unit block recognized;

determining the orientation of a local fingerprint wave in each of the plurality of unit blocks constituting the block group generated; and determining fingerprint classification information based upon the orientation of the fingerprint wave determined.

22. A registration apparatus for use with a personal authentication system which authenticates an individual by use of fingerprint information, wherein the apparatus produces matching data from information entered by a registrant fingerprint information input section for capturing registrant fingerprint information and effects writing of the matching data, the apparatus comprising:

a registrant fingerprint characteristic data extraction section for extracting registrant fingerprint characteristic data from a registrant fingerprint image captured by the registration fingerprint information input section;

a registrant fingerprint classification information extraction section for extracting registrant fingerprint classification information from the registrant fingerprint image captured by the registration fingerprint information input section;

a matching priority determination processing section which determines a matching priority in accordance with the registrant fingerprint classification information and outputs the matching priority; and a matching data generation section for writing the matching data into a storage section capable of holding the matching data, the matching data being formed such that the registrant fingerprint characteristic data, the registrant fingerprint classification information and the matching priority are related with each other.

23. An authentication apparatus for use with a personal authentication system using fingerprint information, wherein the apparatus determines a person to be authenticated as a true or false person by use of matching data stored in a storage section capable of retaining data, through matching and determination, the apparatus comprising:

a person-to-be-authenticated fingerprint characteristic data extraction section for extracting person-to-beauthenticated fingerprint characteristic data from a person-to-be-authenticated fingerprint image captured by an authentication fingerprint information input section for capturing person-to-be-authenticated fingerprint information;

a person-to-be-authenticated fingerprint classification information extraction section for extracting person-to-be-authenticated fingerprint classification information from the person-to-be-authenticated fingerprint image captured by the authentication fingerprint information input section;

a matching priority determination processing section which determines a matching priority in accordance with registrant fingerprint classification information and outputs the matching priority; and a matching section which matches the person-to-be-authenticated fingerprint characteristic data against the registrant fingerprint characteristic data on the basis of the person-to-be-authenticated fingerprint characteristic data, the person-to-be-authenticated fingerprint classification information and the matching priority, and outputs a result of matching.

24. A computer-readable recording medium having recorded thereon a program for causing a computer, which is to be used with a system for authenticating an individual by use of fingerprint information, to function as:

a registrant fingerprint characteristic data extraction section for extracting registrant fingerprint characteristic data from a captured registrant fingerprint image pertaining to a registrant;

a registrant fingerprint classification information extraction section for extracting registrant fingerprint classification information from the registrant fingerprint image;

a matching priority determination processing section which determines a matching priority in accordance with the registrant fingerprint classification information and outputs the matching priority; and a matching data generation section for writing the matching data into a storage section capable of holding the matching data, the matching data being formed such that the registrant fingerprint characteristic data, the registrant fingerprint classification information and the matching priority are related with each other.

25. A computer-readable recording medium having recorded thereon a program for causing a computer, which is to be used with a system for authenticating an individual by use of fingerprint information, to function as:

a person-to-be-authenticated fingerprint characteristic data extraction section for extracting person-to-be-authenticated fingerprint characteristic data from a captured person-to-be-authenticated fingerprint image pertaining to a registrant;

a person-to-be-authenticated fingerprint classification information extraction section for extracting person-to-be-authenticated fingerprint classification information from the person-to-be-authenticated fingerprint image;

a matching priority determination processing section which can output a matching priority for each of matching data groups classified in accordance with the registrant fingerprint classification information; and a matching section for matching the person-to-be-authenticated fingerprint characteristic data and the registrant fingerprint characteristic data on the basis of the person-to-be-authenticated fingerprint characteristic data, the person-to-be-authenticated fingerprint classification information and the matching priority.

26. A computer-implemented method, comprising:

generating registered matching data based upon input biometric information of persons;

grouping the registered matching data;

generating matching data of an input biometric information of a person-to-be-authenticated;

assigning a matching priority to each registered matching group based upon the registered matching data and/or the generated matching data of the person-to-be-authenticated; and authenticating the person-to-be-authenticated by comparing the registered matching data with the generated matching data of the person-to-be-authenticated, according to the assigned matching priority of the registered matching data.

27. The method of claim 26, wherein the authenticating further comprises authenticating the person-to-be-authenticated according to a match rate of comparisons based upon the assigned matching priority of the registered matching data.

* * * * *

UNITED STATES PATENT AND TRADEMARK OFFICE
CERTIFICATE OF CORRECTION

PATENT NO. : 6,954,553 B2 Page 1 of 1
APPLICATION NO. : 09/797738
DATED : October 11, 2005
INVENTOR(S) : Ikegami It is certified that error appears in the above-identified patent and that said Letters Patent is hereby corrected as shown below:

On title page Col 2
Item (56)    References Cited

Please INSERT the following references which were omitted from the face of the patent:

U.S. PATENTS

| | | | |
|---|---|---|---|
| --6,118,890 | 09-2000 | Senior, Andrew William | 382/125 |
| 4,151,512 | 04-1979 | Riganati et al. | 382/125 |
| 5,974,163 | 10-1999 | Kamei, Toshio | 382/125 |
| 6,498,861 | 12-2002 | Hamid et al. | 382/124 |
| 5,465,303 | 11-1995 | Levison et al. | 382/124 |
| 5,572,597 | 11-1996 | Chang et al. | 382/125-- |

Signed and Sealed this

Eighth Day of August, 2006

JON W. DUDAS
*Director of the United States Patent and Trademark Office*